(12) United States Patent
Scheurich et al.

(10) Patent No.: US 7,174,342 B1
(45) Date of Patent: Feb. 6, 2007

(54) SYSTEMS AND METHODS FOR DEFINING EXECUTABLE SEQUENCES TO PROCESS INFORMATION FROM A DATA COLLECTION

(75) Inventors: Larry Scheurich, Tigard, OR (US);
Neil Barton, Beaverton, OR (US);
Marc Demarest, Hillsboro, OR (US);
Kurt Ehrler, Portland, OR (US); Eric Halvorson, Portland, OR (US);
Michael Bonaventura, Kirkcudbright (GB)

(73) Assignee: NCR Corp., Dayton, OH (US)

( * ) Notice: Subject to any disclaimer, the term of this patent is extended or adjusted under 35 U.S.C. 154(b) by 531 days.

(21) Appl. No.: 09/925,103

(22) Filed: Aug. 9, 2001

(51) Int. Cl.
*G06F 7/00* (2006.01)
*G06Q 30/00* (2006.01)

(52) U.S. Cl. .................. 707/102; 707/4; 707/104.1; 707/10; 705/26; 705/27; 705/1

(58) Field of Classification Search ............... 707/1–10, 707/100–104.1; 345/346, 340, 347; 705/10, 705/26–27, 1
See application file for complete search history.

(56) References Cited

U.S. PATENT DOCUMENTS

| | | | |
|---|---|---|---|
| 5,036,314 A | 7/1991 | Barillari et al. | |
| 5,119,318 A | 6/1992 | Paradies et al. | |
| 5,311,562 A | 5/1994 | Palusamy et al. | |
| 5,555,403 A | 9/1996 | Cambot et al. | |
| 5,630,069 A | 5/1997 | Flores et al. | |
| 5,734,837 A | 3/1998 | Flores et al. | |
| 5,794,246 A | 8/1998 | Sankaran et al. | |
| 5,893,128 A * | 4/1999 | Nauckhoff | ............ 715/511 |
| 5,918,226 A | 6/1999 | Tarumi et al. | |
| 6,006,216 A | 12/1999 | Griffin et al. | |
| 6,014,670 A | 1/2000 | Zamanian et al. | |
| 6,026,394 A * | 2/2000 | Tsuchida et al. | ............ 707/3 |
| 6,032,158 A | 2/2000 | Mukhopadhyay et al. | |
| 6,044,374 A | 3/2000 | Nesamoney et al. | |
| 6,049,804 A | 4/2000 | Burgess et al. | |
| 6,052,689 A | 4/2000 | Muthukrishnan et al. | |

(Continued)

OTHER PUBLICATIONS

Hollingsworth, "Workflow Management Coalition: The Workflow Reference Model," *The Workflow Management Coalition Specification*, pp. 1-55, Jan. 19, 1995.

(Continued)

*Primary Examiner*—Jean M. Corrielus
*Assistant Examiner*—Anh Ly
(74) *Attorney, Agent, or Firm*—Klarquist Sparkman, LLP

(57) ABSTRACT

Information can be collected, processed, and distributed in a variety of ways to support a decision-making process. A query-analyze-distribute approach can be used, and queries, analysis directives, and distribution directives can be associated into a sequence and shared. Access to interim processing is provided. Query, analysis, and distribution directives can be stored in unbound format and tailored to a particular situation via binding. The query, analysis, and distribution processing can be loosely-coupled to allow easy interchange and combination of sequence elements. A sequence can be scheduled for periodic execution, and distribution can be tailored based on filters and exceptions. A decision-making process can be automated by creating an executable workflow. The environment in which the workflow is executed can support a rich set of features, including gating, branching, drill down, and execution tracking. A decision-making process based on a sequence can be refined by employing executable metasequences.

24 Claims, 103 Drawing Sheets

U.S. PATENT DOCUMENTS

| | | | |
|---|---|---|---|
| 6,052,694 | A | 4/2000 | Bromberg |
| 6,055,227 | A | 4/2000 | Lennert et al. |
| 6,058,394 | A | 5/2000 | Bakow et al. |
| 6,058,413 | A | 5/2000 | Flores et al. |
| 6,065,007 | A | 5/2000 | Muthukrishnan et al. |
| 6,073,109 | A | 6/2000 | Flores et al. |
| 6,073,140 | A | 6/2000 | Morgan et al. |
| 6,108,004 | A * | 8/2000 | Medl ................... 715/804 |
| 6,226,620 | B1 | 5/2001 | Oon |
| 6,247,008 | B1 | 6/2001 | Cambot et al. |
| 6,253,369 | B1* | 6/2001 | Cloud et al. ............. 717/136 |
| 6,278,977 | B1* | 8/2001 | Agrawal et al. ............. 705/7 |
| 6,286,005 | B1* | 9/2001 | Cannon ................ 707/100 |
| 6,345,259 | B1 | 2/2002 | Sandoval |
| 6,349,290 | B1* | 2/2002 | Horowitz et al. ........... 705/35 |
| 6,430,545 | B1* | 8/2002 | Honarvar et al. .......... 707/100 |
| 6,499,023 | B1* | 12/2002 | Dong et al. ............... 706/46 |
| 6,519,568 | B1* | 2/2003 | Harvey et al. ............. 705/1 |
| 6,581,054 | B1* | 6/2003 | Bogrett ................... 707/4 |
| 6,718,338 | B2 | 4/2004 | Vishnubhotia |
| 6,735,592 | B1* | 5/2004 | Neumann et al. .......... 707/101 |
| 2001/0014888 | A1* | 8/2001 | Tsuchida et al. ............ 707/2 |
| 2002/0002468 | A1* | 1/2002 | Spagna et al. ............. 705/1 |
| 2002/0007237 | A1 | 1/2002 | Phung et al. |
| 2002/0091636 | A1* | 7/2002 | Bullard .................. 705/40 |
| 2002/0099598 | A1* | 7/2002 | Eicher et al. ............. 705/11 |
| 2002/0107824 | A1 | 8/2002 | Ahmed |
| 2002/0133368 | A1* | 9/2002 | Strutt et al. ............... 705/1 |
| 2002/0165727 | A1* | 11/2002 | Greene et al. ............. 705/1 |
| 2002/0174000 | A1* | 11/2002 | Katz et al. ............... 705/7 |
| 2003/0014483 | A1* | 1/2003 | Stevenson et al. .......... 709/203 |
| 2004/0044542 | A1 | 3/2004 | Benjaminy et al. |

OTHER PUBLICATIONS

Sagent, "Achieving ETL Scalability in an e-Business World," *Hurwitz Report*, pp. 1-8, Jan. 2001.
"MicroStrategy Intelligence Server Features: Platform Architecture," http://www.microstrategy.com/oldstore/software/iserver/architecture.asp, pp. 1-2, Jun. 27, 2001.
Constanza, "Cognos Joins the Enterprise," *ENT*, vol. 5, No. 2, p. 38, Feb. 9, 2000.
Johnson, "Start-up Puts Data Warehouse in a Box; DecisionPoint offers applications as a one-size-fits-all solution," *Computerworld*, p. 86, Jun. 19, 2000.
Muench, *Building Oracle XML Applications*, O'Reilly & Associates, Inc., pp. 1-792, Sep. 2000.
"Alphablox 3," http://www.alphablox.com/products/Alphablox3.asp, pp. 1-8, Jun. 25, 2001.
"AlphaBlox: A Web-based Platform for Developing Analytical Applications," *AberdeenGroup Profile*, www.aberdeen.com, pp. 1-8, 2000.
"An Integrated Platform for Analytic Applications," *Hurwitz Report*, pp. 1-9, Jul. 2000.
*Brio.Enteprise™ User's Guide Version 6.0*, Brio Technology, pp. 1-168, 1999.
*Brio.Report™ Builder User's Guide*, Brio Technology, pp. I-1 through C-4, 2000.
"Build SQL Statements That Include Variables and Controls," *Microsoft Access 97*, Microsoft Corporation, 1 page, 1996.
"BusinessObjects User's Guide," Version 5.1, Windows, Business Objects, pp. 1-544, 546-654, Jul. 31, 2001.
"Centrus.com: Internet-based Enrichment for Enhanced Customer and Business-to-Business Understanding," *AberdeenGroup Profile*, www.aberdeen.com, pp. 1-8, 2000.
"Centrus InfoStan," *Sagent White Paper*, pp. 1-14, 2000.
"Centrus Merge/Purge," *White Paper*, pp. 1-32, 2000.
"Centrus Real-Time," *Sagent White Paper*, pp. 1-15, 2000.
"Combine Data in Fields from Two or More Tables Using a Union Query," *Microsoft Access 97*, Microsoft Corporation, 1 page, 1996.
"Create an SQL Query," *Microsoft Access 97*, Microsoft Corporation, 1 page, 1996.
"Getting To Exactly," *White Paper*, pp. 1-8, Sep. 2000.
"LaserFiche Workflow Suite," www.laserfiche.com/wf, pp. 1-2, Jun. 2001.
"MicroStrategy Intelligence Server-Enterprise Edition 7.0.2," http://store.microstrategy.com/Shopping/versions1.asp?VR=165, pp. 1-2, Feb. 28, 2001.
"MicroStrategy Intelligence Server™ Features: Table of Contents," http://www.microstrategy.com/oldstore/software/iserver/toc.asp, pp. 1-2, Feb. 28, 2001.
"MicroStrategy Intelligence Server Features: Overview," http://www.microstrategy.com/oldstore/software/iserver/overview.asp, pp. 1-3, Jun. 27, 2001.
"MicroStrategy Intelligence Server Features: Dynamic Querying and Reporting for Your Business Users," http://www.microstrategy.com/oldstore/software/iserver/dynamicquery.asp, pp. 1-3, Jun. 27, 2001.
"Modify the Underlying Query or SQL Statement for a Form or Report," *Microsoft Access 97*, Microsoft Corporation, 1 page, 1996.
"Products PowerCenter 1.7 Datasheet," http://www.informatica.com/products/platform+products/powerc_data.htm, pp. 1-4, Feb. 26, 2001.
"Product Suite ActiveRules," http://www.whitelight.com/products/arules.html, 1 page, Feb. 28, 2001.
"Product Suite AnalyticServer," http://www.whitelight.com/products/as.html, 1 page, Feb. 28, 2001.
"RunSQL Action," *Microsoft Access 97*, Microsoft Corporation, 1 pages, 1996.
"Sagent Analysis," http://www.sagent.com, pp. 1-2, 2000.
"Sagent Design Studio," http://www.sagent.com, pp. 1-2, 2000.
"Sagent Information Studio," http://www.sagent.com, pp. 1-2, 2000.
"Sagent Solution," http://www.sagent.com/technologies/solution.html, pp. 1-2, Feb. 26, 2001.
"SAP Business Workflow Architecture," http://saphelp.duke.edu/saphelp/helpdata/EN/c5/e4a957453d11d189430000e829fbbd/content, Jul. 13, 2001.
*Seagate Crystal Reports User's Guide*, Seagate Software, Inc., pp. 1-670, 1998.
"Send Commands to an SQL Database Using a Pass-Through Query," *Microsoft Access 97*, Microsoft Corporation, 1 page, 1996.
"Use a Subquery to Define a Field or Define Criteria for a Field," *Microsoft Access 97*, Microsoft Corporation, 1 page, 1996.
"Use an SQL Statement as the Row Source for a List Box or Combo Box," *Microsoft Access 97*, Microsoft Corporation, 1 page, 1996.
"Use Query Design View to Generate an SQL Statement to Past Elsewhere," *Microsoft Access 97*, Microsoft Corporation, 1 page, 1996.
"View or Modify the SQL Statement Behind an Existing Query," *Microsoft Access 97*, Microsoft Corporation, 1 page, 1996.
"Welcome to the MicroStrategy Store," http://www.microstrategy.com/oldstore/software/iserver/dynamicquery-screenshots.asp, 1 page, Jun. 27, 2001.
"White Paper WhiteLight ActiveRules Technology," pp. 1-23, 2000.
"What is an SQL Query and When Would you Use One?," *Microsoft Access 97*, Microsoft Corporation, 1 page, 1996.
"Work with SQL in Queries, Forms, Reports, Macros, and Modules," *Microsoft Access 97*, Microsoft Corporation, 1 page, 1996.
http://www.microstrategy.com/oldstore/software/iserver/graphics/promptpage1.GIF, 1 page, Jun. 27, 2001.
http://www.microstrategy.com/oldstore/software/iserver/graphics/promptpage3.GIF, 1 page, Jun. 27, 2001.
http://www.microstrategy.com/oldstore/software/iserver/graphics/promptsummary.GIF, 1 page, Jun. 27, 2001.
http://www.microstrategy.com/oldstore/software/iserver/graphics/promptpage2.GIF, 1 page, Jun. 27, 2001.
http://www.microstrategy.com/oldstore/software/iserver/graphics/promptpage4.GIF, 1 page, Jun. 27, 2001.
http://www.microstrategy.com/oldstore/software/iserver/graphics/Drilling.GIF, 1 page, Jun. 27, 2001.

Alagic, "Type-Checking OQL Queries in the ODMG Type Systems," *ACM Transactions on Database Systems*, vol. 24, No. 3, pp. 319-360, Sep. 1, 1999. (35 pages).

Alwang, "Sybase Inc.: Sybase PowerJ Enterprise 2.1; Sofware Review; Evaluation," *PC Magazine*, vol. 17, No. 7, p. 203, Apr. 7, 1998. (2 pages).

Bucholtz, "Data Mining: Like Money in the Bank—ASPs stand to gain from the new generation of data warehousing products," *VARbusiness*, p. 82, Dec. 18, 2000.

Carig, "Data Warehouse," *ENT*, vol. 5, No. 8, pp. 38, Nov. 8, 2000.

Davis, "Data Warehouses Open Up- Sharing Information in Your Company's Data Warehouse with Suppliers and Partners Can Benefit Everyone," *Information Week*, p. 42, Jun. 28, 1999.

Demarest, "Technology and Policy in Decision Support Systems," *DPA White Paper No. 98010033.7*, pp. 1-14, Jan. 17, 2000.

Heller, "Have it Your Way with Office 2000 Developer; Product Support; Tutorial," *Government Computer News*, vol. 18, No. 15, p. 30, May 24, 1999. (3 pages).

Jajodia, "Database Security and Privacy," *The Computer Science and Engineering Handbook*, Tucker, Jr. (ed.), CRC Press, Inc., pp. 1112-1124, 1997.

Jennings, *Using Access 97 The Ultimate Reference*, pp. 264-397, 1997.

Jennings, *Using Access 97 The Ultimate Reference*, pp. 470-478, 1997.

Jennings, *Using Access 97 The Ultimate Reference*, p. 968, 1997.

Jennings, *Using Access 97 The Ultimate Reference*, p. 1267, 1997.

Kossmann, "The State of the Art in Distributed Query Processing," *ACM Computing Surveys*, vol. 32, No. 4, pp. 422-469, Dec. 1, 2000. (39 pages).

Leon, "Where's the XML?," *InfoWorld*, pp. 36-37, Apr. 2, 2001.

Liu, "Applying Intelligent Agents in the Scanning and Interpretation of Strategic Data," *Agent News*, vol. 1, No. 6, pp. 1-41, May 11, 1996.

MacDonald, "One Man's View of Enterprise Data Warehousing," *Computing Canada*, vol. 24, No. 13, pp. 26-27, Apr. 6, 1998.

Melton, "The SQL Language: A Case Study," *The Computer Science and Engineering Handbook*, Tucker, Jr. (ed.), CRC Press, Inc., pp. 1171-1189, 1997.

Moeller, "Introduction," *Distributed Data Warehousing Using Web Technology: How to Build a More Cost-Effective and Flexible Warehouse*, pp. 1-28, Oct. 15, 2000.

Moeller, "Data Placement in Distributed Warehouses- Distribution and Transformation," *Distributed Data Warehousing Using Web Technology: How to Build a More Cost-Effective and Flexible Warehouse*, pp. 83-113, Oct. 15, 2000.

Moeller, "Concurrency Control in Distributed Warehouses," *Distributed Data Warehousing Using Web Technology: How to Build a More Cost-Effective and Flexible Warehouse*, pp. 115-157, Oct. 15, 2000.

Moeller, "Future Developments," *Distributed Data Warehousing Using Web Technology: How to Build a More Cost-Effective and Flexible Warehouse*, pp. 327-348, Oct. 15, 2000.

Silberschatz et al., "Data Models," *The Computer Science and Engineering Handbook*, Tucker, Jr. (ed.), CRC Press, Inc., pp. 979-994, 1997.

White, "DBMS Past, Present, and Future," *Dr. Dobb's Journal*, No. 327, pp. 21-29, Aug. 1, 2001.

Whiting, "Best Ways to Serve Customers—CRM software lets businesses understand and meet their customers' needs," *InformationWeek*, p. 54, Dec. 11, 2000.

Whiting, "Business Intelligence Platforms Broaden Focus," *Information Week*, p. 26, Jul. 24, 2000.

Whiting, "DecisionPoint Expands into CRM- Packaged Data Warehouse Software Will Analyze Data from Siebel Applications," *Information Week*, p. 167, Dec. 4, 2000.

\* cited by examiner

FIG. 15A

QUERY DIRECTIVES — 1502

| NAME | DESC | SOURCE | USER | STATUS | OPTION |
|---|---|---|---|---|---|
| NEW | NEW | SYSTEM A ▶ | NB | AVAILABLE ▶ | ADD |
| CC1 | COST CENTER | SYSTEM A | EH | AVAILABLE ▶ | MOD |
| AR-PTD | PERIOD TO DATE | SYSTEM B | LS | AVAILABLE ▶ | MOD |
| REV | PTD REVENUE | SYSTEM B | LS | AVAILABLE ▶ | MOD |
| FIN | FINANCIALS | SYSTEM B | LS | AVAILABLE ▶ | MOD |
| SALES | SALES BY DEPT | SYSTEM B | LS | AVAILABLE ▶ | MOD |

FIG. 15B

QUERY:NEW QUERY

QUERY TABLE & COLUMNS ~1504

| TABLE | COLUMN | GB? | ST | XML TAG | ROR? | SORT |
|---|---|---|---|---|---|---|
| ▼ | ◄ SELECT COLUMN ► | | | | | |
| ACCOUNTING_DATE_D | | | | | | |
| AR_RCT_REV_RESN_D | | | | | | |
| AR_RECPT_STATUS_D | | | | | | |
| AR_REVENUE_F | | | | | | |
| AR_SCH_PMT_DTL_F | | | | | | |
| AR_SHIP_VIA_D | | | | | | |
| AR_SOLD_TO_CUST_D | | | | | | |
| ASSET_BOOK_D | | | | | | |
| ASSET_EMPLOYEE_D | | | | | | |
| ASSET_INVENTORY_F | | | | | | |
| ASSET_TYPE_D | | | | | | |
| AUTHORIZER_D | | | | | | |

FIG. 15D

QUERY:NEW QUERY

QUERY TABLE & COLUMNS 1508

| TABLE | COLUMN | GB? | ST | XML TAG | ROR? | SORT |
|---|---|---|---|---|---|---|
| DEPARTMENT_D | DEPARTMENT_DESC | Y | | DEPARTMENT | N | 1 |

[ADD COLUMN]

[DONE]

FIG. 15E

QUERY: NEW QUERY  
QUERY TABLE & COLUMNS — 1510

| TABLE | COLUMN | GB? | ST | XML TAG | ROR? | SORT |
|---|---|---|---|---|---|---|
| DEPARTMENT_D | DEPARTMENT_DESC | Y | | DEPARTMENT | N | 1 |
| INC_STMT_LINES_D | LINE_NAME | Y | | LINE_NAME | N | |
| INCOME_STMT_A | PTD_ACTUAL | N | SUM | PTD_ACTUAL | N | |
| INCOME_STMT_A | PTD_BUDGET | N | SUM | PTD_BUDGET | N | |
| INCOME_STMT_A | PTD_VARIANCE | N | SUM | PTD_VARIANCE | N | |

[ADD COLUMN]  
[DONE]

QUERY:NEW QUERY

QUERY FILTERS

| TABLE | COLUMN | FILTER OPERATOR | ROR? | REF TABLE | REF COLUMN |
|---|---|---|---|---|---|
| BUDGET_D | BUDGET ▶ | IN ▶ | NO ▶ | ▶ | REF TABLE |

=
>
<
>=
<=
=
IN

ADD

FIG. 15G

QUERY:NEW QUERY

QUERY FILTERS

| TABLE | COLUMN | FILTER OPERATOR | ROR? | REF TABLE | REF COLUMN |
|---|---|---|---|---|---|
| BUDGET_D | BUDGET | IN | N | | |
| PERIOD_D | PERIOD | = | N | | |
| DEPARTMENT_D | DEPARTMENT | = | N | DEPARTMENT_D | DEPARTMENT_KEY |

[ADD FILTER]
[FINISH]

ANALYSIS SUBSEQUENCE

YOU ARE TYING THIS ANALYSIS SUBSEQUENCE TO THE QUERY DIRECTIVE: NEW QUERY

↗ 1516

| ANALYSIS SUBS NAME | USER NAME | RESULTS TYPE | LAST RUN DATE | OPTIONS |
|---|---|---|---|---|
| | | | | ADD |
| INCOME STMT ANALYSIS | NB | SHOW | | |

FIG. 15L

ANALYSIS SUBSEQUENCE

NAME : INCOME STATMT ANALYSIS

↗ 1524

| COND'N TYPE | COND'N SEQ | XML TAG NAME | XML TDT | XML TDF | OPERATOR | TV | OPT |
|---|---|---|---|---|---|---|---|
| AND | | DEPARTMENT ▼ | | | NOOP ▼ | | ADD |
| AND | 1 | PTD_ACTUAL ▼ | | | <> ▼ | 0 | MOD DEL |
| AND | 2 | PTD_VARIANCE ▼ | | | > ▼ | 300000 | MOD DEL |
| AND | 3 | PTD_VARIANCE ▼ | | | TOP PCT ▼ | 10 | MOD DEL |

[ADDITIONS COMPLETED]

FIG. 15M

ADD, EDIT OR DELETE SEQUENCES

SEQUENCES ←1526

| ID | NAME | DESCRIPTION | STATUS | USER | OPT |
|----|------|-------------|--------|------|-----|
|    |      |             |        |      | ADD |
| 24 | INCOME STAT'T ANALYSIS | INCOME STAT'T ANALYSIS | AVAIL ▼ | NB | MOD |
| 25 | FINANCIAL STATEMENT | FINANCIAL STATEMENT | AVAIL ▼ | LS | MOD |
|    | FSV | FSV | AVAIL ▼ | NB | MOD |
| 26 | COST CENTER SCORING 1 | COST CENTER SCORING | DISAB ▼ | LS | MOD |
| 27 | COST CENTER SCORING 2 | CSS PTD-VARIANCE | AVAIL ▼ | LS | |

FIG. 15N

ADD OR EDIT SEQUENCE STEP INFORMATION
SEQUENCE NAME: INCOME STATEMENT ANALYSIS ← 1530

| ID | STEP | DIRECTIVE TYPE | DIRECTIVE ID | LUB | LUD |
|----|------|----------------|--------------|-----|-----|
| 28 | 1 | QUERY DIRECTIVE | QUERY FOR STEP ▼ | | |

AR - PTD REVENUE BY DEPARTMENT
VARIANCE AND VARIANCE PERCENT
NEW QUERY
NEIL'S QUERY
NEIL'S OTHER QUERY
LARRY'S QUERY
YET ANOTHER LARRY QUERY

[ADD] [DEFINE]

FIG. 150

ADD OR EDIT SEQUENCE STEP INFORMATION
SEQUENCE NAME: INCOME STATEMENT ANALYSIS

| ID | STEP | DIRECTIVE TYPE | DIRECTIVE ID | LUB | LUD |
|----|------|----------------|--------------|-----|-----|
| 28 | 1 | QUERY DIRECTIVE | NEW QUERY ▶ | [DIRECTIVE] | |
| 28 | 2 | ANALYSIS DIRECTIVE ▶ | | 12/15/00 | [MOD] [DEFINE] |

QUERY DIRECTIVE
ANALYSIS DIRECTIVE
EVENT DIRECTIVE
DISTRIBUTION DIRECTIVE

ADD OR EDIT SEQUENCE STEP INFORMATION ← 1534

SEQUENCE NAME: INCOME STATEMENT ANALYSIS

| ID | ST | DIRECTIVE TYPE | DIRECTIVE ID | LUB | LUD | | |
|----|----|----|----|----|----|----|----|
| 28 | 1 | QUERY DIR | NEW QUERY ▶ | | 12/15/00 | MOD | DEFINE |
| 28 | 2 | ANALYSIS DIR | INCOME STMT ANALYSIS ▶ | NB | 12/15/00 | MOD | DEFINE |
| 28 | 3 | DISTRIBUTION DIRECTIVE ▶ | DIRECTIVE | | | | |

FIG. 15R

| HOME |  |  |  |  |  |
|---|---|---|---|---|---|
| INSTRUCTIONS | SCHEDULE SEQUENCES | | | | |
| SEQUENCES | SEQUENCE NAME | USER | SCHEDULE DESC | FREQ | PRIORITY |
| AVAILABLE | INCOME STAT'T ANALYSIS ▶ | LS | ISA FOR DEC '00 | IMMEDIATE ▶ | ADD |
| ADMIN | SELECT SEQUENCE TO VIEW | | | | |
| SYS SETTINGS | COST CENTER SCORING - PTD VARIANCE ▶ | | | VIEW | |
| USERS | | | | | |
| LOGS | | | | | |
| APPL SETTINGS | | | | | |
| MEDIA SETT'S | | | | | |

SCHEDULE SEQUENCES

| SEQUENCE NAME | USER | SCHEDULE DESC | FREQ | PRIORITY |
|---|---|---|---|---|
| INCOME STAT'T ANALYSIS ▶ | LS | ISA FOR DEC '00 | IMMEDIATE ▶ | ADD |
| | | | IMMEDIATE ONCE EXTRACT DAILY WEEKLY MONTHLY | |

SELECT SEQUENCE TO VIEW

COST CENTER SCORING - PTD VARIANCE ▶

SELECT SOURCE INFORMATION — SCHEDULE ENTRY

SEQUENCE: INCOME STATEMENT ANALYSIS

STEP: 1

QUERY: NEW QUERY

SOURCE NAME     PART

SOURCE SET    | OAS ▶ |

FILTER VALUES FOR QUERY
SEQUENCE: INCOME STATEMENT ANALYSIS
SCHEDULE: INCOME STATEMENT ANALYSIS FOR DECEMBER 2000
SEQUENCE STEP: 1
NEW QUERY

| TABLE NAME | COL NAME | OP | FILTER VALUE | | |
|---|---|---|---|---|---|
| BUDGET_D | BUDGET | IN | ACTUAL ▶ | MOD | |
| | | | CORPORATE 1997 ▶ | MOD | DEL |
| | | | ▶ | ADD | |
| PERIOD_D | PERIOD | = | DEC-2000 ▶ | MOD | |

IF YOU HAVE MADE CHANGES AND NOT SUBMITTED THEM USING THE ADD, MOD, OR DEL BUTTONS, THEY WILL NOT BE COMMITTED

[FINISHED]

SEQUENCE OUTPUT PRIVILEGES
SEQSCHED: 1815 INCOME STATEMENT ANALYSIS FOR DECEMBER 2000      [GROUPS]

| USER | ACCESS | FORMAT | ST | CS RESULT TAG | RESULT VALUE | OPT |
|---|---|---|---|---|---|---|
| NEILB ▼ | EMAIL_DATA ▼ | HTML ▼ | ▶ | | | [ADD] |
| NEILB | | | | | | |
| LARRYS | | | | | | |
| ERICH | | | | | | |
| MARC | | | | | | |
| SALES | | | | | | |
| MARKET | | | | | | |
| HQ | | | | | | |

IF YOU HAVE MADE CHANGES AND NOT SUBMITTED THEM USING THE ADD, MOD, OR DEL BUTTONS, THEY WILL NOT BE COMMITTED

[FINISHED]

SEQUENCE OUTPUT PRIVILEGES
SEQSCHED: 1815 INCOME STATEMENT ANALYSIS FOR DECEMBER 2000    [GROUPS]

| USER | ACCESS | FORMAT | ST | CS | RESULT TAG | RESULT VALUE | OPT |
|---|---|---|---|---|---|---|---|
| NEILB ▶ | EMAIL_DATA ▶ | HTML ▶ | ▶ | | | | [ADD] |
| | EMAIL_DATA | | | | | | |
| | EMAIL_URL | | | | | | |
| | WEB | | | | | | |
| | DESK_ALERT | | | | | | |

↙ 1552

IF YOU HAVE MADE CHANGES AND NOT SUBMITTED THEM USING THE ADD, MOD, OR DEL BUTTONS, THEY WILL NOT BE COMMITTED

[FINISHED]

FIG. 15Z

SEQUENCE OUTPUT PRIVILEGES
SEQSCHED: 1815 INCOME STATEMENT ANALYSIS FOR DECEMBER 2000

↗ 1554

[GROUPS]

| USER | ACCESS | FORMAT | ST | CSS RESULT TAG | RESULT VALUE | OPT |
|------|--------|--------|----|----|----|----|
| [NEILB ▼] | [EMAIL_DATA ▼] | [HTML ▼] | [▶] | | | [ADD] |
| | | HTML | 1 | 3 | | |
| | | WAP | 2 | | | |
| | | XML | | | | |
| | | EXCEL | | | | |
| | | PALM VII | | | | |
| | | PALM MAIL | | | | |

IF YOU HAVE MADE CHANGES AND NOT SUBMITTED THEM USING THE ADD, MOD, OR DEL BUTTONS, THEY WILL NOT BE COMMITTED

[FINISHED]

FIG. 15BB

SEQUENCE OUTPUT PRIVILEGES

SEQSCHED: 1815 INCOME STATEMENT ANALYSIS FOR DECEMBER 2000

SELECT

| | |
|---|---|
| ☐ | MAINTENANCE</VAL> |
| ☐ | MANUFACTURING</VAL> |
| ☐ | MANUFACTURING PLANT 1</VAL> |
| ☐ | MANUFACTURING PLANT 2</VAL> |
| ☐ | MARKETING</VAL> |
| ☒ | NON-PRODUCT SALES</VAL> |
| ☐ | ORDER ENTRY</VAL> |
| ☐ | PARENT TOTAL</VAL> |
| ☐ | PAYROLL</VAL> |
| ☒ | PRODUCT SALES</VAL> |
| ☐ | </SPLIT VALUES> |

FINISHED

SEQUENCE OUTPUT PRIVILEGES
SEQSCHED: 1815 INCOME STATEMENT ANALYSIS FOR DECEMBER 2000

↙ 1560

| CONDITION SUBSEQUENCE | RESULT TAG | RESULT VALUES |
|---|---|---|
| SUBSEQUENCE 2 ▶ | DEPARTMENT ▶ | `<?XML VERSION = "1.0"?>`<br>`<SPLIT VALUES>`<br>`<VAL>COMMERCIAL SALES</VAL>`<br>`<VAL? COMMUNICATIONS RESOURCES</VAL>`<br>`<VAL>EAST REGION SALES</VAL>`<br>`<VAL>FINANCES</VAL>`<br>`<VAL>GOVERNMENT SALES</VAL>`<br>`<VAL>NON-PRODUCT SALES</VAL>`<br>`<VAL>PRODUCT SALES</VAL>`<br>`</SPLIT VALUES>` |

[FINISHED]

FIG. 15DD

SEQUENCE OUTPUT PRIVILEGES　　GROUPS

SEQSCHED: 1815 INCOME STATEMENT ANALYSIS FOR DECEMBER 2000　　← 1562

| USER | ACCESS | FORMAT | ST | CSS RESULT TAG | RESULT VALUE | OPT |
|------|--------|--------|----|----|----|----|
| NEILB ▶ | EMAIL_DATA ▶ | HTML ▶ | ▶ | 3 | | ADD |
| NEILB | EMAIL_DATA ▶ | HTML ▶ | 2 ▶ | 2 | DEPARTME | MOD |
| | | | | | <?XML VERSION = | DEL |

IF YOU HAVE MADE CHANGES AND NOT SUBMITTED THEM USING THE ADD, MOD, OR DEL BUTTONS, THEY WILL NOT BE COMMITTED

FINISHED

FIG. 15EE

SCHEDULE SEQUENCES

1564

| SEQUENCE NAME | USER | SCHEDULE DESC | FREQ | PRIORITY |
|---|---|---|---|---|
| TEST SEQUENCE FOR PRIV ▼ | LS | | IMMEDIATE ▼ | ADD |

SELECT SEQUENCE TO VIEW

| TEST SEQUENCE FOR PRIVS AND STEPS ▼ | | VIEW | | |

TEST SEQUENCE FOR PRIVS AND STEPS
COST CENTER SCORING - PTD
COST CENTER SCORING - PTD VARIANCE
TEST VOAGE
AR - PTD REVUENUE BY DEPARTMENT
SOCCER SCORES
BUDGET VARIANCE SCORING
INCOME STATEMENT ANALYSIS

FIG. 15FF

SCHEDULE SEQUENCES 1566

| SEQUENCE NAME | USER | SCHEDULE DESC | FREQ | PRIORITY |
|---|---|---|---|---|
| TEST SEQUENCE FOR PRIV ▶ | LS | | IMMEDIATE ▶ | [ADD] |

SELECT SEQUENCE TO VIEW

TEST SEQUENCE FOR PRIVS AND STEPS ▶ [VIEW]

SEQUENCE: INCOME STATEMENT ANALYSIS USER: NB

| ID | DESCRIPTION | STATUS | FREQ | START | OPTIONS |
|---|---|---|---|---|---|
| 1815 | INCOME STAT'T ANALYSIS DEC 2001 | SCHED | DAILY ▶ | 23-APR-2001 08:30 PM | [MOD] [DEL] [PRIVILEGES] |

FIG. 16B

SEQUENCE PROPERTIES

1630

SEQUENCE NAME: PART QUANTITY SHORTAGES
DESCRIPTION: FINDS PART QUANTITY SHORTAGES
NOTES: SAVE THIS ONE

SEQUENCE AUTHOR: AUTHOR1
SEQUENCE STATUS: STATUS1

GLOBAL VARIABLES:

CAPTION: CONNECT STRING    NAME: CONNECT_STRING
VALUE: JDBC:ORACLE.THIN@123.245.23.1:1521:CONNECT30

CAPTION: DATABASE USER NAME    NAME: USER_NAME
VALUE: RRIC1234

CAPTION: DATABASE PASSWORD    NAME: USER_PWD
VALUE: SEQUENCE

CAPTION: OWNERNAME    NAME: OWNERNAME
VALUE: QRY_ANALYSIS

CAPTION: CURRENT PERIOD    NAME: CURPERIOD
VALUE: (1997-09) SEP-97

[OK]
[CANCEL]
[ADD VARIABLE]

FIG. 16C

DIRECTIVE PROPERTIES

ID: 108 DIRECTIVE NAME: (ADFILTER) ADVANCED FILTER — 1660

| ACTIVITY | INPUT | INPUT | INPUT |

PARAM NAME (FILTER_EXP) FILTER EXPRESSION

REQUIRED_QUANTITY# >200

DB3(52) RESULT DATA ▶

OK    CANCEL

```
<DF_DIRECTIVE_DEFINITION DIRECTIVE_ID="DB2" DIRECTIVE_NAME="DATA
DIRECTIVE" THREADING_EFFECT="SPLIT" DIRECTIVE_DESC="SQL
DATADIRECTIVE THAT SPLITS RESULTS ON GIVEN COLUMN"
DIRECTIVE_VENDOR="DPA" DIRECTIVE_VERSION="1"
DIRECTIVE_CATEGORY="DPA-MISC">
    <DEPLOYMENT SERVICE="DPA_DIRECTIVE_MGR" MACHINE="SKUNKNT4"
PORT="9070"/>
    <IN_PARAMETERS>
      <PARAMETER PARAM_TYPE="IN" PARAM_CAPTION="SQL"
PARAM_DATA_TYPE="STRING" PARAM_NAME="SQL"/>
      <PARAMETER PARAM_TYPE="IN" PARAM_CAPTION="COLUMN TO SPLIT"
PARAM_DATA_TYPE="STRING" PARAM_NAME="SPLIT_COLUMN"/>
      <PARAMETER PARAM_TYPE="IN" PARAM_CAPTION="CONNECTION
STRING" PARAM_DATA_TYPE="STRING"
PARAM_NAME="CONNECTION_STRING"/>
      <PARAMETER PARAM_TYPE="IN" PARAM_CAPTION="DATABASE USER
NAME" PARAM_DATA_TYPE="STRING" PARAM_NAME="USERNAME"/>
      <PARAMETER PARAM_TYPE="IN" PARAM_CAPTION="DATABASE
PASSWORD" PARAM_DATA_TYPE="STRING" PARAM_NAME="PWD"/>
    </IN_PARAMETERS>
    <OUT_PARAMETERS>
      <PARAMETER PARAM_TYPE="OUT" PARAM_CAPTION="RESULT DATA"
PARAM_DATA_TYPE="STRING" PARAM_NAME="RESULTSET"/>
      <PARAMETER PARAM_TYPE="OUT" PARAM_CAPTION="RESULT
METADATA" PARAM_DATA_TYPE="STRING"
PARAM_NAME="RESULTMETADATA"/>
      <PARAMETER PARAM_TYPE="OUT" PARAM_CAPTION="SPLIT VALUE"
PARAM_DATA_TYPE="STRING" PARAM_NAME="SPLITVALUE"/>
    </OUT_PARAMETERS>
  </DF_DIRECTIVE_DEFINITION>
```

```
- <DF_DIRECTIVE_DEFINITION_LIST>
- <DF_DIRECTIVE_DEFINITION DIRECTIVE_ID="SB1"
DIRECTIVE_NAME="SCHEDULER" DIRECTIVE_CATEGORY="DPA-MISC"
THREADING_EFFECT="SPLIT" DIRECTIVE_DESC="SCHEDULE DIRECTIVE"
DIRECTIVE_VENDOR="DPA" DIRECTIVE_VERSION="1">
- <!-- CAN ADD A TYPE OR ICON NAME
-->
- <IN_PARAMETERS>
  <PARAMETER PARAM_TYPE="IN" PARAM_CAPTION="FREQUENCY"
PARAM_DATA_TYPE="STRING" PARAM_NAME="FREQUENCY" />
  </IN_PARAMETERS>
  <OUT_PARAMETERS />
  <DEPLOYMENT SERVICE="DPA_DIRECTIVE_MGR" MACHINE="SKUNKNT4"
PORT="9070" />
  </DF_DIRECTIVE_DEFINITION>
- <DF_DIRECTIVE_DEFINITION DIRECTIVE_ID="DB2" DIRECTIVE_NAME="DATA
DIRECTIVE" THREADING_EFFECT="SPLIT" DIRECTIVE_DESC="SQL
DATADIRECTIVE THAT SPLITS RESULTS ON GIVEN COLUMN"
DIRECTIVE_VENDOR="DPA" DIRECTIVE_VERSION="1"
DIRECTIVE_CATEGORY="DPA-MISC">
  <DEPLOYMENT SERVICE="DPA_DIRECTIVE_MGR" MACHINE="SKUNKNT4"
PORT="9070" />
- <IN_PARAMETERS>
  <PARAMETER PARAM_TYPE="IN" PARAM_CAPTION="SQL"
PARAM_DATA_TYPE="STRING" PARAM_NAME="SQL" />
  <PARAMETER PARAM_TYPE="IN" PARAM_CAPTION="COLUMN TO SPLIT"
PARAM_DATA_TYPE="STRING" PARAM_NAME="SPLIT_COLUMN" />
  <PARAMETER PARAM_TYPE="IN" PARAM_CAPTION="CONNECTION STRING"
PARAM_DATA_TYPE="STRING" PARAM_NAME="CONNECTION_STRING" />
  <PARAMETER PARAM_TYPE="IN" PARAM_CAPTION="DATABASE USER NAME"
PARAM_DATA_TYPE="STRING" PARAM_NAME="USERNAME" />
  <PARAMETER PARAM_TYPE="IN" PARAM_CAPTION="DATABASE PASSWORD"
PARAM_DATA_TYPE="STRING" PARAM_NAME="PWD" />
  </IN_PARAMETERS>
```

```xml
-<OUT_PARAMETERS>
  <PARAMETER PARAM_TYPE="OUT" PARAM_CAPTION="RESULT DATA" PARAM_DATA_TYPE="STRING" PARAM_NAME="RESULTSET" />
  <PARAMETER PARAM_TYPE="OUT" PARAM_CAPTION="RESULT METADATA" PARAM_DATA_TYPE="STRING" PARAM_NAME="RESULTMETADATA" />
  <PARAMETER PARAM_TYPE="OUT" PARAM_CAPTION="SPLIT VALUE" PARAM_DATA_TYPE="STRING" PARAM_NAME="SPLITVALUE" />
  </OUT_PARAMETERS>
  </DF_DIRECTIVE_DEFINITION>
- <DF_DIRECTIVE_DEFINITION DIRECTIVE_ID="AB1" DIRECTIVE_NAME="TOPX FILTER" THREADING_EFFECT="STANDARD" DIRECTIVE_DESC="FILTER OUT TOP X ROWS FROM RESULTSET" DIRECTIVE_VENDOR="DPA" DIRECTIVE_VERSION="1" DIRECTIVE_CATEGORY="DPA-MISC">
  <DEPLOYMENT SERVICE="DPA_DIRECTIVE_MGR" MACHINE="SKUNKNT4" PORT="9070" />
- <IN_PARAMETERS>
  <PARAMETER PARAM_TYPE="IN" PARAM_CAPTION="RESULT SET METADATA" PARAM_DATA_TYPE="STRING" PARAM_NAME="RESULTMETADATA" />
  <PARAMETER PARAM_TYPE="IN" PARAM_CAPTION="RESULT SET" PARAM_DATA_TYPE="STRING" PARAM_NAME="RESULTSET" />
  <PARAMETER PARAM_TYPE="IN" PARAM_CAPTION="COLUMN POSITION FOR TOPX" PARAM_DATA_TYPE="STRING" PARAM_NAME="TOPX_COLUMN" />
  </IN_PARAMETERS>
- <OUT_PARAMETERS>
  <PARAMETER PARAM_TYPE="OUT" PARAM_CAPTION="RESULT DATA" PARAM_DATA_TYPE="STRING" PARAM_NAME="RESULTSET" />
  <PARAMETER PARAM_TYPE="OUT" PARAM_CAPTION="RESULT METADATA" PARAM_DATA_TYPE="STRING" PARAM_NAME="RESULTMETADATA" />
  </OUT_PARAMETERS>
  </DF_DIRECTIVE_DEFINITION>
- <DF_DIRECTIVE_DEFINITION DIRECTIVE_ID="AB2" DIRECTIVE_NAME="APPENDER" DIRECTIVE_TYPE="" THREADING_EFFECT="JOIN" DIRECTIVE_DESC="REJOIN SPLIT RESULTSETS" DIRECTIVE_VENDOR="DPA" DIRECTIVE_VERSION="1" DIRECTIVE_CATEGORY="DPA-MISC">
  <DEPLOYMENT SERVICE="DPA_DIRECTIVE_MGR" MACHINE="SKUNKNT4" PORT="9070" />
- <IN_PARAMETERS>
  <PARAMETER PARAM_TYPE="IN" PARAM_CAPTION="RESULT SET METADATA" PARAM_DATA_TYPE="STRING" PARAM_NAME="RESULTMETADATA" />
  <PARAMETER PARAM_TYPE="IN" PARAM_CAPTION="RESULT SET" PARAM_DATA_TYPE="STRING" PARAM_NAME="RESULTSET" />
  </IN_PARAMETERS>
```

```xml
- <OUT_PARAMETERS>
  <PARAMETER PARAM_TYPE="OUT" PARAM_CAPTION="RESULT DATA" PARAM_DATA_TYPE="STRING" PARAM_NAME="RESULTSET" />
  <PARAMETER PARAM_TYPE="OUT" PARAM_CAPTION="RESULT METADATA" PARAM_DATA_TYPE="STRING" PARAM_NAME="RESULTMETADATA" />
  </OUT_PARAMETERS>
  </DF_DIRECTIVE_DEFINITION>
- <DF_DIRECTIVE_DEFINITION DIRECTIVE_ID="MB1" DIRECTIVE_NAME="EMAIL RESULTS" THREADING_EFFECT="STANDARD" DIRECTIVE_TYPE="" DIRECTIVE_DESC="SIMPLE EMAIL DIRECTIVE" DIRECTIVE_VENDOR="DPA" DIRECTIVE_VERSION="1" DIRECTIVE_CATEGORY="DPA-MISC">
  <DEPLOYMENT SERVICE="DPA_DIRECTIVE_MGR" MACHINE="SKUNKNT4" PORT="9070" />
- <IN_PARAMETERS>
  <PARAMETER PARAM_TYPE="IN" PARAM_CAPTION="EMAIL ADDRESS LIST" PARAM_DATA_TYPE="STRING" PARAM_NAME="MAILADR" />
  <PARAMETER PARAM_TYPE="IN" PARAM_CAPTION="SUBJECT LINE" PARAM_DATA_TYPE="STRING" PARAM_NAME="SUBJECT" />
  <PARAMETER PARAM_TYPE="IN" PARAM_CAPTION="MESSAGE DATA" PARAM_DATA_TYPE="STRING" PARAM_NAME="MESSAGE" />
  </IN_PARAMETERS>
  <OUT_PARAMETERS />
  </DF_DIRECTIVE_DEFINITION>
- <DF_DIRECTIVE_DEFINITION DIRECTIVE_ID="CRB1" DIRECTIVE_NAME="CLEAR STORED RESULTS" THREADING_EFFECT="STANDARD" DIRECTIVE_TYPE="" DIRECTIVE_DESC="REMOVE PREVIOUS RESULT SETS FROM REPOSITORY" DIRECTIVE_VENDOR="DPA" DIRECTIVE_VERSION="1" DIRECTIVE_CATEGORY="DPA-MISC">
  <DEPLOYMENT SERVICE="DPA_DIRECTIVE_MGR" MACHINE="SKUNKNT4" PORT="9070" />
- <IN_PARAMETERS>
  <PARAMETER PARAM_TYPE="IN" PARAM_CAPTION="OWNER ID" PARAM_DATA_TYPE="STRING" PARAM_NAME="OWNERID" />
  <PARAMETER PARAM_TYPE="IN" PARAM_CAPTION="RESULTNAME" PARAM_DATA_TYPE="STRING" PARAM_NAME="RESULTNAME" />
  </IN_PARAMETERS>
  <OUT_PARAMETERS />
  </DF_DIRECTIVE_DEFINITION>
```

```
- <DF_DIRECTIVE_DEFINITION DIRECTIVE_ID="CRC1" DIRECTIVE_NAME="CLEAR
PUBLISHED PAGES" THREADING_EFFECT="STANDARD" DIRECTIVE_TYPE=""
DIRECTIVE_DESC="REMOVE PREVIOUS PUBLISHED PAGES FROM
REPOSITORY" DIRECTIVE_VENDOR="DPA" DIRECTIVE_VERSION="1"
DIRECTIVE_CATEGORY="DPA-MISC">
  <DEPLOYMENT SERVICE="DPA_DIRECTIVE_MGR" MACHINE="SKUNKNT4"
PORT="9070" />
- <IN_PARAMETERS>
  <PARAMETER PARAM_TYPE="IN" PARAM_CAPTION="OWNERID"
PARAM_DATA_TYPE="STRING" PARAM_NAME="OWNERID" />
  <PARAMETER PARAM_TYPE="IN" PARAM_CAPTION="PAGE NAME"
PARAM_DATA_TYPE="STRING" PARAM_NAME="PAGENAME" />
  </IN_PARAMETERS>
  <OUT_PARAMETERS />
  </DF_DIRECTIVE_DEFINITION>
- <DF_DIRECTIVE_DEFINITION DIRECTIVE_ID="SR1" DIRECTIVE_NAME="SAVE
RESULTS" THREADING_EFFECT="STANDARD" DIRECTIVE_TYPE=""
DIRECTIVE_DESC="SAVES RESULTS TO REPOSITORY"
DIRECTIVE_VENDOR="DPA" DIRECTIVE_VERSION="1"
DIRECTIVE_CATEGORY="DPA-MISC">
  <DEPLOYMENT SERVICE="DPA_DIRECTIVE_MGR" MACHINE="SKUNKNT4"
PORT="9070" />
- <IN_PARAMETERS>
  <PARAMETER PARAM_TYPE="IN" PARAM_CAPTION="RESULT SET OWNER"
PARAM_DATA_TYPE="STRING" PARAM_NAME="OWNER" />
  <PARAMETER PARAM_TYPE="IN" PARAM_CAPTION="RESULT SET"
PARAM_DATA_TYPE="STRING" PARAM_NAME="RESULTSET" />
  <PARAMETER PARAM_TYPE="IN" PARAM_CAPTION="RESULT SET METADATA"
PARAM_DATA_TYPE="STRING" PARAM_NAME="RESULTMETADATA" />
  <PARAMETER PARAM_TYPE="IN" PARAM_CAPTION="RESULT SET NAME"
PARAM_DATA_TYPE="STRING" PARAM_NAME="RESULTNAME" />
  </IN_PARAMETERS>
- <OUT_PARAMETERS>
  <PARAMETER PARAM_TYPE="OUT" PARAM_CAPTION="RESULTSET ID"
PARAM_DATA_TYPE="STRING" PARAM_NAME="RESULTSETID" />
  </OUT_PARAMETERS>
  </DF_DIRECTIVE_DEFINITION>
```

```
- <DF_DIRECTIVE_DEFINITION DIRECTIVE_ID="CR2" DIRECTIVE_NAME="PUBLISH
PAGE" THREADING_EFFECT="STANDARD" DIRECTIVE_TYPE=""
DIRECTIVE_DESC="PUBLISHES PAGE & GRANTS SECURITY"
DIRECTIVE_VENDOR="DPA" DIRECTIVE_VERSION="1"
DIRECTIVE_CATEGORY="DPA-MISC">
  <DEPLOYMENT SERVICE="DPA_DIRECTIVE_MGR" MACHINE="SKUNKNT4"
PORT="9070" />
- <IN_PARAMETERS>
  <PARAMETER PARAM_TYPE="IN" PARAM_CAPTION="GRANT SECURITY LIST"
PARAM_DATA_TYPE="STRING" PARAM_NAME="SECDOC" />
  <PARAMETER PARAM_TYPE="IN" PARAM_CAPTION="METADATA FOR SECDOC"
PARAM_DATA_TYPE="STRING" PARAM_NAME="SECMETA" />
  <PARAMETER PARAM_TYPE="IN" PARAM_CAPTION="GRANT SECURITY LIST"
PARAM_DATA_TYPE="STRING" PARAM_NAME="SECCOLNAME" />
  <PARAMETER PARAM_TYPE="IN" PARAM_CAPTION="PAGE OWNER"
PARAM_DATA_TYPE="STRING" PARAM_NAME="OWNER" />
  <PARAMETER PARAM_TYPE="IN" PARAM_CAPTION="PAGE NAME"
PARAM_DATA_TYPE="STRING" PARAM_NAME="PAGENAME" />
  <PARAMETER PARAM_TYPE="IN" PARAM_CAPTION="PAGE SLICE NAME"
PARAM_DATA_TYPE="STRING" PARAM_NAME="PAGESLICENAME" />
  <PARAMETER PARAM_TYPE="IN" PARAM_CAPTION="PAGE DEFINITION"
PARAM_DATA_TYPE="STRING" PARAM_NAME="PAGEDEFN" />
  <PARAMETER PARAM_TYPE="IN" PARAM_CAPTION="IN RESULTS KEY"
PARAM_DATA_TYPE="STRING" PARAM_NAME="P1" />
  <PARAMETER PARAM_TYPE="IN" PARAM_CAPTION="IN RESULTS KEY"
PARAM_DATA_TYPE="STRING" PARAM_NAME="P2" />
  <PARAMETER PARAM_TYPE="IN" PARAM_CAPTION="IN RESULTS KEY"
PARAM_DATA_TYPE="STRING" PARAM_NAME="P3" />
  <PARAMETER PARAM_TYPE="IN" PARAM_CAPTION="IN RESULTS KEY"
PARAM_DATA_TYPE="STRING" PARAM_NAME="P4" />
  <PARAMETER PARAM_TYPE="IN" PARAM_CAPTION="IN RESULTS KEY"
PARAM_DATA_TYPE="STRING" PARAM_NAME="P5" />
  <PARAMETER PARAM_TYPE="IN" PARAM_CAPTION="IN RESULTS KEY"
PARAM_DATA_TYPE="STRING" PARAM_NAME="P6" />
  </IN_PARAMETERS>
```

FIG. 19F

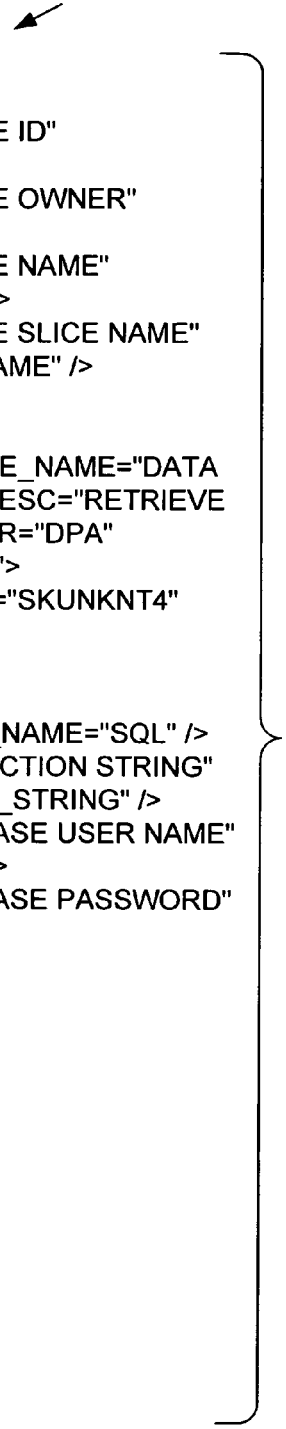

1906

```
- <OUT_PARAMETERS>
  <PARAMETER PARAM_TYPE="OUT" PARAM_CAPTION="PAGE ID"
PARAM_DATA_TYPE="STRING" PARAM_NAME="PAGEID" />
  <PARAMETER PARAM_TYPE="OUT" PARAM_CAPTION="PAGE OWNER"
PARAM_DATA_TYPE="STRING" PARAM_NAME="OWNER" />
  <PARAMETER PARAM_TYPE="OUT" PARAM_CAPTION="PAGE NAME"
PARAM_DATA_TYPE="STRING" PARAM_NAME="PAGENAME" />
  <PARAMETER PARAM_TYPE="OUT" PARAM_CAPTION="PAGE SLICE NAME"
PARAM_DATA_TYPE="STRING" PARAM_NAME="PAGESLICENAME" />
  </OUT_PARAMETERS>
  </DF_DIRECTIVE_DEFINITION>
- <DF_DIRECTIVE_DEFINITION DIRECTIVE_ID="DB3" DIRECTIVE_NAME="DATA
DIRECTIVE" THREADING_EFFECT="STANDARD" DIRECTIVE_DESC="RETRIEVE
DATA AND ASSEMBLE INTO RESULT SET" DIRECTIVE_VENDOR="DPA"
DIRECTIVE_VERSION="1" DIRECTIVE_CATEGORY="DPA-MISC">
  <DEPLOYMENT SERVICE="DPA_DIRECTIVE_MGR" MACHINE="SKUNKNT4"
PORT="9070" />
- <IN_PARAMETERS>
  <PARAMETER PARAM_TYPE="IN" PARAM_CAPTION="SQL"
PARAM_DATA_TYPE="PARAMITERIZED SQL STRING" PARAM_NAME="SQL" />
  <PARAMETER PARAM_TYPE="IN" PARAM_CAPTION="CONNECTION STRING"
PARAM_DATA_TYPE="STRING" PARAM_NAME="CONNECTION_STRING" />
  <PARAMETER PARAM_TYPE="IN" PARAM_CAPTION="DATABASE USER NAME"
PARAM_DATA_TYPE="STRING" PARAM_NAME="USERNAME" />
  <PARAMETER PARAM_TYPE="IN" PARAM_CAPTION="DATABASE PASSWORD"
PARAM_DATA_TYPE="STRING" PARAM_NAME="PWD" />
  <PARAMETER PARAM_TYPE="IN" PARAM_CAPTION="P1"
PARAM_DATA_TYPE="STRING" PARAM_NAME="P1" />
  <PARAMETER PARAM_TYPE="IN" PARAM_CAPTION="P2"
PARAM_DATA_TYPE="STRING" PARAM_NAME="P2" />
  <PARAMETER PARAM_TYPE="IN" PARAM_CAPTION="P3"
PARAM_DATA_TYPE="STRING" PARAM_NAME="P3" />
  <PARAMETER PARAM_TYPE="IN" PARAM_CAPTION="P4"
PARAM_DATA_TYPE="STRING" PARAM_NAME="P4" />
  <PARAMETER PARAM_TYPE="IN" PARAM_CAPTION="P5"
PARAM_DATA_TYPE="STRING" PARAM_NAME="P5" />
  </IN_PARAMETERS>
```

```xml
- <OUT_PARAMETERS>
  <PARAMETER PARAM_TYPE="OUT" PARAM_CAPTION="RESULT DATA" PARAM_DATA_TYPE="STRING" PARAM_NAME="RESULTSET" />
  <PARAMETER PARAM_TYPE="OUT" PARAM_CAPTION="RESULT METADATA" PARAM_DATA_TYPE="STRING" PARAM_NAME="RESULTMETADATA" />
  </OUT_PARAMETERS>
  </DF_DIRECTIVE_DEFINITION>
- <DF_DIRECTIVE_DEFINITION DIRECTIVE_ID="MB2" DIRECTIVE_NAME="SMTP EMAIL DIRECTIVE" THREADING_EFFECT="STANDARD" DIRECTIVE_TYPE="" DIRECTIVE_DESC="SEND PUBLISHED PAGES" DIRECTIVE_VENDOR="DPA" DIRECTIVE_VERSION="1" DIRECTIVE_CATEGORY="DPA-MISC">
  <DEPLOYMENT SERVICE="DPA_DIRECTIVE_MGR" MACHINE="SKUNKNT4" PORT="9070" />
- <IN_PARAMETERS>
  <PARAMETER PARAM_TYPE="IN" PARAM_CAPTION="EMAIL ADDRESSES" PARAM_DATA_TYPE="STRING" PARAM_NAME="ADDRDOC" />
  <PARAMETER PARAM_TYPE="IN" PARAM_CAPTION="METADATA FOR ADDRDOC" PARAM_DATA_TYPE="STRING" PARAM_NAME="ADDRMETA" />
  <PARAMETER PARAM_TYPE="IN" PARAM_CAPTION="EMAIL COLUMN NAME" PARAM_DATA_TYPE="STRING" PARAM_NAME="ADDRCOLNAME" />
  <PARAMETER PARAM_TYPE="IN" PARAM_CAPTION="EMAIL COLUMN NAME" PARAM_DATA_TYPE="STRING" PARAM_NAME="IDCOLNAME" />
  <PARAMETER PARAM_TYPE="IN" PARAM_CAPTION="SUBJECT" PARAM_DATA_TYPE="STRING" PARAM_NAME="SUBJECT" />
  <PARAMETER PARAM_TYPE="IN" PARAM_CAPTION="PAGE OWNER" PARAM_DATA_TYPE="STRING" PARAM_NAME="OWNER" />
  <PARAMETER PARAM_TYPE="IN" PARAM_CAPTION="PAGE NAME" PARAM_DATA_TYPE="STRING" PARAM_NAME="PAGENAME" />
  <PARAMETER PARAM_TYPE="IN" PARAM_CAPTION="PAGE INSTANCE" PARAM_DATA_TYPE="STRING" PARAM_NAME="PAGEINST" />
  <PARAMETER PARAM_TYPE="IN" PARAM_CAPTION="MAIL FORMAT" PARAM_DATA_TYPE="STRING" PARAM_NAME="FORMAT" />
  <PARAMETER PARAM_TYPE="IN" PARAM_CAPTION="SEND FROM MAIL ADDRESS" PARAM_DATA_TYPE="STRING" PARAM_NAME="SENDFROM" />
  </IN_PARAMETERS>
```

FIG. 19H

<sub>1908</sub>

```
- <OUT_PARAMETERS>
   <PARAMETER PARAM_TYPE="OUT" PARAM_CAPTION="ERROR MESSAGES"
 PARAM_DATA_TYPE="STRING" PARAM_NAME="ERROR_MSG" />
   </OUT_PARAMETERS>
   </DF_DIRECTIVE_DEFINITION>
- <DF_DIRECTIVE_DEFINITION DIRECTIVE_ID="ABFILTER"
 DIRECTIVE_NAME="ADVANCED FILTER" THREADING_EFFECT="STANDARD"
 DIRECTIVE_TYPE="" DIRECTIVE_DESC="FILTER RESULTS"
 DIRECTIVE_VENDOR="DPA" DIRECTIVE_VERSION="1"
 DIRECTIVE_CATEGORY="DPA-MISC">
   <DEPLOYMENT SERVICE="DPA_DIRECTIVE_MGR" MACHINE="SKUNKNT4"
 PORT="9070" />
- <IN_PARAMETERS>
   <PARAMETER PARAM_TYPE="IN" PARAM_CAPTION="FILTER EXPRESSION"
 PARAM_DATA_TYPE="STRING" PARAM_NAME="FILTER_EXP" />
   <PARAMETER PARAM_TYPE="IN" PARAM_CAPTION="RESULTS METADATA"
 PARAM_DATA_TYPE="STRING" PARAM_NAME="METADOC" />
   <PARAMETER PARAM_TYPE="IN" PARAM_CAPTION="RESULTS"
 PARAM_DATA_TYPE="STRING" PARAM_NAME="RESULTSDOC" />
   </IN_PARAMETERS>
- <OUT_PARAMETERS>
   <PARAMETER PARAM_TYPE="OUT" PARAM_CAPTION="RESULTS METADATA"
 PARAM_DATA_TYPE="STRING" PARAM_NAME="METADOC" />
   <PARAMETER PARAM_TYPE="OUT" PARAM_CAPTION="RESULTS"
 PARAM_DATA_TYPE="STRING" PARAM_NAME="RESULTSDOC" />
   <PARAMETER PARAM_TYPE="OUT" PARAM_CAPTION="ROW COUNT"
 PARAM_DATA_TYPE="STRING" PARAM_NAME="ROWCOUNT" />
   </OUT_PARAMETERS>
   </DF_DIRECTIVE_DEFINITION>
- <DF_DIRECTIVE_DEFINITION DIRECTIVE_ID="TEXTEMAILER"
 DIRECTIVE_NAME="TEXT EMAILER" THREADING_EFFECT="STANDARD"
 DIRECTIVE_TYPE="" DIRECTIVE_DESC="TEXT EMAILER"
 DIRECTIVE_VENDOR="DPA" DIRECTIVE_VERSION="1"
 DIRECTIVE_CATEGORY="DPA-MISC">
   <DEPLOYMENT SERVICE="DPA_DIRECTIVE_MGR" MACHINE="SKUNKNT4"
 PORT="9070" />
```

```xml
-<IN_PARAMETERS>
  <PARAMETER PARAM_TYPE="IN" PARAM_CAPTION="SUBJECT EXPRESSION" PARAM_DATA_TYPE="STRING" PARAM_NAME="SUBJECT_EXP" />
  <PARAMETER PARAM_TYPE="IN" PARAM_CAPTION="MESSAGE EXPRESSION" PARAM_DATA_TYPE="STRING" PARAM_NAME="MESSAGE_EXP" />
  <PARAMETER PARAM_TYPE="IN" PARAM_CAPTION="EMAIL ADDRESSES" PARAM_DATA_TYPE="STRING" PARAM_NAME="EMAIL_ADDRESSES" />
  <PARAMETER PARAM_TYPE="IN" PARAM_CAPTION="SEND FROM ADDRESS" PARAM_DATA_TYPE="STRING" PARAM_NAME="FROM_ADDRESS" />
  <PARAMETER PARAM_TYPE="IN" PARAM_CAPTION="RESULTS METADATA" PARAM_DATA_TYPE="STRING" PARAM_NAME="METADOC" />
  <PARAMETER PARAM_TYPE="IN" PARAM_CAPTION="RESULTS" PARAM_DATA_TYPE="STRING" PARAM_NAME="RESULTSDOC" />
</IN_PARAMETERS>
-<OUT_PARAMETERS>
  <PARAMETER PARAM_TYPE="OUT" PARAM_CAPTION="ERROR MESSAGES" PARAM_DATA_TYPE="STRING" PARAM_NAME="ERROR" />
</OUT_PARAMETERS>
</DF_DIRECTIVE_DEFINITION>
</DF_DIRECTIVE_DEFINITION_LIST>
```

```
-<RESULTS_DOC>
-<DP_QUERY_DEF VERSION="1">
 <DPA_IDENTIFIERS DATA_SET="NW" WH_OWNER_NAME="RROC" />
 <HINTS />
-<COLUMN_DEFS>
 <COLUMN_DEF COLUMN_SORT_ATTRIBUTE="NONE"
COLUMN_TEXT="VENDOR_NAME" TABLE_ALIAS="VENDOR_D"
COLUMN_NAME="VENDOR_NAME" COLUMN_ALIAS="VENDOR_NAME"
COLUMN_SORT_ORDER="1" COLUMN_POSITION="1"
COLUMN_TYPE="GROUP_BY" />
 <COLUMN_DEF COLUMN_SORT_ATTRIBUTE="NONE"
COLUMN_TEXT="PERIOD_KEY" TABLE_ALIAS="AP_INV_DETAIL_F"
COLUMN_NAME="PERIOD_KEY" COLUMN_ALIAS="PERIOD_KEY"
COLUMN_SORT_ORDER="2" COLUMN_POSITION="2"
COLUMN_TYPE="GROUP_BY" />
 <COLUMN_DEF COLUMN_SORT_ATTRIBUTE="DESC"
COLUMN_TEXT="SUM(AP_INV_DETAIL_F.INVOICE_LINE_AMOUNT)"
TABLE_ALIAS="AP_INV_DETAIL_F"
COLUMN_NAME="INVOICE_LINE_AMOUNT"
COLUMN_ALIAS="SUM_INVOICE_LINE_AMOUNT"
COLUMN_SORT_ORDER="3" COLUMN_POSITION="3"
COLUMN_TYPE="AGGREGATE" />
 </COLUMN_DEFS>
-<TABLE_DEFS>
 <TABLE_DEF TABLE_ALIAS="AP_INV_DETAIL_F"
TABLE_NAME="AP_INV_DETAIL_F" />
 <TABLE_DEF TABLE_ALIAS="VENDOR_D" TABLE_NAME="VENDOR_D" /
>
 </TABLE_DEFS>
-<DETAIL_FILTERS>
-<FILTER FILTER_TYPE="VALUE" COLUMN_TEXT="VENDOR_TYPE"
TABLE_ALIAS="VENDOR_D" FILTER_PREC_OPER="AND"
FILTER_OPERATOR="=">
 <FILTER_VALUE VALUE_DATA_TYPE="STRING">EMPLOYEE</
FILTER_VALUE>
 </FILTER>
```

```
- <FILTER FILTER_TYPE="VALUE" COLUMN_TEXT="COMPANY_KEY"
TABLE_ALIAS="AP_INV_DETAIL_F" FILTER_PREC_OPER="AND"
FILTER_OPERATOR="=">
  <FILTER_VALUE VALUE_DATA_TYPE="STRING">01</FILTER_VALUE>
  </FILTER>
  </DETAIL_FILTERS>
- <AGGREGATE_FILTERS>
- <FILTER FILTER_TYPE="VALUE"
COLUMN_TEXT="SUM(INVOICE_LINE_AMOUNT)"
TABLE_ALIAS="AP_INV_DETAIL_F" FILTER_PREC_OPER="AND"
FILTER_OPERATOR=">">
  <FILTER_VALUE VALUE_DATA_TYPE="NUMBER">0</FILTER_VALUE>
  </FILTER>
  </AGGREGATE_FILTERS>
  </DP_QUERY_DEF>
  <DPA_QUERY_SERVER_INFO SERVICE="DPA_QUERY_SERVER"
MACHINE="EXH_2K" PORT="8069"
WAREHOUSE_SERVER="HD.DPAPPLICATIONS.COM"
WAREHOUSE_DBNAME="DEMO30"
WAREHOUSE_OWNER="RROC">FOODADDY</
DPA_QUERY_SERVER_INFO>
- <DP_DS_METADATA>
  <DP_COLUMN COLUMN_NAME="VENDOR_NAME"
COLUMN_DATA_TYPE="VARCHAR2" COLUMN_DS_ALIAS="C1"
COLUMN_TYPE="GROUP_BY" COLUMN_SORT_ATTRIBUTE="NONE"
COLUMN_SOURCE_ALIAS="VENDOR_NAME"
COLUMN_LABEL="VENDOR NAME" COLUMN_DESC=""
COLUMN_IS_CURRENCY="N" />
  <DP_COLUMN COLUMN_NAME="PERIOD_KEY"
COLUMN_DATA_TYPE="VARCHAR2" COLUMN_DS_ALIAS="C2"
COLUMN_TYPE="GROUP_BY" COLUMN_SORT_ATTRIBUTE="NONE"
COLUMN_SOURCE_ALIAS="PERIOD_KEY" COLUMN_LABEL="PERIOD
KEY" COLUMN_DESC="" COLUMN_IS_CURRENCY="N" />
  <DP_COLUMN COLUMN_NAME="SUM_INVOICE_LINE_AMOUNT"
COLUMN_DATA_TYPE="NUMBER" COLUMN_DS_ALIAS="C3"
COLUMN_TYPE="AGGREGATE" COLUMN_SORT_ATTRIBUTE="DESC"
COLUMN_SOURCE_ALIAS="SUM_INVOICE_LINE_AMOUNT"
COLUMN_LABEL="INVOICE LINE AMOUNT" COLUMN_DESC=""
COLUMN_IS_CURRENCY="Y" />
```

FIG. 20C

```
</DP_DS_METADATA>
- <DP_DS>
- <R>
  <C1>JAMIE FROST</C1>
  <C2>DEC-97</C2>
  <C3>28159</C3>
  </R>
- <R>
  <C1>JAMIE FROST</C1>
  <C2>JAN-98</C2>
  <C3>15114.76</C3>
  </R>
- <R>
  <C1>JAMIE FROST</C1>
  <C2>FEB-98</C2>
  <C3>4417.86</C3>
  </R>
- <R>
  <C1>KERRY JONES</C1>
  <C2>APR-98</C2>
  <C3>3439.10</C3>
  </R>
- <R>
  <C1>KERRY JONES</C1>
  <C2>DEC-97</C2>
  <C3>3263</C3>
  </R>
- <R>
  <C1>JAMIE FROST</C1>
  <C2>NOV-97</C2>
  <C3>2907.85</C3>
  </R>
- <R>
  <C1>KERRY JONES</C1>
  <C2>FEB-98</C2>
  <C3>2799.31</C3>
  </R>
```

```
- <R>
  <C1>KERRY JONES</C1>
  <C2>MAY-98</C2>
  <C3>2698.64</C3>
  </R>
- <R>
  <C1>JAMIE FROST</C1>
  <C2>APR-98</C2>
  <C3>2657.20</C3>
  </R>
- <R>
  <C1>JAMIE FROST</C1>
  <C2>MAY-98</C2>
  <C3>2549.68</C3>
  </R>
- <R>
  <C1>KERRY JONES</C1>
  <C2>MAR-98</C2>
  <C3>2511.98</C3>
  </R>
- <R>
  <C1>JAMIE FROST</C1>
  <C2>MAR-98</C2>
  <C3>2459.87</C3>
  </R>
- <R>
  <C1>JAMIE FROST</C1>
  <C2>JUN-98</C2>
  <C3>2219.90</C3>
  </R>
- <R>
  <C1>KERRY JONES</C1>
  <C2>JUN-98</C2>
  <C3>2182.29</C3>
  </R>
- <R>
  <C1>KERRY JONES</C1>
  <C2>JAN-98</C2>
  <C3>1516</C3>
  </R>
```

```
-<R>
 <C1>BLACK, CHRIS</C1>
 <C2>NOV-97</C2>
 <C3>651.06</C3>
 </R>
 </DP_DS>
 </RESULTS_DOC>
```

```
- <DF_WORKFLOW VERSION="1">
  <DF_WORKFLOW_HEADER DF_EDITOR_MAX_ID="172" FLOW_NAME="QTY
ANALYSIS" FLOW_DESCRIPTION="QTY ANALYSIS FLOW" FLOW_STATUS="FLOW
STATUS" FLOW_NOTES="" FLOW_AUTHOR="FLOW AUTHOR" />
- <DF_WORKFLOW_PARAMETERS>
- <PARAMETER NODE_ID="13" PARAM_DATA_TYPE="STRING"
PARAM_CAPTION="CONNECT STRING" PARAM_NAME="CONNECT_STRING"
PARAM_TYPE="OUT">
  <PARAM_SOURCE
PARAM_TYPE="VALUE">JDBC:ORACLE:THIN:@172.16.1.34:1521:DEMO30</
PARAM_SOURCE>
  </PARAMETER>
- <PARAMETER NODE_ID="14" PARAM_DATA_TYPE="STRING"
PARAM_CAPTION="DATABASE USER NAME" PARAM_NAME="USER_NAME"
PARAM_TYPE="OUT">
  <PARAM_SOURCE PARAM_TYPE="VALUE">RROC609</PARAM_SOURCE>
  </PARAMETER>
- <PARAMETER NODE_ID="15" PARAM_DATA_TYPE="STRING"
PARAM_CAPTION="DATABASE PASSWORD" PARAM_NAME="USER_PWD"
PARAM_TYPE="OUT">
  <PARAM_SOURCE PARAM_TYPE="VALUE">DPA</PARAM_SOURCE>
  </PARAMETER>
- <PARAMETER NODE_ID="16" PARAM_DATA_TYPE="STRING"
PARAM_CAPTION="OWNERNAME" PARAM_NAME="OWNERNAME"
PARAM_TYPE="OUT">
  <PARAM_SOURCE PARAM_TYPE="VALUE">QTY_ANALYSIS</PARAM_SOURCE>
  </PARAMETER>
- <PARAMETER NODE_ID="17" PARAM_DATA_TYPE="STRING"
PARAM_CAPTION="CURRENT PERIOD" PARAM_NAME="CURRPERIOD"
PARAM_TYPE="OUT">
  <PARAM_SOURCE PARAM_TYPE="VALUE">(1997-09) SEP-97</
PARAM_SOURCE>
  </PARAMETER>
  </DF_WORKFLOW_PARAMETERS>
- <DF_WORKFLOW_ACTIVITIES>
- <ACTIVITY NODE_ID="11">
  <ACTIVITY_HEADER ACTIVITY_NOTES="ACTIVITY NOTES"
ACTIVITY_DESCRIPTION="ACTIVITY DESCRIPTION" />
  <ACTIVITY_IMPLEMENTATION DIRECTIVE_VENDOR="DPA"
DIRECTIVE_NAME="SCHEDULER" THREADING_EFFECT="SPLIT"
DIRECTIVE_ID="SB1" DIRECTIVE_VERSION="1" DIRECTIVE_DESC="SCHEDULE
DIRECTIVE" />
```

FIG. 21B
2102

```
- <ACTIVITY_IN_PARAMETERS>
- <PARAMETER NODE_ID="12" PARAM_DATA_TYPE="STRING"
PARAM_CAPTION="FREQUENCY" PARAM_NAME="FREQUENCY"
PARAM_TYPE="IN">
  <PARAM_SOURCE PARAM_TYPE="VALUE">0</PARAM_SOURCE>
  </PARAMETER>
  </ACTIVITY_IN_PARAMETERS>
  <ACTIVITY_OUT_PARAMETERS />
  </ACTIVITY>
- <ACTIVITY NODE_ID="18">
  <ACTIVITY_HEADER ACTIVITY_NOTES="ACTIVITY NOTES"
ACTIVITY_DESCRIPTION="ACTIVITY DESCRIPTION" />
  <ACTIVITY_IMPLEMENTATION DIRECTIVE_VENDOR="DPA"
DIRECTIVE_NAME="CLEAR STORED RESULTS"
THREADING_EFFECT="STANDARD" DIRECTIVE_ID="CRB1" DIRECTIVE_TYPE=""
DIRECTIVE_VERSION="1" DIRECTIVE_DESC="REMOVE PREVIOUS RESULT SETS
FROM REPOSITORY" />
- <ACTIVITY_IN_PARAMETERS>
- <PARAMETER NODE_ID="19" PARAM_DATA_TYPE="STRING"
PARAM_CAPTION="OWNER ID" PARAM_NAME="OWNERID" PARAM_TYPE="IN">
  <PARAM_SOURCE PARAM_TYPE="ID">16</PARAM_SOURCE>
  </PARAMETER>
- <PARAMETER NODE_ID="20" PARAM_DATA_TYPE="STRING"
PARAM_CAPTION="RESULTNAME" PARAM_NAME="RESULTNAME"
PARAM_TYPE="IN">
  <PARAM_SOURCE PARAM_TYPE="VALUE">*</PARAM_SOURCE>
  </PARAMETER>
  </ACTIVITY_IN_PARAMETERS>
  <ACTIVITY_OUT_PARAMETERS />
  </ACTIVITY>
- <ACTIVITY NODE_ID="21">
  <ACTIVITY_HEADER ACTIVITY_NOTES="ACTIVITY NOTES"
ACTIVITY_DESCRIPTION="ACTIVITY DESCRIPTION" />
  <ACTIVITY_IMPLEMENTATION DIRECTIVE_VENDOR="DPA"
DIRECTIVE_NAME="CLEAR PUBLISHED PAGES"
THREADING_EFFECT="STANDARD" DIRECTIVE_ID="CRC1" DIRECTIVE_TYPE=""
DIRECTIVE_VERSION="1" DIRECTIVE_DESC="REMOVE PREVIOUS PUBLISHED
PAGES FROM REPOSITORY" />
- <ACTIVITY_IN_PARAMETERS>
- <PARAMETER NODE_ID="22" PARAM_DATA_TYPE="STRING"
PARAM_CAPTION="OWNERID" PARAM_NAME="OWNERID" PARAM_TYPE="IN">
  <PARAM_SOURCE PARAM_TYPE="ID">16</PARAM_SOURCE>
  </PARAMETER>
```

FIG. 21C
2103

```
- <PARAMETER NODE_ID="23" PARAM_DATA_TYPE="STRING"
PARAM_CAPTION="PAGE NAME" PARAM_NAME="PAGENAME"
PARAM_TYPE="IN">
  <PARAM_SOURCE PARAM_TYPE="VALUE">*</PARAM_SOURCE>
  </PARAMETER>
  </ACTIVITY_IN_PARAMETERS>
  <ACTIVITY_OUT_PARAMETERS />
  </ACTIVITY>
- <ACTIVITY NODE_ID="26">
  <ACTIVITY_HEADER ACTIVITY_NOTES="ACTIVITY NOTES"
ACTIVITY_DESCRIPTION="DETAIL QUERY" />
  <ACTIVITY_IMPLEMENTATION DIRECTIVE_VENDOR="DPA"
DIRECTIVE_NAME="DATA DIRECTIVE" THREADING_EFFECT="STANDARD"
DIRECTIVE_ID="DB3" DIRECTIVE_VERSION="1" DIRECTIVE_DESC="RETRIEVE
DATA AND ASSEMBLE INTO RESULT SET" />
- <ACTIVITY_IN_PARAMETERS>
- <PARAMETER NODE_ID="27" PARAM_DATA_TYPE="PARAMITERIZED SQL
STRING" PARAM_CAPTION="SQL" PARAM_NAME="SQL" PARAM_TYPE="IN">
  <PARAM_SOURCE PARAM_TYPE="VALUE">SELECT
NW_COMPONENT_ITEM_D.COMPONENT_ITEM_DESC
COMPONENT_ITEM_DESC,SUM(NW_DISC_SHORTAGE_F.QUANTITY_ISSUED)
QUANTITY_ISSUED,SUM(NW_DISC_SHORTAGE_F.QUANTITY_ON_HAND)
QUANTITY_ON_HAND,SUM(NW_DISC_SHORTAGE_F.QUANTITY_SHORT)
QUANTITY_SHORT,SUM(NW_DISC_SHORTAGE_F.REQUIRED_QUANTITY)
REQUIRED_QUANTITY FROM NW_COMPONENT_ITEM_D_0
NW_COMPONENT_ITEM_D,NW_DISC_SHORTAGE_F_0
NW_DISC_SHORTAGE_F,NW_ORG_PERIOD_D_0
NW_ORG_PERIOD_D,NW_WIP_ENTITY_D_0 NW_WIP_ENTITY_D WHERE
NW_DISC_SHORTAGE_F.COMPONENT_ITEM_KEY =
NW_COMPONENT_ITEM_D.COMPONENT_ITEM_KEY AND
NW_DISC_SHORTAGE_F.ORG_PERIOD_KEY =
NW_ORG_PERIOD_D.ORG_PERIOD_KEY AND
NW_DISC_SHORTAGE_F.WIP_ENTITY_KEY
=NW_WIP_ENTITY_D.WIP_ENTITY_KEY AND NW_ORG_PERIOD_D.ORG_PERIOD
= '#P1#' GROUP BY NW_COMPONENT_ITEM_D.COMPONENT_ITEM_DESC
HAVING SUM(NW_DISC_SHORTAGE_F.REQUIRED_QUANTITY) > 0 ORDER BY
REQUIRED_QUANTITY DESC, COMPONENT_ITEM_DESC,REQUIRED_QUANTITY,
QUANTITY_ISSUED, QUANTITY_SHORT, QUANTITY_ON_HAND</
PARAM_SOURCE>
  </PARAMETER>
```

```xml
- <PARAMETER NODE_ID="28" PARAM_DATA_TYPE="STRING"
PARAM_CAPTION="CONNECTION STRING"
PARAM_NAME="CONNECTION_STRING" PARAM_TYPE="IN">
  <PARAM_SOURCE PARAM_TYPE="ID">13</PARAM_SOURCE>
  </PARAMETER>
- <PARAMETER NODE_ID="29" PARAM_DATA_TYPE="STRING"
PARAM_CAPTION="DATABASE USER NAME" PARAM_NAME="USERNAME"
PARAM_TYPE="IN">
  <PARAM_SOURCE PARAM_TYPE="ID">14</PARAM_SOURCE>
  </PARAMETER>
- <PARAMETER NODE_ID="30" PARAM_DATA_TYPE="STRING"
PARAM_CAPTION="DATABASE PASSWORD" PARAM_NAME="PWD"
PARAM_TYPE="IN">
  <PARAM_SOURCE PARAM_TYPE="ID">15</PARAM_SOURCE>
  </PARAMETER>
- <PARAMETER NODE_ID="31" PARAM_DATA_TYPE="STRING"
PARAM_CAPTION="P1" PARAM_NAME="P1" PARAM_TYPE="IN">
  <PARAM_SOURCE PARAM_TYPE="ID">17</PARAM_SOURCE>
  </PARAMETER>
- <PARAMETER NODE_ID="32" PARAM_DATA_TYPE="STRING"
PARAM_CAPTION="P2" PARAM_NAME="P2" PARAM_TYPE="IN">
  <PARAM_SOURCE PARAM_TYPE="ID">13</PARAM_SOURCE>
  </PARAMETER>
- <PARAMETER NODE_ID="33" PARAM_DATA_TYPE="STRING"
PARAM_CAPTION="P3" PARAM_NAME="P3" PARAM_TYPE="IN">
  <PARAM_SOURCE PARAM_TYPE="ID">13</PARAM_SOURCE>
  </PARAMETER>
- <PARAMETER NODE_ID="34" PARAM_DATA_TYPE="STRING"
PARAM_CAPTION="P4" PARAM_NAME="P4" PARAM_TYPE="IN">
  <PARAM_SOURCE PARAM_TYPE="ID">13</PARAM_SOURCE>
  </PARAMETER>
- <PARAMETER NODE_ID="35" PARAM_DATA_TYPE="STRING"
PARAM_CAPTION="P5" PARAM_NAME="P5" PARAM_TYPE="IN">
  <PARAM_SOURCE PARAM_TYPE="ID">13</PARAM_SOURCE>
  </PARAMETER>
  </ACTIVITY_IN_PARAMETERS>
```

FIG. 21E
2105

```
- <ACTIVITY_OUT_PARAMETERS>
- <PARAMETER NODE_ID="36" PARAM_DATA_TYPE="STRING"
PARAM_CAPTION="RESULT DATA" PARAM_NAME="RESULTSET"
PARAM_TYPE="OUT">
  <PARAM_SOURCE />
  </PARAMETER>
- <PARAMETER NODE_ID="37" PARAM_DATA_TYPE="STRING"
PARAM_CAPTION="RESULT METADATA" PARAM_NAME="RESULTMETADATA"
PARAM_TYPE="OUT">
  <PARAM_SOURCE />
  </PARAMETER>
  </ACTIVITY_OUT_PARAMETERS>
  </ACTIVITY>
- <ACTIVITY NODE_ID="39">
  <ACTIVITY_HEADER ACTIVITY_NOTES="ACTIVITY NOTES"
ACTIVITY_DESCRIPTION="TREND QUERY" />
  <ACTIVITY_IMPLEMENTATION DIRECTIVE_VENDOR="DPA"
DIRECTIVE_NAME="DATA DIRECTIVE" THREADING_EFFECT="STANDARD"
DIRECTIVE_ID="DB3" DIRECTIVE_VERSION="1" DIRECTIVE_DESC="RETRIEVE
DATA AND ASSEMBLE INTO RESULT SET" />
- <ACTIVITY_IN_PARAMETERS>
- <PARAMETER NODE_ID="40" PARAM_DATA_TYPE="PARAMITERIZED SQL
STRING" PARAM_CAPTION="SQL" PARAM_NAME="SQL" PARAM_TYPE="IN">
  <PARAM_SOURCE PARAM_TYPE="VALUE">SELECT
NW_ORG_PERIOD_D.ORG_PERIOD
PERIOD_NAME,SUM(NW_DISC_SHORTAGE_F.QUANTITY_ISSUED)
QUANTITY_ISSUED,SUM(NW_DISC_SHORTAGE_F.QUANTITY_ON_HAND)
QUANTITY_ON_HAND,SUM(NW_DISC_SHORTAGE_F.QUANTITY_SHORT)
QUANTITY_SHORT,SUM(NW_DISC_SHORTAGE_F.REQUIRED_QUANTITY)
REQUIRED_QUANTITY FROM NW_DISC_SHORTAGE_F_0
NW_DISC_SHORTAGE_F, NW_ORG_PERIOD_D_0 NW_ORG_PERIOD_D WHERE
NW_DISC_SHORTAGE_F.ORG_PERIOD_KEY =
NW_ORG_PERIOD_D.ORG_PERIOD_KEY GROUP BY
NW_ORG_PERIOD_D.ORG_PERIOD ORDER BY PERIOD_NAME DESC</
PARAM_SOURCE>
  </PARAMETER>
- <PARAMETER NODE_ID="41" PARAM_DATA_TYPE="STRING"
PARAM_CAPTION="CONNECTION STRING"
PARAM_NAME="CONNECTION_STRING" PARAM_TYPE="IN">
  <PARAM_SOURCE PARAM_TYPE="ID">13</PARAM_SOURCE>
  </PARAMETER>
```

FIG. 21F

```
- <PARAMETER NODE_ID="42" PARAM_DATA_TYPE="STRING"
PARAM_CAPTION="DATABASE USER NAME" PARAM_NAME="USERNAME"
PARAM_TYPE="IN">
  <PARAM_SOURCE PARAM_TYPE="ID">14</PARAM_SOURCE>
  </PARAMETER>
- <PARAMETER NODE_ID="43" PARAM_DATA_TYPE="STRING"
PARAM_CAPTION="DATABASE PASSWORD" PARAM_NAME="PWD"
PARAM_TYPE="IN">
  <PARAM_SOURCE PARAM_TYPE="ID">15</PARAM_SOURCE>
  </PARAMETER>
- <PARAMETER NODE_ID="44" PARAM_DATA_TYPE="STRING"
PARAM_CAPTION="P1" PARAM_NAME="P1" PARAM_TYPE="IN">
  <PARAM_SOURCE PARAM_TYPE="ID">17</PARAM_SOURCE>
  </PARAMETER>
- <PARAMETER NODE_ID="45" PARAM_DATA_TYPE="STRING"
PARAM_CAPTION="P2" PARAM_NAME="P2" PARAM_TYPE="IN">
  <PARAM_SOURCE PARAM_TYPE="ID">13</PARAM_SOURCE>
  </PARAMETER>
- <PARAMETER NODE_ID="46" PARAM_DATA_TYPE="STRING"
PARAM_CAPTION="P3" PARAM_NAME="P3" PARAM_TYPE="IN">
  <PARAM_SOURCE PARAM_TYPE="ID">13</PARAM_SOURCE>
  </PARAMETER>
- <PARAMETER NODE_ID="47" PARAM_DATA_TYPE="STRING"
PARAM_CAPTION="P4" PARAM_NAME="P4" PARAM_TYPE="IN">
  <PARAM_SOURCE PARAM_TYPE="ID">13</PARAM_SOURCE>
  </PARAMETER>
- <PARAMETER NODE_ID="48" PARAM_DATA_TYPE="STRING"
PARAM_CAPTION="P5" PARAM_NAME="P5" PARAM_TYPE="IN">
  <PARAM_SOURCE PARAM_TYPE="ID">13</PARAM_SOURCE>
  </PARAMETER>
  </ACTIVITY_IN_PARAMETERS>
- <ACTIVITY_OUT_PARAMETERS>
- <PARAMETER NODE_ID="49" PARAM_DATA_TYPE="STRING"
PARAM_CAPTION="RESULT DATA" PARAM_NAME="RESULTSET"
PARAM_TYPE="OUT">
  <PARAM_SOURCE />
  </PARAMETER>
- <PARAMETER NODE_ID="50" PARAM_DATA_TYPE="STRING"
PARAM_CAPTION="RESULT METADATA" PARAM_NAME="RESULTMETADATA"
PARAM_TYPE="OUT">
  <PARAM_SOURCE />
  </PARAMETER>
  </ACTIVITY_OUT_PARAMETERS>
  </ACTIVITY>
```

```xml
- <ACTIVITY NODE_ID="52">
  <ACTIVITY_HEADER ACTIVITY_NOTES="ACTIVITY NOTES" ACTIVITY_DESCRIPTION="SUMMARY QUERY" />
  <ACTIVITY_IMPLEMENTATION DIRECTIVE_VENDOR="DPA" DIRECTIVE_NAME="DATA DIRECTIVE" THREADING_EFFECT="STANDARD" DIRECTIVE_ID="DB3" DIRECTIVE_VERSION="1" DIRECTIVE_DESC="RETRIEVE DATA AND ASSEMBLE INTO RESULT SET" />
- <ACTIVITY_IN_PARAMETERS>
- <PARAMETER NODE_ID="53" PARAM_DATA_TYPE="PARAMITERIZED SQL STRING" PARAM_CAPTION="SQL" PARAM_NAME="SQL" PARAM_TYPE="IN">
  <PARAM_SOURCE PARAM_TYPE="VALUE">SELECT NW_COMPONENT_ITEM_D.COMPONENT_ITEM_DESC COMPONENT_ITEM_DESC,SUM(NW_DISC_SHORTAGE_F.QUANTITY_ISSUED) QUANTITY_ISSUED,SUM(NW_DISC_SHORTAGE_F.QUANTITY_ON_HAND) QUANTITY_ON_HAND,SUM(NW_DISC_SHORTAGE_F.QUANTITY_SHORT) QUANTITY_SHORT,SUM(NW_DISC_SHORTAGE_F.REQUIRED_QUANTITY) REQUIRED_QUANTITY FROM NW_COMPONENT_ITEM_D_0 NW_COMPONENT_ITEM_D,NW_DISC_SHORTAGE_F_0 NW_DISC_SHORTAGE_F,NW_ORG_PERIOD_D_0 NW_ORG_PERIOD_D,NW_WIP_ENTITY_D_0 NW_WIP_ENTITY_D WHERE NW_DISC_SHORTAGE_F.COMPONENT_ITEM_KEY = NW_COMPONENT_ITEM_D.COMPONENT_ITEM_KEY AND NW_DISC_SHORTAGE_F.ORG_PERIOD_KEY = NW_ORG_PERIOD_D.ORG_PERIOD_KEY AND NW_DISC_SHORTAGE_F.WIP_ENTITY_KEY =NW_WIP_ENTITY_D.WIP_ENTITY_KEY AND NW_ORG_PERIOD_D.ORG_PERIOD = '#P1#' GROUP BY NW_COMPONENT_ITEM_D.COMPONENT_ITEM_DESC HAVING SUM(NW_DISC_SHORTAGE_F.REQUIRED_QUANTITY) > 0 ORDER BY REQUIRED_QUANTITY DESC, COMPONENT_ITEM_DESC,REQUIRED_QUANTITY, QUANTITY_ISSUED, QUANTITY_SHORT, QUANTITY_ON_HAND</PARAM_SOURCE>
  </PARAMETER>
- <PARAMETER NODE_ID="54" PARAM_DATA_TYPE="STRING" PARAM_CAPTION="CONNECTION STRING" PARAM_NAME="CONNECTION_STRING" PARAM_TYPE="IN">
  <PARAM_SOURCE PARAM_TYPE="ID">13</PARAM_SOURCE>
  </PARAMETER>
- <PARAMETER NODE_ID="55" PARAM_DATA_TYPE="STRING" PARAM_CAPTION="DATABASE USER NAME" PARAM_NAME="USERNAME" PARAM_TYPE="IN">
  <PARAM_SOURCE PARAM_TYPE="ID">14</PARAM_SOURCE>
  </PARAMETER>
```

FIG. 21H
2108

```
- <PARAMETER NODE_ID="56" PARAM_DATA_TYPE="STRING"
PARAM_CAPTION="DATABASE PASSWORD" PARAM_NAME="PWD"
PARAM_TYPE="IN">
  <PARAM_SOURCE PARAM_TYPE="ID">15</PARAM_SOURCE>
  </PARAMETER>
- <PARAMETER NODE_ID="57" PARAM_DATA_TYPE="STRING"
PARAM_CAPTION="P1" PARAM_NAME="P1" PARAM_TYPE="IN">
  <PARAM_SOURCE PARAM_TYPE="ID">17</PARAM_SOURCE>
  </PARAMETER>
- <PARAMETER NODE_ID="58" PARAM_DATA_TYPE="STRING"
PARAM_CAPTION="P2" PARAM_NAME="P2" PARAM_TYPE="IN">
  <PARAM_SOURCE PARAM_TYPE="ID">13</PARAM_SOURCE>
  </PARAMETER>
- <PARAMETER NODE_ID="59" PARAM_DATA_TYPE="STRING"
PARAM_CAPTION="P3" PARAM_NAME="P3" PARAM_TYPE="IN">
  <PARAM_SOURCE PARAM_TYPE="ID">13</PARAM_SOURCE>
  </PARAMETER>
- <PARAMETER NODE_ID="60" PARAM_DATA_TYPE="STRING"
PARAM_CAPTION="P4" PARAM_NAME="P4" PARAM_TYPE="IN">
  <PARAM_SOURCE PARAM_TYPE="ID">13</PARAM_SOURCE>
  </PARAMETER>
- <PARAMETER NODE_ID="61" PARAM_DATA_TYPE="STRING"
PARAM_CAPTION="P5" PARAM_NAME="P5" PARAM_TYPE="IN">
  <PARAM_SOURCE PARAM_TYPE="ID">13</PARAM_SOURCE>
  </PARAMETER>
  </ACTIVITY_IN_PARAMETERS>
- <ACTIVITY_OUT_PARAMETERS>
- <PARAMETER NODE_ID="62" PARAM_DATA_TYPE="STRING"
PARAM_CAPTION="RESULT DATA" PARAM_NAME="RESULTSET"
PARAM_TYPE="OUT">
  <PARAM_SOURCE />
  </PARAMETER>
- <PARAMETER NODE_ID="63" PARAM_DATA_TYPE="STRING"
PARAM_CAPTION="RESULT METADATA" PARAM_NAME="RESULTMETADATA"
PARAM_TYPE="OUT">
  <PARAM_SOURCE />
  </PARAMETER>
  </ACTIVITY_OUT_PARAMETERS>
  </ACTIVITY>
```

```
- <ACTIVITY NODE_ID="65">
  <ACTIVITY_HEADER ACTIVITY_NOTES="ACTIVITY NOTES"
ACTIVITY_DESCRIPTION="ACTIVITY DESCRIPTION" />
  <ACTIVITY_IMPLEMENTATION DIRECTIVE_VENDOR="DPA"
THREADING_EFFECT="STANDARD" DIRECTIVE_NAME="SAVE RESULTS"
DIRECTIVE_ID="SR1" DIRECTIVE_TYPE="" DIRECTIVE_VERSION="1"
DIRECTIVE_DESC="SAVES RESULTS TO REPOSITORY" />
- <ACTIVITY_IN_PARAMETERS>
- <PARAMETER NODE_ID="66" PARAM_DATA_TYPE="STRING"
PARAM_CAPTION="RESULT SET OWNER" PARAM_NAME="OWNER"
PARAM_TYPE="IN">
  <PARAM_SOURCE PARAM_TYPE="ID">16</PARAM_SOURCE>
  </PARAMETER>
- <PARAMETER NODE_ID="67" PARAM_DATA_TYPE="STRING"
PARAM_CAPTION="RESULT SET" PARAM_NAME="RESULTSET"
PARAM_TYPE="IN">
  <PARAM_SOURCE PARAM_TYPE="ID">36</PARAM_SOURCE>
  </PARAMETER>
- <PARAMETER NODE_ID="68" PARAM_DATA_TYPE="STRING"
PARAM_CAPTION="RESULT SET METADATA"
PARAM_NAME="RESULTMETADATA" PARAM_TYPE="IN">
  <PARAM_SOURCE PARAM_TYPE="ID">37</PARAM_SOURCE>
  </PARAMETER>
- <PARAMETER NODE_ID="69" PARAM_DATA_TYPE="STRING"
PARAM_CAPTION="RESULT SET NAME" PARAM_NAME="RESULTNAME"
PARAM_TYPE="IN">
  <PARAM_SOURCE PARAM_TYPE="VALUE">DETAIL</PARAM_SOURCE>
  </PARAMETER>
  </ACTIVITY_IN_PARAMETERS>
- <ACTIVITY_OUT_PARAMETERS>
- <PARAMETER NODE_ID="70" PARAM_DATA_TYPE="STRING"
PARAM_CAPTION="RESULTSET ID" PARAM_NAME="RESULTSETID"
PARAM_TYPE="OUT">
  <PARAM_SOURCE />
  </PARAMETER>
  </ACTIVITY_OUT_PARAMETERS>
  </ACTIVITY>
- <ACTIVITY NODE_ID="72">
  <ACTIVITY_HEADER ACTIVITY_NOTES="ACTIVITY NOTES"
ACTIVITY_DESCRIPTION="ACTIVITY DESCRIPTION" />
  <ACTIVITY_IMPLEMENTATION DIRECTIVE_VENDOR="DPA"
THREADING_EFFECT="STANDARD" DIRECTIVE_NAME="SAVE RESULTS"
DIRECTIVE_ID="SR1" DIRECTIVE_TYPE="" DIRECTIVE_VERSION="1"
DIRECTIVE_DESC="SAVES RESULTS TO REPOSITORY" />
```

```
- <ACTIVITY_IN_PARAMETERS>
- <PARAMETER NODE_ID="73" PARAM_DATA_TYPE="STRING"
PARAM_CAPTION="RESULT SET OWNER" PARAM_NAME="OWNER"
PARAM_TYPE="IN">
  <PARAM_SOURCE PARAM_TYPE="ID">16</PARAM_SOURCE>
  </PARAMETER>
- <PARAMETER NODE_ID="74" PARAM_DATA_TYPE="STRING"
PARAM_CAPTION="RESULT SET" PARAM_NAME="RESULTSET"
PARAM_TYPE="IN">
  <PARAM_SOURCE PARAM_TYPE="ID">49</PARAM_SOURCE>
  </PARAMETER>
- <PARAMETER NODE_ID="75" PARAM_DATA_TYPE="STRING"
PARAM_CAPTION="RESULT SET METADATA"
PARAM_NAME="RESULTMETADATA" PARAM_TYPE="IN">
  <PARAM_SOURCE PARAM_TYPE="ID">50</PARAM_SOURCE>
  </PARAMETER>
- <PARAMETER NODE_ID="76" PARAM_DATA_TYPE="STRING"
PARAM_CAPTION="RESULT SET NAME" PARAM_NAME="RESULTNAME"
PARAM_TYPE="IN">
  <PARAM_SOURCE PARAM_TYPE="VALUE">TREND</PARAM_SOURCE>
  </PARAMETER>
  </ACTIVITY_IN_PARAMETERS>
- <ACTIVITY_OUT_PARAMETERS>
- <PARAMETER NODE_ID="77" PARAM_DATA_TYPE="STRING"
PARAM_CAPTION="RESULTSET ID" PARAM_NAME="RESULTSETID"
PARAM_TYPE="OUT">
  <PARAM_SOURCE />
  </PARAMETER>
  </ACTIVITY_OUT_PARAMETERS>
  </ACTIVITY>
- <ACTIVITY NODE_ID="79">
  <ACTIVITY_HEADER ACTIVITY_NOTES="ACTIVITY NOTES"
ACTIVITY_DESCRIPTION="ACTIVITY DESCRIPTION" />
  <ACTIVITY_IMPLEMENTATION DIRECTIVE_VENDOR="DPA"
THREADING_EFFECT="STANDARD" DIRECTIVE_NAME="SAVE RESULTS"
DIRECTIVE_ID="SR1" DIRECTIVE_TYPE="" DIRECTIVE_VERSION="1"
DIRECTIVE_DESC="SAVES RESULTS TO REPOSITORY" />
- <ACTIVITY_IN_PARAMETERS>
- <PARAMETER NODE_ID="80" PARAM_DATA_TYPE="STRING"
PARAM_CAPTION="RESULT SET OWNER" PARAM_NAME="OWNER"
PARAM_TYPE="IN">
  <PARAM_SOURCE PARAM_TYPE="ID">16</PARAM_SOURCE>
  </PARAMETER>
```

```xml
- <PARAMETER NODE_ID="81" PARAM_DATA_TYPE="STRING" PARAM_CAPTION="RESULT SET" PARAM_NAME="RESULTSET" PARAM_TYPE="IN">
    <PARAM_SOURCE PARAM_TYPE="ID">62</PARAM_SOURCE>
  </PARAMETER>
- <PARAMETER NODE_ID="82" PARAM_DATA_TYPE="STRING" PARAM_CAPTION="RESULT SET METADATA" PARAM_NAME="RESULTMETADATA" PARAM_TYPE="IN">
    <PARAM_SOURCE PARAM_TYPE="ID">63</PARAM_SOURCE>
  </PARAMETER>
- <PARAMETER NODE_ID="83" PARAM_DATA_TYPE="STRING" PARAM_CAPTION="RESULT SET NAME" PARAM_NAME="RESULTNAME" PARAM_TYPE="IN">
    <PARAM_SOURCE PARAM_TYPE="VALUE">SUMMARY</PARAM_SOURCE>
  </PARAMETER>
  </ACTIVITY_IN_PARAMETERS>
- <ACTIVITY_OUT_PARAMETERS>
- <PARAMETER NODE_ID="84" PARAM_DATA_TYPE="STRING" PARAM_CAPTION="RESULTSET ID" PARAM_NAME="RESULTSETID" PARAM_TYPE="OUT">
    <PARAM_SOURCE />
  </PARAMETER>
  </ACTIVITY_OUT_PARAMETERS>
  </ACTIVITY>
- <ACTIVITY NODE_ID="87">
    <ACTIVITY_HEADER ACTIVITY_NOTES="ACTIVITY NOTES" ACTIVITY_DESCRIPTION="ACTIVITY DESCRIPTION" />
    <ACTIVITY_IMPLEMENTATION DIRECTIVE_VENDOR="DPA" THREADING_EFFECT="STANDARD" DIRECTIVE_NAME="PUBLISH PAGE" DIRECTIVE_ID="CR2" DIRECTIVE_TYPE="" DIRECTIVE_VERSION="1" DIRECTIVE_DESC="PUBLISHES PAGE & GRANTS SECURITY" />
- <ACTIVITY_IN_PARAMETERS>
- <PARAMETER NODE_ID="88" PARAM_DATA_TYPE="STRING" PARAM_CAPTION="GRANT SECURITY LIST" PARAM_NAME="SECDOC" PARAM_TYPE="IN">
    <PARAM_SOURCE PARAM_TYPE="ID">162</PARAM_SOURCE>
  </PARAMETER>
- <PARAMETER NODE_ID="89" PARAM_DATA_TYPE="STRING" PARAM_CAPTION="METADATA FOR SECDOC" PARAM_NAME="SECMETA" PARAM_TYPE="IN">
    <PARAM_SOURCE PARAM_TYPE="ID">163</PARAM_SOURCE>
  </PARAMETER>
```

```
- <PARAMETER NODE_ID="90" PARAM_DATA_TYPE="STRING"
PARAM_CAPTION="GRANT SECURITY LIST" PARAM_NAME="SECCOLNAME"
PARAM_TYPE="IN">
  <PARAM_SOURCE PARAM_TYPE="VALUE">USERNAME</PARAM_SOURCE>
  </PARAMETER>
- <PARAMETER NODE_ID="91" PARAM_DATA_TYPE="STRING"
PARAM_CAPTION="PAGE OWNER" PARAM_NAME="OWNER" PARAM_TYPE="IN">
  <PARAM_SOURCE PARAM_TYPE="ID">16</PARAM_SOURCE>
  </PARAMETER>
- <PARAMETER NODE_ID="92" PARAM_DATA_TYPE="STRING"
PARAM_CAPTION="PAGE NAME" PARAM_NAME="PAGENAME"
PARAM_TYPE="IN">
  <PARAM_SOURCE PARAM_TYPE="VALUE">STARTPAGE</PARAM_SOURCE>
  </PARAMETER>
- <PARAMETER NODE_ID="93" PARAM_DATA_TYPE="STRING"
PARAM_CAPTION="PAGE SLICE NAME" PARAM_NAME="PAGESLICENAME"
PARAM_TYPE="IN">
  <PARAM_SOURCE PARAM_TYPE="VALUE">FIRST</PARAM_SOURCE>
  </PARAMETER>
- <PARAMETER NODE_ID="94" PARAM_DATA_TYPE="STRING"
PARAM_CAPTION="PAGE DEFINITION" PARAM_NAME="PAGEDEFN"
PARAM_TYPE="IN">
  <PARAM_SOURCE PARAM_TYPE="VALUE"><DP_PAGE_DEF><LAYER
LAYER_TYPE="HORIZONTAL" LAYER_BORDER="0" LAYER_PADDING="3"
LAYER_HEIGHT="100%" LAYER_WIDTH="100%"><LAYER
LAYER_TYPE="VERTICAL" LAYER_PADDING="3" LAYER_BORDER="0"
LAYER_HEIGHT="225" LAYER_WIDTH="100%"><LAYER LAYER_TYPE="WIDGET"
LAYER_HEIGHT="100%" LAYER_WIDTH="50%"><WIDGET
WIDGET_ID="DP_PIE_CHART"><PARAMETERS><PARAM
PARAM_NAME="TITLE">MY PIE</PARAM><PARAM PARAM_NAME="DSID">#P3#</
PARAM><PARAM PARAM_NAME="VALUECOL">REQUIRED_QUANTITY</
PARAM><PARAM PARAM_NAME="LABELCOL">COMPONENT_ITEM_DESC</
PARAM><PARAM PARAM_NAME="FILTERTYPE">TOP</PARAM><PARAM
PARAM_NAME="FILTERVAL">10</PARAM></PARAMETERS></WIDGET></
LAYER><LAYER LAYER_TYPE="WIDGET" LAYER_HEIGHT="100%"
LAYER_WIDTH="50%"><WIDGET
WIDGET_ID="DP_BAR_CHART2"><PARAMETERS><PARAM
PARAM_NAME="TITLE">MY CHART TITLE</PARAM><PARAM
PARAM_NAME="DSID">#P2#</PARAM><PARAM
PARAM_NAME="MEASURECOLS">QUANTITY_ON_HAND|QUANTITY_ISSUED|QUA
NTITY_SHORT|REQUIRED_QUANTITY</PARAM><PARAM
PARAM_NAME="XAXISLABELS">ON HAND|ISSUED|SHORT|REQUIRED</
PARAM><PARAM PARAM_NAME="SERIESCOL">PERIOD_NAME</PARAM></
PARAMETERS></WIDGET></LAYER></LAYER><LAYER
LAYER_TYPE="HORIZONTAL" LAYER_BORDER="0" LAYER_PADDING="3"
```

```
LAYER_HEIGHT="80%" LAYER_WIDTH="100%"><LAYER LAYER_TYPE="WIDGET"
LAYER_HEIGHT="100%" LAYER_WIDTH="100%"><WIDGET
WIDGET_ID="DP_REPORT_VIEWER"><PARAMETERS><PARAM
PARAM_NAME="TITLE">MY TITLE</PARAM> <PARAM
PARAM_NAME="DSID">#P1#</PARAM></PARAMETERS></WIDGET></LAYER></
LAYER></LAYER></DP_PAGE_DEF></PARAM_SOURCE>
  </PARAMETER>
- <PARAMETER NODE_ID="95" PARAM_DATA_TYPE="STRING"
PARAM_CAPTION="IN RESULTS KEY" PARAM_NAME="P1" PARAM_TYPE="IN">
  <PARAM_SOURCE PARAM_TYPE="ID">70</PARAM_SOURCE>
  </PARAMETER>
- <PARAMETER NODE_ID="96" PARAM_DATA_TYPE="STRING"
PARAM_CAPTION="IN RESULTS KEY" PARAM_NAME="P2" PARAM_TYPE="IN">
  <PARAM_SOURCE PARAM_TYPE="ID">77</PARAM_SOURCE>
  </PARAMETER>
- <PARAMETER NODE_ID="97" PARAM_DATA_TYPE="STRING"
PARAM_CAPTION="IN RESULTS KEY" PARAM_NAME="P3" PARAM_TYPE="IN">
  <PARAM_SOURCE PARAM_TYPE="ID">84</PARAM_SOURCE>
  </PARAMETER>
- <PARAMETER NODE_ID="98" PARAM_DATA_TYPE="STRING"
PARAM_CAPTION="IN RESULTS KEY" PARAM_NAME="P4" PARAM_TYPE="IN">
  <PARAM_SOURCE PARAM_TYPE="ID">70</PARAM_SOURCE>
  </PARAMETER>
- <PARAMETER NODE_ID="99" PARAM_DATA_TYPE="STRING"
PARAM_CAPTION="IN RESULTS KEY" PARAM_NAME="P5" PARAM_TYPE="IN">
  <PARAM_SOURCE PARAM_TYPE="ID">70</PARAM_SOURCE>
  </PARAMETER>
- <PARAMETER NODE_ID="100" PARAM_DATA_TYPE="STRING"
PARAM_CAPTION="IN RESULTS KEY" PARAM_NAME="P6" PARAM_TYPE="IN">
  <PARAM_SOURCE PARAM_TYPE="ID">70</PARAM_SOURCE>
  </PARAMETER>
  </ACTIVITY_IN_PARAMETERS>
- <ACTIVITY_OUT_PARAMETERS>
- <PARAMETER NODE_ID="101" PARAM_DATA_TYPE="STRING"
PARAM_CAPTION="PAGE ID" PARAM_NAME="PAGEID" PARAM_TYPE="OUT">
  <PARAM_SOURCE />
  </PARAMETER>
- <PARAMETER NODE_ID="102" PARAM_DATA_TYPE="STRING"
PARAM_CAPTION="PAGE OWNER" PARAM_NAME="OWNER"
PARAM_TYPE="OUT">
  <PARAM_SOURCE />
  </PARAMETER>
```

FIG. 21N
2114

```
- <PARAMETER NODE_ID="103" PARAM_DATA_TYPE="STRING"
PARAM_CAPTION="PAGE NAME" PARAM_NAME="PAGENAME"
PARAM_TYPE="OUT">
  <PARAM_SOURCE />
  </PARAMETER>
- <PARAMETER NODE_ID="104" PARAM_DATA_TYPE="STRING"
PARAM_CAPTION="PAGE SLICE NAME" PARAM_NAME="PAGESLICENAME"
PARAM_TYPE="OUT">
  <PARAM_SOURCE />
  </PARAMETER>
  </ACTIVITY_OUT_PARAMETERS>
  </ACTIVITY>
- <ACTIVITY NODE_ID="108">
  <ACTIVITY_HEADER ACTIVITY_NOTES="ACTIVITY NOTES"
ACTIVITY_DESCRIPTION="OUTOF BOUNDS QTY" />
  <ACTIVITY_IMPLEMENTATION DIRECTIVE_VENDOR="DPA"
THREADING_EFFECT="STANDARD" DIRECTIVE_NAME="ADVANCED FILTER"
DIRECTIVE_ID="ABFILTER" DIRECTIVE_TYPE="" DIRECTIVE_VERSION="1"
DIRECTIVE_DESC="FILTER RESULTS" />
- <ACTIVITY_IN_PARAMETERS>
- <PARAMETER NODE_ID="109" PARAM_DATA_TYPE="STRING"
PARAM_CAPTION="FILTER EXPRESSION" PARAM_NAME="FILTER_EXP"
PARAM_TYPE="IN">
  <PARAM_SOURCE PARAM_TYPE="VALUE">#REQUIRED_QUANTITY# > 200</
PARAM_SOURCE>
  </PARAMETER>
- <PARAMETER NODE_ID="110" PARAM_DATA_TYPE="STRING"
PARAM_CAPTION="RESULTS METADATA" PARAM_NAME="METADOC"
PARAM_TYPE="IN">
  <PARAM_SOURCE PARAM_TYPE="ID">63</PARAM_SOURCE>
  </PARAMETER>
- <PARAMETER NODE_ID="111" PARAM_DATA_TYPE="STRING"
PARAM_CAPTION="RESULTS" PARAM_NAME="RESULTSDOC" PARAM_TYPE="IN">
  <PARAM_SOURCE PARAM_TYPE="ID">62</PARAM_SOURCE>
  </PARAMETER>
  </ACTIVITY_IN_PARAMETERS>
- <ACTIVITY_OUT_PARAMETERS>
- <PARAMETER NODE_ID="112" PARAM_DATA_TYPE="STRING"
PARAM_CAPTION="RESULTS METADATA" PARAM_NAME="METADOC"
PARAM_TYPE="OUT">
  <PARAM_SOURCE />
  </PARAMETER>
```

FIG. 21O

```
- <PARAMETER NODE_ID="113" PARAM_DATA_TYPE="STRING"          2115
PARAM_CAPTION="RESULTS" PARAM_NAME="RESULTSDOC"
PARAM_TYPE="OUT">
  <PARAM_SOURCE />
  </PARAMETER>
- <PARAMETER NODE_ID="114" PARAM_DATA_TYPE="STRING"
PARAM_CAPTION="ROW COUNT" PARAM_NAME="ROWCOUNT"
PARAM_TYPE="OUT">
  <PARAM_SOURCE />
  </PARAMETER>
  </ACTIVITY_OUT_PARAMETERS>
  </ACTIVITY>
- <ACTIVITY NODE_ID="116">
  <ACTIVITY_HEADER ACTIVITY_NOTES="ACTIVITY NOTES"
ACTIVITY_DESCRIPTION="ACTIVITY DESCRIPTION" />
  <ACTIVITY_IMPLEMENTATION DIRECTIVE_VENDOR="DPA"
THREADING_EFFECT="STANDARD" DIRECTIVE_NAME="TEXT EMAILER"
DIRECTIVE_ID="TEXTEMAILER" DIRECTIVE_TYPE="" DIRECTIVE_VERSION="1"
DIRECTIVE_DESC="TEXT EMAILER" />
- <ACTIVITY_IN_PARAMETERS>
- <PARAMETER NODE_ID="117" PARAM_DATA_TYPE="STRING"
PARAM_CAPTION="SUBJECT EXPRESSION" PARAM_NAME="SUBJECT_EXP"
PARAM_TYPE="IN">
  <PARAM_SOURCE PARAM_TYPE="VALUE">OUT OF BOUNDS QTY CONDITION</
PARAM_SOURCE>
  </PARAMETER>
- <PARAMETER NODE_ID="118" PARAM_DATA_TYPE="STRING"
PARAM_CAPTION="MESSAGE EXPRESSION" PARAM_NAME="MESSAGE_EXP"
PARAM_TYPE="IN">
  <PARAM_SOURCE PARAM_TYPE="VALUE">COMPONENT:
#COMPONENT_ITEM_DESC# REQUIRES #REQUIRED_QUANTITY# ADDITIONAL
UNITS</PARAM_SOURCE>
  </PARAMETER>
- <PARAMETER NODE_ID="119" PARAM_DATA_TYPE="STRING"
PARAM_CAPTION="EMAIL ADDRESSES" PARAM_NAME="EMAIL_ADDRESSES"
PARAM_TYPE="IN">
  <PARAM_SOURCE PARAM_TYPE="VALUE">EXH@DPAPPLICATIONS.COM</
PARAM_SOURCE>
  </PARAMETER>
- <PARAMETER NODE_ID="120" PARAM_DATA_TYPE="STRING"
PARAM_CAPTION="SEND FROM ADDRESS" PARAM_NAME="FROM_ADDRESS"
PARAM_TYPE="IN">
  <PARAM_SOURCE PARAM_TYPE="VALUE">DF@DPAPPLICATIONS.COM</
PARAM_SOURCE>
  </PARAMETER>
```

FIG. 21P
2116

```xml
- <PARAMETER NODE_ID="121" PARAM_DATA_TYPE="STRING"
PARAM_CAPTION="RESULTS METADATA" PARAM_NAME="METADOC"
PARAM_TYPE="IN">
  <PARAM_SOURCE PARAM_TYPE="ID">112</PARAM_SOURCE>
  </PARAMETER>
- <PARAMETER NODE_ID="122" PARAM_DATA_TYPE="STRING"
PARAM_CAPTION="RESULTS" PARAM_NAME="RESULTSDOC" PARAM_TYPE="IN">
  <PARAM_SOURCE PARAM_TYPE="ID">113</PARAM_SOURCE>
  </PARAMETER>
  </ACTIVITY_IN_PARAMETERS>
- <ACTIVITY_OUT_PARAMETERS>
- <PARAMETER NODE_ID="123" PARAM_DATA_TYPE="STRING"
PARAM_CAPTION="ERROR MESSAGES" PARAM_NAME="ERROR"
PARAM_TYPE="OUT">
  <PARAM_SOURCE />
  </PARAMETER>
  </ACTIVITY_OUT_PARAMETERS>
  </ACTIVITY>
- <ACTIVITY NODE_ID="125">
  <ACTIVITY_HEADER ACTIVITY_NOTES="ACTIVITY NOTES"
ACTIVITY_DESCRIPTION="EMAIL LINK" />
  <ACTIVITY_IMPLEMENTATION DIRECTIVE_VENDOR="DPA"
THREADING_EFFECT="STANDARD" DIRECTIVE_NAME="SMTP EMAIL DIRECTIVE"
DIRECTIVE_ID="MB2" DIRECTIVE_TYPE="" DIRECTIVE_VERSION="1"
DIRECTIVE_DESC="SEND PUBLISHED PAGES" />
- <ACTIVITY_IN_PARAMETERS>
- <PARAMETER NODE_ID="126" PARAM_DATA_TYPE="STRING"
PARAM_CAPTION="EMAIL ADDRESSES" PARAM_NAME="ADDRDOC"
PARAM_TYPE="IN">
  <PARAM_SOURCE PARAM_TYPE="ID">162</PARAM_SOURCE>
  </PARAMETER>
- <PARAMETER NODE_ID="127" PARAM_DATA_TYPE="STRING"
PARAM_CAPTION="METADATA FOR ADDRDOC" PARAM_NAME="ADDRMETA"
PARAM_TYPE="IN">
  <PARAM_SOURCE PARAM_TYPE="ID">163</PARAM_SOURCE>
  </PARAMETER>
- <PARAMETER NODE_ID="128" PARAM_DATA_TYPE="STRING"
PARAM_CAPTION="EMAIL COLUMN NAME" PARAM_NAME="ADDRCOLNAME"
PARAM_TYPE="IN">
  <PARAM_SOURCE PARAM_TYPE="VALUE">EMAIL_ADDRESS</PARAM_SOURCE>
  </PARAMETER>
```

FIG. 21Q
2117

```xml
- <PARAMETER NODE_ID="129" PARAM_DATA_TYPE="STRING"
PARAM_CAPTION="EMAIL COLUMN NAME" PARAM_NAME="IDCOLNAME"
PARAM_TYPE="IN">
  <PARAM_SOURCE PARAM_TYPE="VALUE">USERNAME</PARAM_SOURCE>
  </PARAMETER>
- <PARAMETER NODE_ID="130" PARAM_DATA_TYPE="STRING"
PARAM_CAPTION="SUBJECT" PARAM_NAME="SUBJECT" PARAM_TYPE="IN">
  <PARAM_SOURCE PARAM_TYPE="VALUE">QTY ANALYSIS UPDATED</
PARAM_SOURCE>
  </PARAMETER>
- <PARAMETER NODE_ID="131" PARAM_DATA_TYPE="STRING"
PARAM_CAPTION="PAGE OWNER" PARAM_NAME="OWNER" PARAM_TYPE="IN">
  <PARAM_SOURCE PARAM_TYPE="ID">102</PARAM_SOURCE>
  </PARAMETER>
- <PARAMETER NODE_ID="132" PARAM_DATA_TYPE="STRING"
PARAM_CAPTION="PAGE NAME" PARAM_NAME="PAGENAME" PARAM_TYPE="IN">
  <PARAM_SOURCE PARAM_TYPE="ID">103</PARAM_SOURCE>
  </PARAMETER>
- <PARAMETER NODE_ID="133" PARAM_DATA_TYPE="STRING"
PARAM_CAPTION="PAGE INSTANCE" PARAM_NAME="PAGEINST"
PARAM_TYPE="IN">
  <PARAM_SOURCE PARAM_TYPE="ID">104</PARAM_SOURCE>
  </PARAMETER>
- <PARAMETER NODE_ID="134" PARAM_DATA_TYPE="STRING"
PARAM_CAPTION="MAIL FORMAT" PARAM_NAME="FORMAT" PARAM_TYPE="IN">
  <PARAM_SOURCE PARAM_TYPE="VALUE">DYNAM</PARAM_SOURCE>
  </PARAMETER>
- <PARAMETER NODE_ID="135" PARAM_DATA_TYPE="STRING"
PARAM_CAPTION="SEND FROM MAIL ADDRESS" PARAM_NAME="SENDFROM"
PARAM_TYPE="IN">
  <PARAM_SOURCE PARAM_TYPE="VALUE">DF@DPAPPLICATIONS.COM</
PARAM_SOURCE>
  </PARAMETER>
  </ACTIVITY_IN_PARAMETERS>
- <ACTIVITY_OUT_PARAMETERS>
- <PARAMETER NODE_ID="136" PARAM_DATA_TYPE="STRING"
PARAM_CAPTION="ERROR MESSAGES" PARAM_NAME="ERROR_MSG"
PARAM_TYPE="OUT">
  <PARAM_SOURCE />
  </PARAMETER>
  </ACTIVITY_OUT_PARAMETERS>
  </ACTIVITY>
```

FIG. 21R
2118

```
- <ACTIVITY NODE_ID="152">
  <ACTIVITY_HEADER ACTIVITY_NOTES="ACTIVITY NOTES"
ACTIVITY_DESCRIPTION="ACTIVITY DESCRIPTION" />
  <ACTIVITY_IMPLEMENTATION DIRECTIVE_VENDOR="DPA"
THREADING_EFFECT="STANDARD" DIRECTIVE_NAME="DATA DIRECTIVE"
DIRECTIVE_ID="DB3" DIRECTIVE_VERSION="1" DIRECTIVE_DESC="RETRIEVE
DATA AND ASSEMBLE INTO RESULT SET" />
- <ACTIVITY_IN_PARAMETERS>
- <PARAMETER NODE_ID="153" PARAM_DATA_TYPE="PARAMITERIZED SQL
STRING" PARAM_CAPTION="SQL" PARAM_NAME="SQL" PARAM_TYPE="IN">
  <PARAM_SOURCE PARAM_TYPE="VALUE">SELECT
USERNAME,EMAIL_ADDRESS FROM OA3.DF_QTYAPP_USERS</
PARAM_SOURCE>
  </PARAMETER>
- <PARAMETER NODE_ID="154" PARAM_DATA_TYPE="STRING"
PARAM_CAPTION="CONNECTION STRING"
PARAM_NAME="CONNECTION_STRING" PARAM_TYPE="IN">
  <PARAM_SOURCE
PARAM_TYPE="VALUE">JDBC:ORACLE:THIN:@HD.DPAPPLICATIONS.COM:1521:N
RB816</PARAM_SOURCE>
  </PARAMETER>
- <PARAMETER NODE_ID="155" PARAM_DATA_TYPE="STRING"
PARAM_CAPTION="DATABASE USER NAME" PARAM_NAME="USERNAME"
PARAM_TYPE="IN">
  <PARAM_SOURCE PARAM_TYPE="VALUE">OA3</PARAM_SOURCE>
  </PARAMETER>
- <PARAMETER NODE_ID="156" PARAM_DATA_TYPE="STRING"
PARAM_CAPTION="DATABASE PASSWORD" PARAM_NAME="PWD"
PARAM_TYPE="IN">
  <PARAM_SOURCE PARAM_TYPE="VALUE">OA3</PARAM_SOURCE>
  </PARAMETER>
- <PARAMETER NODE_ID="157" PARAM_DATA_TYPE="STRING"
PARAM_CAPTION="P1" PARAM_NAME="P1" PARAM_TYPE="IN">
  <PARAM_SOURCE PARAM_TYPE="ID">13</PARAM_SOURCE>
  </PARAMETER>
- <PARAMETER NODE_ID="158" PARAM_DATA_TYPE="STRING"
PARAM_CAPTION="P2" PARAM_NAME="P2" PARAM_TYPE="IN">
  <PARAM_SOURCE PARAM_TYPE="ID">13</PARAM_SOURCE>
  </PARAMETER>
- <PARAMETER NODE_ID="159" PARAM_DATA_TYPE="STRING"
PARAM_CAPTION="P3" PARAM_NAME="P3" PARAM_TYPE="IN">
  <PARAM_SOURCE PARAM_TYPE="ID">13</PARAM_SOURCE>
  </PARAMETER>
```

```xml
- <PARAMETER NODE_ID="160" PARAM_DATA_TYPE="STRING"
PARAM_CAPTION="P4" PARAM_NAME="P4" PARAM_TYPE="IN">
  <PARAM_SOURCE PARAM_TYPE="ID">13</PARAM_SOURCE>
  </PARAMETER>
- <PARAMETER NODE_ID="161" PARAM_DATA_TYPE="STRING"
PARAM_CAPTION="P5" PARAM_NAME="P5" PARAM_TYPE="IN">
  <PARAM_SOURCE PARAM_TYPE="ID">13</PARAM_SOURCE>
  </PARAMETER>
  </ACTIVITY_IN_PARAMETERS>
- <ACTIVITY_OUT_PARAMETERS>
- <PARAMETER NODE_ID="162" PARAM_DATA_TYPE="STRING"
PARAM_CAPTION="RESULT DATA" PARAM_NAME="RESULTSET"
PARAM_TYPE="OUT">
  <PARAM_SOURCE />
  </PARAMETER>
- <PARAMETER NODE_ID="163" PARAM_DATA_TYPE="STRING"
PARAM_CAPTION="RESULT METADATA" PARAM_NAME="RESULTMETADATA"
PARAM_TYPE="OUT">
  <PARAM_SOURCE />
  </PARAMETER>
  </ACTIVITY_OUT_PARAMETERS>
  </ACTIVITY>
  </DF_WORKFLOW_ACTIVITIES>
- <DF_WORKFLOW_TRANSITIONS>
  <TRANSITION NODE_ID="24" FROM_ACTIVITY_ID="11" TO_ACTIVITY_ID="18"
TRANSITION_EXPRESSION="" DESCRIPTION="DESCRIPTION" NOTES="NOTES" />
  <TRANSITION NODE_ID="25" FROM_ACTIVITY_ID="11" TO_ACTIVITY_ID="21"
TRANSITION_EXPRESSION="" DESCRIPTION="DESCRIPTION" NOTES="NOTES" />
  <TRANSITION NODE_ID="71" FROM_ACTIVITY_ID="26" TO_ACTIVITY_ID="65"
TRANSITION_EXPRESSION="" DESCRIPTION="DESCRIPTION" NOTES="NOTES" />
  <TRANSITION NODE_ID="78" FROM_ACTIVITY_ID="39" TO_ACTIVITY_ID="72"
TRANSITION_EXPRESSION="" DESCRIPTION="DESCRIPTION" NOTES="NOTES" />
  <TRANSITION NODE_ID="85" FROM_ACTIVITY_ID="52" TO_ACTIVITY_ID="79"
TRANSITION_EXPRESSION="" DESCRIPTION="DESCRIPTION" NOTES="NOTES" />
  <TRANSITION NODE_ID="105" FROM_ACTIVITY_ID="65" TO_ACTIVITY_ID="87"
TRANSITION_EXPRESSION="" DESCRIPTION="DESCRIPTION" NOTES="NOTES" />
  <TRANSITION NODE_ID="106" FROM_ACTIVITY_ID="72" TO_ACTIVITY_ID="87"
TRANSITION_EXPRESSION="" DESCRIPTION="DESCRIPTION" NOTES="NOTES" />
  <TRANSITION NODE_ID="107" FROM_ACTIVITY_ID="79" TO_ACTIVITY_ID="87"
TRANSITION_EXPRESSION="" DESCRIPTION="DESCRIPTION" NOTES="NOTES" />
  <TRANSITION NODE_ID="115" FROM_ACTIVITY_ID="52" TO_ACTIVITY_ID="108"
TRANSITION_EXPRESSION="" DESCRIPTION="DESCRIPTION" NOTES="NOTES" />
  <TRANSITION NODE_ID="124" FROM_ACTIVITY_ID="108" TO_ACTIVITY_ID="116"
TRANSITION_EXPRESSION="#114# > "0"" DESCRIPTION="EMAIL ONLY EXCEPTIONS"
NOTES="NOTES" />
```

```
<TRANSITION NODE_ID="137" FROM_ACTIVITY_ID="87" TO_ACTIVITY_ID="125"
TRANSITION_EXPRESSION="" DESCRIPTION="DESCRIPTION" NOTES="NOTES" />
 <TRANSITION NODE_ID="164" FROM_ACTIVITY_ID="18" TO_ACTIVITY_ID="152"
TRANSITION_EXPRESSION="" DESCRIPTION="DESCRIPTION" NOTES="NOTES" />
 <TRANSITION NODE_ID="165" FROM_ACTIVITY_ID="21" TO_ACTIVITY_ID="152"
TRANSITION_EXPRESSION="" DESCRIPTION="DESCRIPTION" NOTES="NOTES" />
 <TRANSITION NODE_ID="166" FROM_ACTIVITY_ID="152" TO_ACTIVITY_ID="26"
TRANSITION_EXPRESSION="" DESCRIPTION="DESCRIPTION" NOTES="NOTES" />
 <TRANSITION NODE_ID="167" FROM_ACTIVITY_ID="152" TO_ACTIVITY_ID="39"
TRANSITION_EXPRESSION="" DESCRIPTION="DESCRIPTION" NOTES="NOTES" />
 <TRANSITION NODE_ID="168" FROM_ACTIVITY_ID="152" TO_ACTIVITY_ID="52"
TRANSITION_EXPRESSION="" DESCRIPTION="DESCRIPTION" NOTES="NOTES" />
 </DF_WORKFLOW_TRANSITIONS>
- <DF_WORKFLOW_EDITOR>
 <ACTIVITY_VISUAL_EDITING NODE_ID="11" YCOORD="140" XCOORD="12" />
 <ACTIVITY_VISUAL_EDITING NODE_ID="18" YCOORD="330" XCOORD="47" />
 <ACTIVITY_VISUAL_EDITING NODE_ID="21" YCOORD="50" XCOORD="60" />
 <ACTIVITY_VISUAL_EDITING NODE_ID="26" YCOORD="200" XCOORD="294" />
 <ACTIVITY_VISUAL_EDITING NODE_ID="39" YCOORD="70" XCOORD="294" />
 <ACTIVITY_VISUAL_EDITING NODE_ID="52" YCOORD="320" XCOORD="304" />
 <ACTIVITY_VISUAL_EDITING NODE_ID="65" YCOORD="200" XCOORD="408" />
 <ACTIVITY_VISUAL_EDITING NODE_ID="72" YCOORD="70" XCOORD="408" />
 <ACTIVITY_VISUAL_EDITING NODE_ID="79" YCOORD="320" XCOORD="428" />
 <ACTIVITY_VISUAL_EDITING NODE_ID="87" YCOORD="200" XCOORD="537" />
 <ACTIVITY_VISUAL_EDITING NODE_ID="108" YCOORD="430" XCOORD="359" />
 <ACTIVITY_VISUAL_EDITING NODE_ID="116" YCOORD="420" XCOORD="587" />
 <ACTIVITY_VISUAL_EDITING NODE_ID="125" YCOORD="320" XCOORD="580" />
 <ACTIVITY_VISUAL_EDITING NODE_ID="152" YCOORD="200" XCOORD="160" />
 </DF_WORKFLOW_EDITOR>
 </DF_WORKFLOW>
```

FIG. 22A

```
<DP_QUERY_DEF VERSION="1">
  <DPA_IDENTIFIERS DATA_SET="OAS" WH_OWNER_NAME="PART"/>
  <HINTS/>
  <COLUMN_DEFS>
    <COLUMN_DEF SUMMARY_TYPE="SUM" COLUMN_NAME="PTD_BUDGET"
COLUMN_ALIAS="PTD_BUDGET" COLUMN_SORT_ORDER="3"
COLUMN_SORT_ATTRIBUTE="NONE" COLUMN_TYPE="MEASURE"
COLUMN_EXPR="" COLUMN_POSITION="3" TABLE_ALIAS="INCOME_STMT_A"
COLUMN_TAG="PTD_BUDGET"/>
    <COLUMN_DEF SUMMARY_TYPE="NONE" COLUMN_NAME="LINE_NAME"
COLUMN_ALIAS="LINE_NAME" COLUMN_SORT_ORDER="1"
COLUMN_SORT_ATTRIBUTE="ASC" COLUMN_TYPE="ATTRIBUTE"
COLUMN_EXPR="" COLUMN_POSITION="1" TABLE_ALIAS="INC_STMT_LINES_D"
COLUMN_TAG="LINE_NAME"/>
    <COLUMN_DEF SUMMARY_TYPE="SUM"
COLUMN_NAME="PTD_VARIANCE_PCT" COLUMN_ALIAS="PTD_VARIANCE_PCT"
COLUMN_SORT_ORDER="6" COLUMN_SORT_ATTRIBUTE="NONE"
COLUMN_TYPE="MEASURE" COLUMN_EXPR="" COLUMN_POSITION="6"
TABLE_ALIAS="INCOME_STMT_A" COLUMN_TAG="PTD_VAR_PCT"/>
    <COLUMN_DEF SUMMARY_TYPE="NONE"
COLUMN_NAME="DEPARTMENT_DESC" COLUMN_ALIAS="DEPT_DESC"
COLUMN_SORT_ORDER="2" COLUMN_SORT_ATTRIBUTE="ASC"
COLUMN_TYPE="ATTRIBUTE" COLUMN_EXPR="" COLUMN_POSITION="2"
TABLE_ALIAS="DEPARTMENT_D" COLUMN_TAG="DEPT_DESC"/>
    <COLUMN_DEF SUMMARY_TYPE="SUM" COLUMN_NAME="PTD_VARIANCE"
COLUMN_ALIAS="PTD_VARIANCE" COLUMN_SORT_ORDER="5"
COLUMN_SORT_ATTRIBUTE="NONE" COLUMN_TYPE="MEASURE"
COLUMN_EXPR="" COLUMN_POSITION="5" TABLE_ALIAS="INCOME_STMT_A"
COLUMN_TAG="PTD_VAR"/>
    <COLUMN_DEF SUMMARY_TYPE="SUM" COLUMN_NAME="PTD_ACTUAL"
COLUMN_ALIAS="PTD_ACTUAL" COLUMN_SORT_ORDER="4"
COLUMN_SORT_ATTRIBUTE="NONE" COLUMN_TYPE="MEASURE"
COLUMN_EXPR="" COLUMN_POSITION="4" TABLE_ALIAS="INCOME_STMT_A"
COLUMN_TAG="PTD_ACTUAL"/>
  </COLUMN_DEFS>
```

```xml
<TABLE_DEFS>
  <TABLE_DEF TABLE_ALIAS="VENDOR_D" TABLE_NAME="VENDOR_D"/>
  <TABLE_DEF TABLE_ALIAS="AP_INV_DETAIL_F" TABLE_NAME="AP_INV_DETAIL_F"/>
  <TABLE_DEF TABLE_ALIAS="INCOME_STMT_A" TABLE_NAME="INCOME_STMT_A"/>
  <TABLE_DEF TABLE_ALIAS="DEPARTMENT_D" TABLE_NAME="DEPARTMENT_D"/>
  <TABLE_DEF TABLE_ALIAS="INC_STMT_LINES_D" TABLE_NAME="INC_STMT_LINES_D"/>
</TABLE_DEFS>
<DETAIL_FILTERS>
  <FILTER FILTER_TYPE="VALUE" COLUMN_TEXT="PERIOD_KEY" TABLE_ALIAS="AP_INV_DETAIL_F" FILTER_PREC_OPER="AND" FILTER_OPERATOR="=">
    <FILTER_VALUE VALUE_DATA_TYPE="STRING">DEC-97</FILTER_VALUE>
  </FILTER>
  <FILTER FILTER_TYPE="VALUE" COLUMN_TEXT="VENDOR_TYPE" TABLE_ALIAS="VENDOR_D" FILTER_PREC_OPER="AND" FILTER_OPERATOR="=">
    <FILTER_VALUE VALUE_DATA_TYPE="STRING">EMPLOYEE</FILTER_VALUE>
  </FILTER>
  <FILTER FILTER_TYPE="VALUE" COLUMN_TEXT="COMPANY_KEY" TABLE_ALIAS="AP_INV_DETAIL_F" FILTER_PREC_OPER="AND" FILTER_OPERATOR="=">
    <FILTER_VALUE VALUE_DATA_TYPE="STRING">01</FILTER_VALUE>
  </FILTER>
  <FILTER FILTER_TYPE="VALUE" COLUMN_TEXT="DEPARTMENT_KEY" TABLE_ALIAS="AP_INV_DETAIL_F" FILTER_PREC_OPER="AND" FILTER_OPERATOR="=">
    <FILTER_VALUE VALUE_DATA_TYPE="STRING">560</FILTER_VALUE>
  </FILTER>
</DETAIL_FILTERS>
<AGGREGATE_FILTERS>
  <FILTER FILTER_TYPE="VALUE" COLUMN_TEXT="SUM(INVOICE_LINE_AMOUNT)" TABLE_ALIAS="AP_INV_DETAIL_F" FILTER_PREC_OPER="AND" FILTER_OPERATOR=">">
    <FILTER_VALUE VALUE_DATA_TYPE="NUMBER">0</FILTER_VALUE>
  </FILTER>
</AGGREGATE_FILTERS>
</DP_QUERY_DEF>
```

```
- <DP_SCHEMA_DOC VERSION="1">
  <DPA_QUERY_SERVER_INFO SERVICE="DPA_QUERY_SERVER"
MACHINE="EXH_2K" PORT="8069"
WAREHOUSE_SERVER="HD.DPAPPLICATIONS.COM"
WAREHOUSE_DBNAME="DEMO30" WAREHOUSE_OWNER="RROC"
SCHEMA="AP_INV_DETAIL_F" DATA_SET="NW">FOODADDY</
DPA_QUERY_SERVER_INFO>
- <DP_DIMENSIONS>
- <DIMENSION LABEL="ACCOUNTING DATE" NAME="ACCOUNTING_DATE_D">
  <ATTRIBUTE LABEL="ACCOUNTING DATE KEY"
NAME="ACCOUNTING_DATE_KEY" />
  <ATTRIBUTE LABEL="ACCOUNTING MONTH" NAME="ACCOUNTING_MONTH" />
  <ATTRIBUTE LABEL="ACCOUNTING PERIOD" NAME="ACCOUNTING_PERIOD" />
  <ATTRIBUTE LABEL="ACCOUNTING PERIOD KEY"
NAME="ACCOUNTING_PERIOD_KEY" />
  <ATTRIBUTE LABEL="ACCOUNTING PERIOD QUARTER"
NAME="ACCOUNTING_PERIOD_QUARTER" />
  <ATTRIBUTE LABEL="ACCOUNTING QUARTER"
NAME="ACCOUNTING_QUARTER" />
  <ATTRIBUTE LABEL="ACCOUNTING WEEK ENDING"
NAME="ACCOUNTING_WEEK_ENDING" />
  <ATTRIBUTE LABEL="ACCOUNTING YEAR" NAME="ACCOUNTING_YEAR" />
  </DIMENSION>
- <DIMENSION LABEL="ACCOUNT" NAME="ACCOUNT_D">
  <ATTRIBUTE LABEL="ACCOUNT" NAME="ACCOUNT" />
  <ATTRIBUTE LABEL="LINE NAME" NAME="LINE_NAME" />
  <ATTRIBUTE LABEL="LINE SEQUENCE KEY" NAME="LINE_SEQUENCE_KEY" />
  <ATTRIBUTE LABEL="REPORT SECTION" NAME="REPORT_SECTION" />
  <ATTRIBUTE LABEL="REPORT SEQUENCE" NAME="REPORT_SEQUENCE" />
  <ATTRIBUTE LABEL="ACCOUNT KEY" NAME="ACCOUNT_KEY" />
  <ATTRIBUTE LABEL="ACCOUNT DESCRIPTION" NAME="ACCOUNT_DESC" />
  </DIMENSION>
- <DIMENSION LABEL="ACCOUNT ROLLUPS" NAME="ACCOUNT_RLUP_D">
  <ATTRIBUTE LABEL="ACCOUNT" NAME="ACCOUNT" />
  <ATTRIBUTE LABEL="ACCOUNT KEY" NAME="ACCOUNT_KEY" />
  <ATTRIBUTE LABEL="ACCOUNT ROLLUP DESCRIPTION"
NAME="ROLLUP_DESC" />
  <ATTRIBUTE LABEL="ACCOUNT ROLLUP CODE" NAME="ROLLUP_CODE" />
  <ATTRIBUTE LABEL="ACCOUNT DESCRIPTION" NAME="ACCOUNT_DESC" />
  </DIMENSION>
```

FIG. 23B
2302

```xml
- <DIMENSION LABEL="AP HOLD CODES" NAME="AP_HOLD_CODE_D">
  <ATTRIBUTE LABEL="AP HOLD CODE" NAME="AP_HOLD_CODE" />
  <ATTRIBUTE LABEL="AP HOLD CODE DESCRIPTION" NAME="AP_HOLD_CODE_DESC" />
  <ATTRIBUTE LABEL="AP HOLD CODE KEY" NAME="AP_HOLD_CODE_KEY" />
  <ATTRIBUTE LABEL="AP HOLD CODE TYPE" NAME="AP_HOLD_CODE_TYPE" />
  </DIMENSION>
- <DIMENSION LABEL="AP HOLD STATUS" NAME="AP_HOLD_STATUS_D">
  <ATTRIBUTE LABEL="AP HOLD STATUS" NAME="AP_HOLD_STATUS" />
  <ATTRIBUTE LABEL="AP HOLD STATUS KEY" NAME="AP_HOLD_STATUS_KEY" />
  </DIMENSION>
- <DIMENSION LABEL="AP INVOICES" NAME="AP_INVOICE_D">
  <ATTRIBUTE LABEL="AP INVOICE NUMBER" NAME="AP_INVOICE" />
  <ATTRIBUTE LABEL="AP INVOICE DATE" NAME="AP_INVOICE_DATE" />
  <ATTRIBUTE LABEL="AP INVOICE KEY" NAME="AP_INVOICE_KEY" />
  </DIMENSION>
- <DIMENSION LABEL="AP INVOICE TYPES" NAME="AP_INVOICE_TYPE_D">
  <ATTRIBUTE LABEL="AP INVOICE TYPE" NAME="AP_INVOICE_TYPE" />
  <ATTRIBUTE LABEL="AP INVOICE TYPE KEY" NAME="AP_INVOICE_TYPE_KEY" />
  </DIMENSION>
- <DIMENSION LABEL="AP PAYMENT TERMS" NAME="AP_PAYMENT_TERM_D">
  <ATTRIBUTE LABEL="AP PAYMENT TERM" NAME="AP_PAYMENT_TERM" />
  <ATTRIBUTE LABEL="AP PAYMENT TERM DESCRIPTION" NAME="AP_PAYMENT_TERM_DESC" />
  <ATTRIBUTE LABEL="AP PAYMENT TERM KEY" NAME="AP_PAYMENT_TERM_KEY" />
  </DIMENSION>
- <DIMENSION LABEL="PO AUTHORIZER" NAME="AUTHORIZER_D">
  <ATTRIBUTE LABEL="AUTHORIZER" NAME="AUTHORIZER" />
  <ATTRIBUTE LABEL="AUTHORIZER KEY" NAME="AUTHORIZER_KEY" />
  </DIMENSION>
- <DIMENSION LABEL="BUYERS" NAME="BUYER_D">
  <ATTRIBUTE LABEL="BUYER" NAME="BUYER" />
  <ATTRIBUTE LABEL="AUTHORIZATION LIMIT" NAME="BUYER_AUTHORIZATION_LIMIT" />
  <ATTRIBUTE LABEL="END DATE ACTIVE" NAME="BUYER_END_DATE_ACTIVE" />
  <ATTRIBUTE LABEL="BUYER KEY" NAME="BUYER_KEY" />
  <ATTRIBUTE LABEL="START DATE ACTIVE" NAME="BUYER_START_DATE_ACTIVE" />
  </DIMENSION>
```

FIG. 23C

```xml
                                                                    2303
- <DIMENSION LABEL="COMPANY" NAME="COMPANY_D">
  <ATTRIBUTE LABEL="COMPANY" NAME="COMPANY" />
  <ATTRIBUTE LABEL="COMPANY DESCRIPTION" NAME="COMPANY_DESC" />
  <ATTRIBUTE LABEL="COMPANY KEY" NAME="COMPANY_KEY" />
  </DIMENSION>
- <DIMENSION LABEL="CURRENCY" NAME="CURRENCY_D">
  <ATTRIBUTE LABEL="CURRENCY" NAME="CURRENCY" />
  <ATTRIBUTE LABEL="CURRENCY DESCRIPTION" NAME="CURRENCY_DESC" />
  <ATTRIBUTE LABEL="CURRENCY KEY" NAME="CURRENCY_KEY" />
  </DIMENSION>
 - <DIMENSION LABEL="DEPARTMENT" NAME="DEPARTMENT_D">
  <ATTRIBUTE LABEL="DEPARTMENT" NAME="DEPARTMENT" />
  <ATTRIBUTE LABEL="DEPARTMENT KEY" NAME="DEPARTMENT_KEY" />
  <ATTRIBUTE LABEL="DEPARTMENT DESCRIPTION" NAME="DEPARTMENT_DESC" /
>
  </DIMENSION>
- <DIMENSION LABEL="DEPARTMENT ROLLUPS" NAME="DEPARTMENT_RLUP_D">
  <ATTRIBUTE LABEL="DEPARTMENT" NAME="DEPARTMENT" />
  <ATTRIBUTE LABEL="DEPARTMENT ROLLUP DESC" NAME="ROLLUP_DESC" />
  <ATTRIBUTE LABEL="DEPARTMENT ROLLUP CODE" NAME="ROLLUP_CODE" />
  <ATTRIBUTE LABEL="DEPARTMENT DESCRIPTION" NAME="DEPARTMENT_DESC" /
>
  <ATTRIBUTE LABEL="DEPARTMENT KEY" NAME="DEPARTMENT_KEY" />
  </DIMENSION>
- <DIMENSION LABEL="AP DUE DATES" NAME="DUE_DATE_D">
  <ATTRIBUTE LABEL="DUE DATE KEY" NAME="DUE_DATE_KEY" />
  <ATTRIBUTE LABEL="DUE MONTH" NAME="DUE_MONTH" />
  <ATTRIBUTE LABEL="DUE PERIOD" NAME="DUE_PERIOD" />
  <ATTRIBUTE LABEL="DUE PERIOD KEY" NAME="DUE_PERIOD_KEY" />
  <ATTRIBUTE LABEL="DUE PERIOD QUARTER" NAME="DUE_PERIOD_QUARTER" />
  <ATTRIBUTE LABEL="DUE QUARTER" NAME="DUE_QUARTER" />
  <ATTRIBUTE LABEL="DUE WEEK ENDING" NAME="DUE_WEEK_ENDING" />
  <ATTRIBUTE LABEL="DUE YEAR" NAME="DUE_YEAR" />
  </DIMENSION>
- <DIMENSION LABEL="INVOICE DATES" NAME="INVOICE_DATE_D">
  <ATTRIBUTE LABEL="INVOICE DATE KEY" NAME="INVOICE_DATE_KEY" />
  <ATTRIBUTE LABEL="INVOICE MONTH" NAME="INVOICE_MONTH" />
  <ATTRIBUTE LABEL="INVOICE PERIOD" NAME="INVOICE_PERIOD" />
  <ATTRIBUTE LABEL="INVOICE PERIOD KEY" NAME="INVOICE_PERIOD_KEY" />
  <ATTRIBUTE LABEL="INVOICE PERIOD QUARTER"
NAME="INVOICE_PERIOD_QUARTER" />
  <ATTRIBUTE LABEL="INVOICE QUARTER" NAME="INVOICE_QUARTER" />
  <ATTRIBUTE LABEL="INVOICE WEEK ENDING" NAME="INVOICE_WEEK_ENDING" />
  <ATTRIBUTE LABEL="INVOICE YEAR" NAME="INVOICE_YEAR" />
  </DIMENSION>
```

FIG. 23D

```xml
                                                    2304
-<DIMENSION LABEL="JE BATCHS" NAME="JE_BATCH_D">
  <ATTRIBUTE LABEL="ACTUAL FLAG" NAME="ACTUAL_FLAG" />
  <ATTRIBUTE LABEL="DEFAULT PERIOD NAME"
NAME="DEFAULT_PERIOD_NAME" />
  <ATTRIBUTE LABEL="JE BATCH KEY" NAME="JE_BATCH_KEY" />
  <ATTRIBUTE LABEL="NAME" NAME="NAME" />
  <ATTRIBUTE LABEL="ORG ID" NAME="ORG_ID" />
  <ATTRIBUTE LABEL="DESCRIPTION" NAME="DESCRIPTION" />
  <ATTRIBUTE LABEL="DATE CREATED" NAME="DATE_CREATED" />
  </DIMENSION>
-<DIMENSION LABEL="ORGANIZATIONS" NAME="ORGANIZATION_D">
  <ATTRIBUTE LABEL="ORGANIZATION" NAME="ORGANIZATION" />
  <ATTRIBUTE LABEL="ORGANIZATION KEY" NAME="ORGANIZATION_KEY" />
  <ATTRIBUTE LABEL="ORGANIZATION TYPE" NAME="ORGANIZATION_TYPE" />
  </DIMENSION>
-<DIMENSION LABEL="PA PROJECTS" NAME="PA_PROJECT_D">
  <ATTRIBUTE LABEL="PROJECT KEY" NAME="PA_PROJECT_KEY" />
  <ATTRIBUTE LABEL="PROJECT COMPLETE DATE"
NAME="PROJECT_COMPLETE_DATE" />
  <ATTRIBUTE LABEL="PROJECT MANAGER" NAME="PROJECT_MANAGER" />
  <ATTRIBUTE LABEL="PROJECT NAME" NAME="PROJECT_NAME" />
  <ATTRIBUTE LABEL="PROJECT NUMBER" NAME="PROJECT_NUMBER" />
  <ATTRIBUTE LABEL="PROJECT OFFICER" NAME="PROJECT_OFFICER" />
  <ATTRIBUTE LABEL="PROJECT SPONSOR" NAME="PROJECT_SPONSOR" />
  <ATTRIBUTE LABEL="PROJECT START DATE" NAME="PROJECT_START_DATE" />
  <ATTRIBUTE LABEL="PROJECT STATUS" NAME="PROJECT_STATUS" />
  <ATTRIBUTE LABEL="PROJECT TITLE" NAME="PROJECT_TITLE" />
  <ATTRIBUTE LABEL="PROJECT TYPE" NAME="PROJECT_TYPE" />
  </DIMENSION>
-<DIMENSION LABEL="PA TASKS" NAME="PA_TASK_D">
  <ATTRIBUTE LABEL="PARENT TASK KEY" NAME="PARENT_TASK_KEY" />
  <ATTRIBUTE LABEL="TASK LOCATION" NAME="TASK_LOCATION" />
  <ATTRIBUTE LABEL="TASK NAME" NAME="TASK_NAME" />
  <ATTRIBUTE LABEL="TASK MANAGER" NAME="TASK_MANAGER" />
  <ATTRIBUTE LABEL="TOP TASK NAME" NAME="TOP_TASK_NAME" />
  <ATTRIBUTE LABEL="TOP TASK KEY" NAME="TOP_TASK_KEY" />
  <ATTRIBUTE LABEL="TASK WBS" NAME="TASK_WBS" />
  <ATTRIBUTE LABEL="TASK START DATE" NAME="TASK_START_DATE" />
  <ATTRIBUTE LABEL="TASK NUMBER" NAME="TASK_NUMBER" />
  <ATTRIBUTE LABEL="TASK DESCRIPTION" NAME="TASK_DESC" />
  <ATTRIBUTE LABEL="PARENT TASK NAME" NAME="PARENT_TASK_NAME" />
  <ATTRIBUTE LABEL="PROJECT KEY" NAME="PA_PROJECT_KEY" />
  <ATTRIBUTE LABEL="TASK COMPLETE DATE" NAME="TASK_COMPLETE_DATE" />
  <ATTRIBUTE LABEL="TASK KEY" NAME="PA_TASK_KEY" />
  </DIMENSION>
```

FIG. 23E
2305

```xml
-<DIMENSION LABEL="PERIODS" NAME="PERIOD_D">
  <ATTRIBUTE LABEL="PERIOD" NAME="PERIOD" />
  <ATTRIBUTE LABEL="PERIOD END DATE" NAME="PERIOD_END_DATE" />
  <ATTRIBUTE LABEL="PERIOD KEY" NAME="PERIOD_KEY" />
  <ATTRIBUTE LABEL="PERIOD START DATE" NAME="PERIOD_START_DATE" />
  <ATTRIBUTE LABEL="PERIOD TYPE" NAME="PERIOD_TYPE" />
  <ATTRIBUTE LABEL="QUARTER" NAME="QUARTER" />
  <ATTRIBUTE LABEL="YEAR" NAME="YEAR" />
  </DIMENSION>
-<DIMENSION LABEL="PRODUCT" NAME="PRODUCT_D">
  <ATTRIBUTE LABEL="PRODUCT" NAME="PRODUCT" />
  <ATTRIBUTE LABEL="PRODUCT DESCRIPTION" NAME="PRODUCT_DESC" />
  <ATTRIBUTE LABEL="PRODUCT KEY" NAME="PRODUCT_KEY" />
  </DIMENSION>
-<DIMENSION LABEL="PA PROJECT CLASSES" NAME="PROJECT_CLASS_D">
  <ATTRIBUTE LABEL="PROJECT CLASS CATEGORY"
NAME="PROJECT_CLASS_CATEGORY" />
  <ATTRIBUTE LABEL="PROJECT CLASS CODE" NAME="PROJECT_CLASS_CODE" /
>
  <ATTRIBUTE LABEL="PROJECT CLASS DESCRIPTION"
NAME="PROJECT_CLASS_DESCRIPTION" />
  <ATTRIBUTE LABEL="PROJECT KEY" NAME="PROJECT_KEY" />
  </DIMENSION>
-<DIMENSION LABEL="PO REQUESTORS" NAME="REQUESTOR_D">
  <ATTRIBUTE LABEL="REQUESTOR" NAME="REQUESTOR" />
  <ATTRIBUTE LABEL="REQUESTOR KEY" NAME="REQUESTOR_KEY" />
  </DIMENSION>
-<DIMENSION LABEL="SUB-ACCOUNT" NAME="SUB_ACCOUNT_D">
  <ATTRIBUTE LABEL="SUB-ACCOUNT" NAME="SUB_ACCOUNT" />
  <ATTRIBUTE LABEL="SUB-ACCOUNT KEY" NAME="SUB_ACCOUNT_KEY" />
  <ATTRIBUTE LABEL="SUB-ACCOUNT DESCRIPTION"
NAME="SUB_ACCOUNT_DESC" />
  </DIMENSION>
-<DIMENSION LABEL="AP VENDORS" NAME="VENDOR_D">
  <ATTRIBUTE LABEL="ACTIVE END DATE" NAME="ACTIVE_END_DATE" />
  <ATTRIBUTE LABEL="ACTIVE FLAG" NAME="ACTIVE_FLAG" />
  <ATTRIBUTE LABEL="ACTIVE START DATE" NAME="ACTIVE_START_DATE" />
  <ATTRIBUTE LABEL="VENDOR SITE ADDRESS LINE1" NAME="ADDRESS_LINE1" />
  <ATTRIBUTE LABEL="VENDOR SITE ADDRESS LINE2" NAME="ADDRESS_LINE2" />
  <ATTRIBUTE LABEL="VENDOR SITE ADDRESS LINE3" NAME="ADDRESS_LINE3" />
  <ATTRIBUTE LABEL="VENDOR SITE AREA CODE" NAME="AREA_CODE" />
  <ATTRIBUTE LABEL="VENDOR SITE CITY" NAME="CITY" />
  <ATTRIBUTE LABEL="VENDOR HOLD REASON" NAME="HOLD_REASON" />
  <ATTRIBUTE LABEL="VENDOR SITE PHONE NUMBER" NAME="PHONE_NUMBER" /
>
```

FIG. 23F

<sub>2306</sub>

```xml
<ATTRIBUTE LABEL="VENDOR SITE PROVINCE" NAME="PROVINCE" />
<ATTRIBUTE LABEL="VENDOR SITE STATE" NAME="STATE" />
<ATTRIBUTE LABEL="VENDOR TAX FEDERAL FLAG"
NAME="TAX_FEDERAL_REPORT_FLAG" />
<ATTRIBUTE LABEL="VENDOR TAX REPORTING NAME"
NAME="TAX_REPORTING_NAME" />
<ATTRIBUTE LABEL="VENDOR TAX STATE FLAG"
NAME="TAX_STATE_REPORT_FLAG" />
<ATTRIBUTE LABEL="VENDOR 1099 NUMBER" NAME="VENDOR_1099_NUM" />
<ATTRIBUTE LABEL="VENDOR 1099 TYPE" NAME="VENDOR_1099_TYPE" />
<ATTRIBUTE LABEL="VENDOR CORPORATE GROUP"
NAME="VENDOR_CORPORATE_GROUP" />
<ATTRIBUTE LABEL="VENDOR INDUSTRY CLASS"
NAME="VENDOR_INDUSTRY_CLASS" />
<ATTRIBUTE LABEL="VENDOR KEY" NAME="VENDOR_KEY" />
<ATTRIBUTE LABEL="VENDOR NAME" NAME="VENDOR_NAME" />
<ATTRIBUTE LABEL="VENDOR NUMBER" NAME="VENDOR_NUMBER" />
<ATTRIBUTE LABEL="VENDOR ORGANIZATION TYPE"
NAME="VENDOR_ORG_TYPE" />
<ATTRIBUTE LABEL="VENDOR PAYMENT PRIORITY"
NAME="VENDOR_PAYMENT_PRIORITY" />
<ATTRIBUTE LABEL="VENDOR PAY GROUP" NAME="VENDOR_PAY_GROUP" />
<ATTRIBUTE LABEL="VENDOR SITE CODE" NAME="VENDOR_SITE_CODE" />
<ATTRIBUTE LABEL="VENDOR SITE KEY" NAME="VENDOR_SITE_KEY" />
<ATTRIBUTE LABEL="VENDOR TYPE" NAME="VENDOR_TYPE" />
<ATTRIBUTE LABEL="VENDOR SITE ZIP" NAME="ZIP" />
</DIMENSION>
- <DIMENSION LABEL="AP INVOICE DETAILS" NAME="AP_INV_DETAIL_F">
<ATTRIBUTE LABEL="ACCOUNTING DATE" NAME="ACCOUNTING_DATE" />
<ATTRIBUTE LABEL="ACCOUNTING DATE KEY" NAME="ACCOUNTING_DATE_KEY"
/>
<ATTRIBUTE LABEL="ACCOUNT KEY" NAME="ACCOUNT_KEY" />
<ATTRIBUTE LABEL="APPROVAL STATUS" NAME="APPROVAL_STATUS" />
<ATTRIBUTE LABEL="AP INVOICE KEY" NAME="AP_INVOICE_KEY" />
<ATTRIBUTE LABEL="AP INVOICE TYPE KEY" NAME="AP_INVOICE_TYPE_KEY" />
<ATTRIBUTE LABEL="AP PAYMENT TERM KEY" NAME="AP_PAYMENT_TERM_KEY"
/>
<ATTRIBUTE LABEL="BUYER KEY" NAME="BUYER_KEY" />
<ATTRIBUTE LABEL="COMPANY KEY" NAME="COMPANY_KEY" />
<ATTRIBUTE LABEL="INVOICE CURRENCY CODE" NAME="CURRENCY_KEY" />
<ATTRIBUTE LABEL="DEPARTMENT KEY" NAME="DEPARTMENT_KEY" />
<ATTRIBUTE LABEL="DUE DATE" NAME="DUE_DATE" />
<ATTRIBUTE LABEL="DUE DATE KEY" NAME="DUE_DATE_KEY" />
<ATTRIBUTE LABEL="TOTAL INVOICE AMOUNT" NAME="INVOICE_AMOUNT" />
```

```xml
<ATTRIBUTE LABEL="INVOICE DATE" NAME="INVOICE_DATE" />
<ATTRIBUTE LABEL="INVOICE DATE KEY" NAME="INVOICE_DATE_KEY" />
<ATTRIBUTE LABEL="INVOICE DESCRIPTION" NAME="INVOICE_DESC" />
<ATTRIBUTE LABEL="INVOICE ID KEY" NAME="INVOICE_ID_KEY" />
<ATTRIBUTE LABEL="INVOICE LINE DESCRIPTION" NAME="INVOICE_LINE_DESC" />
<ATTRIBUTE LABEL="INVOICE LINE NUMBER" NAME="INVOICE_LINE_NUMBER" />
<ATTRIBUTE LABEL="INVOICE LINE TYPE" NAME="INVOICE_LINE_TYPE" />
<ATTRIBUTE LABEL="INVOICE NUMBER" NAME="INVOICE_NUMBER" />
<ATTRIBUTE LABEL="INVOICE TAX AMOUNT" NAME="INVOICE_TAX_AMOUNT" />
<ATTRIBUTE LABEL="ORGANIZATION KEY" NAME="ORGANIZATION_KEY" />
<ATTRIBUTE LABEL="PAID AMOUNT" NAME="PAID_AMOUNT" />
<ATTRIBUTE LABEL="PA PROJECT KEY" NAME="PA_PROJECT_KEY" />
<ATTRIBUTE LABEL="PA TASK KEY" NAME="PA_TASK_KEY" />
<ATTRIBUTE LABEL="PERIOD KEY" NAME="PERIOD_KEY" />
<ATTRIBUTE LABEL="POSTED FLAG" NAME="POSTED_FLAG" />
<ATTRIBUTE LABEL="PO CREATION DATE" NAME="PO_CREATED_DATE" />
<ATTRIBUTE LABEL="PO NUMBER" NAME="PO_NUMBER" />
<ATTRIBUTE LABEL="PRODUCT KEY" NAME="PRODUCT_KEY" />
<ATTRIBUTE LABEL="RECURRING INVOICE FLAG" NAME="RECURRING_INVOICE_FLAG" />
<ATTRIBUTE LABEL="SUB-ACCOUNT KEY" NAME="SUB_ACCOUNT_KEY" />
<ATTRIBUTE LABEL="TRANSLATED CURRENCY CODE" NAME="TRANSLATED_CURRENCY_CODE" />
<ATTRIBUTE LABEL="VENDOR KEY" NAME="VENDOR_KEY" />
</DIMENSION>
</DP_DIMENSIONS>
- <MEASURES LABEL="AP INVOICE DETAILS" NAME="AP_INV_DETAIL_F">
<MEASURE LABEL="ACCOUNTING (PRE-AP) LAG DAYS" NAME="ACCOUNTING_LAG_DAYS" />
<MEASURE LABEL="INVOICE LINE AMOUNT" NAME="INVOICE_LINE_AMOUNT" />
<MEASURE LABEL="INVOICE LINE EXCHANGE RATE VARIANCE" NAME="INVOICE_LINE_EXCH_RATE_VAR" />
<MEASURE LABEL="INVOICE LINE PRICE VARIANCE" NAME="INVOICE_LINE_PRICE_VARIANCE" />
<MEASURE LABEL="NUMBER OF INVOICE LINES" NAME="NUMBER_INVOICE_LINES" />
<MEASURE LABEL="TRANSLATED CURRENCY AMOUNT" NAME="TRANSLATED_CURRENCY_AMOUNT" />
<MEASURE LABEL="UNPAID AMOUNT" NAME="UNPAID_AMOUNT" />
</MEASURES>
</DP_SCHEMA_DOC>
```

SYSTEMS AND METHODS FOR DEFINING EXECUTABLE SEQUENCES TO PROCESS INFORMATION FROM A DATA COLLECTION

TECHNICAL FIELD

The invention relates to querying, analyzing, and distributing information based on a collection of data such as a database or data warehouse.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Effective decision-making is central to the success of any business. As information age technology matures, electronic data collection has become a widespread practice for assisting in the decision-making process. A typical business enterprise maintains a wide variety of data from various sources, and the data may be in different formats. In recent years, various tools have been developed to help businesses access such a hodgepodge of data. Thus, for many businesses, the volume of available information has reached an all-time high.

Given that it is impossible for one person to comprehend such available information in its totality, other tools have been developed to help decision-makers sift through the available information during the decision-making process. For example, the widely available Structured Query Language ("SQL") has become a popular tool for pulling appropriate information out of a database.

Although SQL is powerful, a user must grasp predicate calculus, database theory, and an understanding of the database layout to use it effectively. So, a user must typically undergo a considerable amount of training before the user can even begin to use SQL, and truly effective use of SQL requires a seasoned database expert.

Often, those users who most need access to the data are skilled at making decisions but are unable to acquire the training and experience necessary to effectively use SQL. For example, a sales manager may be devoted to attracting and keeping clients and not have the time or desire to learn the technical details of how the company's database works.

Accordingly, SQL effectively serves as a barrier between the decision-maker and the information in the database. One way to overcome such a barrier is to provide a blanket report to all users, who must then peruse the report to find the portions that apply to them. However, such an approach places the user at the mercy of the group who generates the report. The report may have too much or too little information to be effective.

To address SQL's problems, other tools have emerged. For example, a technique called "query by example" has been put forth as a user-friendly tool for extracting information from a database. In a query by example system, the user is presented with a representation of columns of tables in the database and can choose which of the columns are desired. The user can further limit the information by specifying criteria, such as dates and other values.

SUMMARY

The query by example technique has become a popular tool for non-technical users who wish to sit at a computer and compose a series of impromptu queries in search of meaningful data during the decision-making process. Such an approach is sometimes called "ad-hoc analysis." Ad-hoc analysis still requires some knowledge of database theory, but is often less intimidating than SQL to novice database users.

For example, a sales manager may decide that it would be useful to see dollar sales for items sold in her territory for last month. So, she uses a query by example system to generate a list of items sold in her territory and their dollar sales for December 2000. Looking at the results, she may decide to further investigate the items having the most sales by composing additional queries or taking other action. During the decision-making process, a decision-maker may explore various possibilities and find that original assumptions were wrong and need to be adjusted.

Another user, such as a shipping manager might be interested in yesterday's unit sales for items coming out of his warehouse. So, he uses a query by example system to generate a list of orders for items coming out of his warehouse for Jan. 5, 2001. He might then decide that he needs to order more of a particular shipping container based on an unusually high number of orders for certain unusual products.

Thus, some individuals in an organization might be able to master the technical skills required to extract meaningful information from an organization's data collection.

While the SQL language is powerful, and the query by example system has provided greater data access to non-technical users, both suffer from a number of drawbacks.

First, the query by example system still requires some expertise to master. Thus, in a typical organization, a few individuals acquire the skills to effectively analyze an organization's data, while many others must rely on others to provide information for them.

Decision-makers in the organization who have the experience and expertise required to more effectively seek out information are sometimes called "data experts." Unfortunately, data experts must often rely on others to master technical details related to software, so they cannot effectively direct how information flows to them.

Second, in the example of the sales manager above, she may find herself engaging in the same set of queries on a regular basis. Based on the results of the queries, she might run other queries to further investigate data, or trends in data. Over time, she might build up a collection of queries that she runs on a periodic basis that enable her to make proper decisions and achieve superior performance in her organization. She has thus become an expert at sifting through the organization's data, making her both a data expert and a technical expert.

When the sales manager is asked why she has been able to achieve superior performance, she is usually not able to provide tangible reasons. However, someone watching her daily routine could construct a sequence of activities embodying her decision-making process.

Others in the organization, however, do not benefit from her routine because they do not know about it, and they cannot easily share it. Further, the details of her particular situation might not apply to other sales employees. For example, she may be a sales manager overseeing a sales force covering a geographical territory including the Pacific Northwest of the United States. Other sales managers in the organization can not effectively use her queries because they are assigned to a different territory. Changing the queries requires technical expertise typically beyond the average sales manager in the organization. So, the potentially powerful expertise of the sales manager is not properly leveraged to benefit the organization.

Further, a different sales manager might have different ideas about what information is important and might want to slightly modify her sequence. Still further, an upper-level manager might be interested what the sales managers are doing and how they are monitoring information, but the upper-level manager might not have the time to run the queries and might only be interested when exceptional circumstances arise.

Finally, as circumstances and situations change, the sales manager may find herself constantly adjusting her query collection so that it reflects her most current understanding of her department's operations. So, if someone were to copy her query collection, her adjustments would not propagate to the copied versions.

Yet another drawback to traditional SQL and query by example systems is that they typically produce their results in the form of a table. Distribution and formatting of the results is thus limited and is not suited to the current needs of businesses, such as routing information to a web site or a wireless device.

Further compounding these difficulties is the fact that organizations now find themselves facing a hodge-podge of data sources, each of which may be stored differently and accessed via different conventions.

The disclosed embodiments include methods and systems relating to various ways of addressing issues surrounding scenarios involving decision-making based on a collection of data. Various features can help an organization more effectively leverage their data collection to improve decision-making.

In one arrangement, a decision-making process is automated by selecting discrete coupleable items executable in a computer-implemented workflow environment. An executable workflow is created by coupling the items.

In another arrangement, information is extracted from a data collection, processed, and distributed in a variety of configurable ways. For example, information can be sent to reports, wireless devices, web pages, or other destinations.

In another aspect of an embodiment, a query-analyze-distribute operation is performed on the data collection. The operation can include multiple discrete executable processing directives, such as one or more discrete executable query directives, one or more discrete executable analysis directives, and one or more discrete executable distribution directives. Discrete executable event directives can also be included.

In another aspect, the query directives, analysis directives, distribution directives, and event directives can be arbitrarily assembled into a sequence. A user with little technical expertise can assemble the sequence via a graphical user interface. Further, the query directives, analysis directives, distribution directives, and event directives can be shared among users. Also, users can share sequences.

In another aspect of an embodiment, interim results of data collection processing can be examined. Such an approach can be particularly useful, for example, when determining how to revise or refine the processing, which can otherwise be difficult. Thus, individuals in the organization can more effectively determine why provided results do not meet their needs or expectations. And, they can more easily modify processing so it better meets their needs.

In yet another aspect, templates for the query directives, analysis directives, distribution directives, and event directives can be provided. For example, different information for binding to the templates can be specified for the same query directive template. In this way, the same query directive template can be used by different users to achieve similar results, but the results can be customized to address a user's situation.

The templates can also be particularly useful for non-technical people. For example, the technical aspects of a query directive, analysis directive, distribution directive, or event directive can be handled by a technical user, while the business expertise aspects can be handled by a non-technical person. Such an arrangement can enhance the ability of non-technical people to master use of an organization's data collection. The templates can be shared.

Information passed among the directives (e.g., the results of the query directives and analysis directives) can be stored in a markup language format, such as XML. Such an arrangement allows the query processing, analysis processing, distribution processing, and event processing to be loosely coupled, facilitating interchange and assembly of arbitrary sequences of query directives, analysis directives, distribution directives, and event directives. Although not to be construed as a limitation, the directives may sometimes be called "pluggable directives."

In still another aspect of an embodiment, processing can be scheduled for automatic periodic execution. Also, event directives can trigger execution of processing in response to detecting an event or a condition (e.g., a state change in a data collection).

In some cases, it may be desirable to distribute information only if certain unusual circumstances (e.g., "exceptions") are detected. Thus, distribution of information may be inhibited if indicated in a sequence.

The features of embodiments may be combined to generate targeted personal notifications. For example, a CEO might be ultimately responsible for operation of the entire organization. Such an individual cannot be expected to review all data for the organization, but notifications can be provided when certain parameters go outside of acceptable guidelines.

Various other features, such as event directives, drill-down, branching and gating can provide a rich environment for controlling the flow of execution and data between processing directives.

Additional features and advantages of the various embodiments will be made apparent from the following detailed description of illustrated embodiments, which proceeds with reference to the accompanying drawings.

The present invention includes all novel and nonobvious features, method steps, and acts alone and in various combinations and sub-combinations with one another as set forth in the claims below. The present invention is not limited to a particular combination or sub-combination.

BRIEF DESCRIPTION OF THE DRAWINGS

FIGS. 16A–16C are screen shots showing alternative exemplary techniques for defining a sequence.

FIG. 18 shows exemplary markup language for registering a directive.

FIGS. 19A–19I shows exemplary markup language for exemplary processing directive registrations.

FIGS. 20A–20E shows exemplary markup language for defining a result set.

FIGS. 21A–21T shows exemplary markup language for defining a sequence.

FIGS. 22A–22B shows exemplary markup language related to a source server.

FIGS. 23A–23G shows exemplary markup language for representing database schema.

DETAILED DESCRIPTION

Overview of the Technologies

Figure 1:
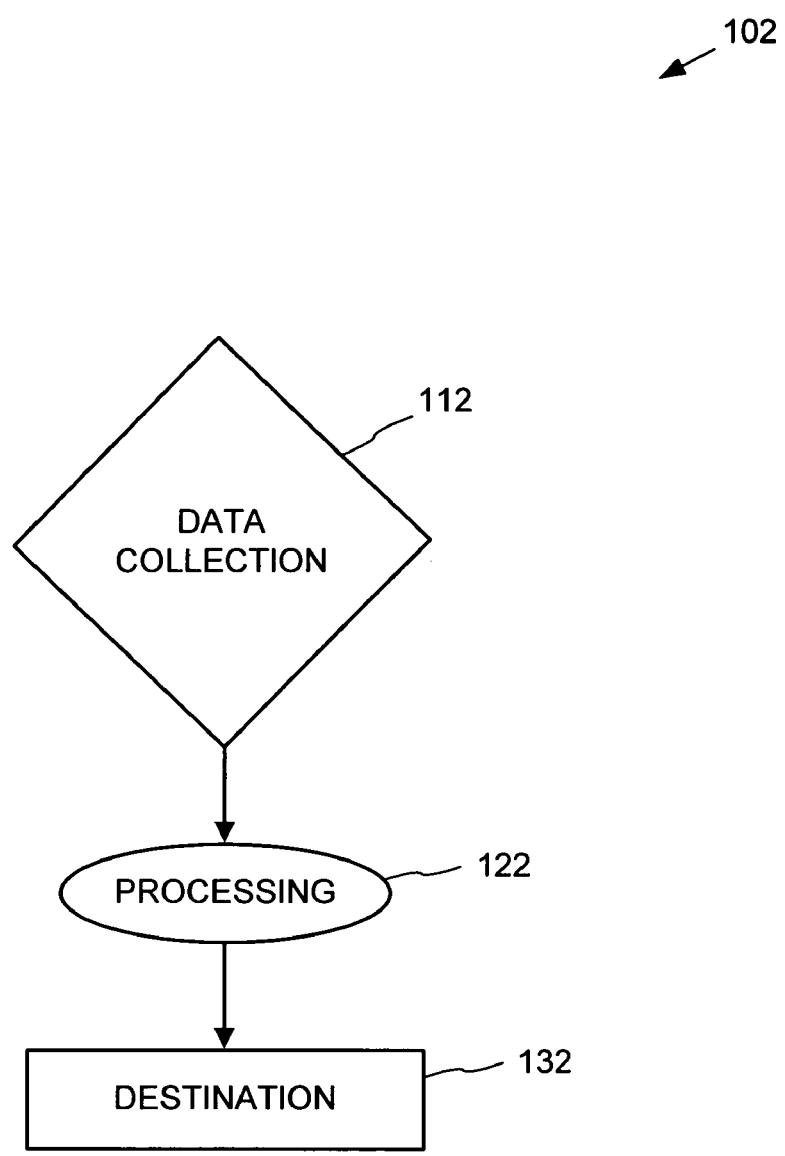
FIG. 1 is a high-level block diagram of an exemplary overview of technologies associated with certain of the embodiments.

The technologies described herein can be used in a wide variety of scenarios. An exemplary arrangement 102 is shown in FIG. 1. Information from a data collection 112 is processed at 122, and routed to a destination 132. The data collection 112 can be any of a variety of forms, including databases, data warehouses, data marts, and the like. In some cases, the data collection 112 can be a data warehouse having a collection of databases with a hodge-podge of database schema. In such a case, information concerning the schema can be stored to associate disparate databases in the data collection 112.

In practice, a data collection 112 for an organization is typically dynamic in that it regularly changes as activities take place within the organization. In this way, the data collection 112 can indicate a state (e.g., performance or condition) of the organization, indicate a state related to a decision, or indicate a decision is to be made. The data collection can include any of a variety of information related to the organization, such as maintenance, manufacturing, manufacturing plant, marketing, order entry, payroll, purchasing, quality, resources, sales (e.g., product, non-product, and sales management), sub-assembly plant, support, training, travel and entertainment expenses, vision operations inventory, regional sales, or other operational, financial, sales, inventory, cost, revenue, cost center, or department information.

The processing 122 can be any of a variety of forms, including queries, analyses, algorithms, filters, formatting, preparation for distribution, distribution, detection of events, and the like. For example, the processing 122 can involve pulling records from various databases in the data collection 112, formatting information derived therefrom, and sending the formatted information to a destination 132.

The destination 132 can also take a variety of forms, including wireless devices, printers, client computers, files, databases, or the like. For example, a destination can be a web page so that the information taken from the data collection 112 is made part of a web site browsed by remote users.

The information sent to a destination 132 can include one or more user interface elements. Responsive to activation of the user interface element, the data collection 112 can be updated to reflect that the user interface element was activated and when it was activated.

Figure 2:
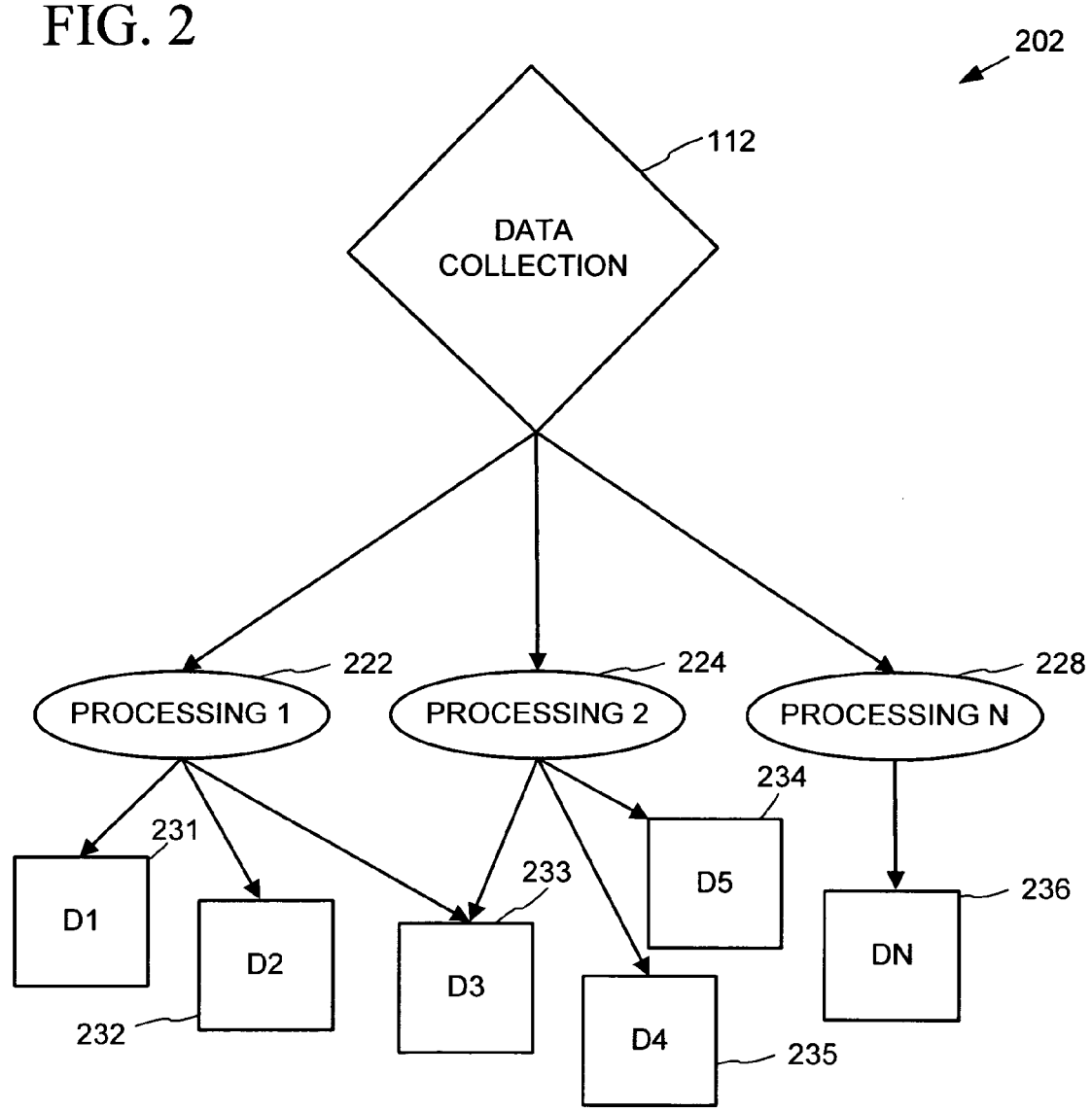
FIG. 2 is a high-level block diagram of another exemplary overview of technologies associated with various embodiments.

In practice, the arrangement can, as an example, take the form 202 shown in FIG. 2, such that information from the data collection 112 is processed on multiple occasions 222, 224, and 228, and information is sent to multiple destinations 231–236. Processing can take place in parallel, and processing can be scheduled to automatically take place at periodic intervals. In some cases, instead of a single data collection 112, multiple data collections can be used, or multiple data collections can be defined to be a single data collection 112.

In some cases, it is desirable to limit the distribution of information to a particular destination to only those instances in which one or more certain measured parameters are within or outside of specified values or ranges. Such instances are sometimes called "exceptions."

A particular computer system is not shown in FIG. 2 because the technologies can be implemented on any of a variety of computer hardware and software systems. For example, the data collection 112 can reside on a single storage device, a set of devices, or a mixture of various devices of various forms. The processing can be performed on a single computer, a set of computers, or a mixture of various computers of various forms. Finally, the destinations can also take many forms.

Example 1

A Query-Analyze-Distribute Approach

Figure 3:
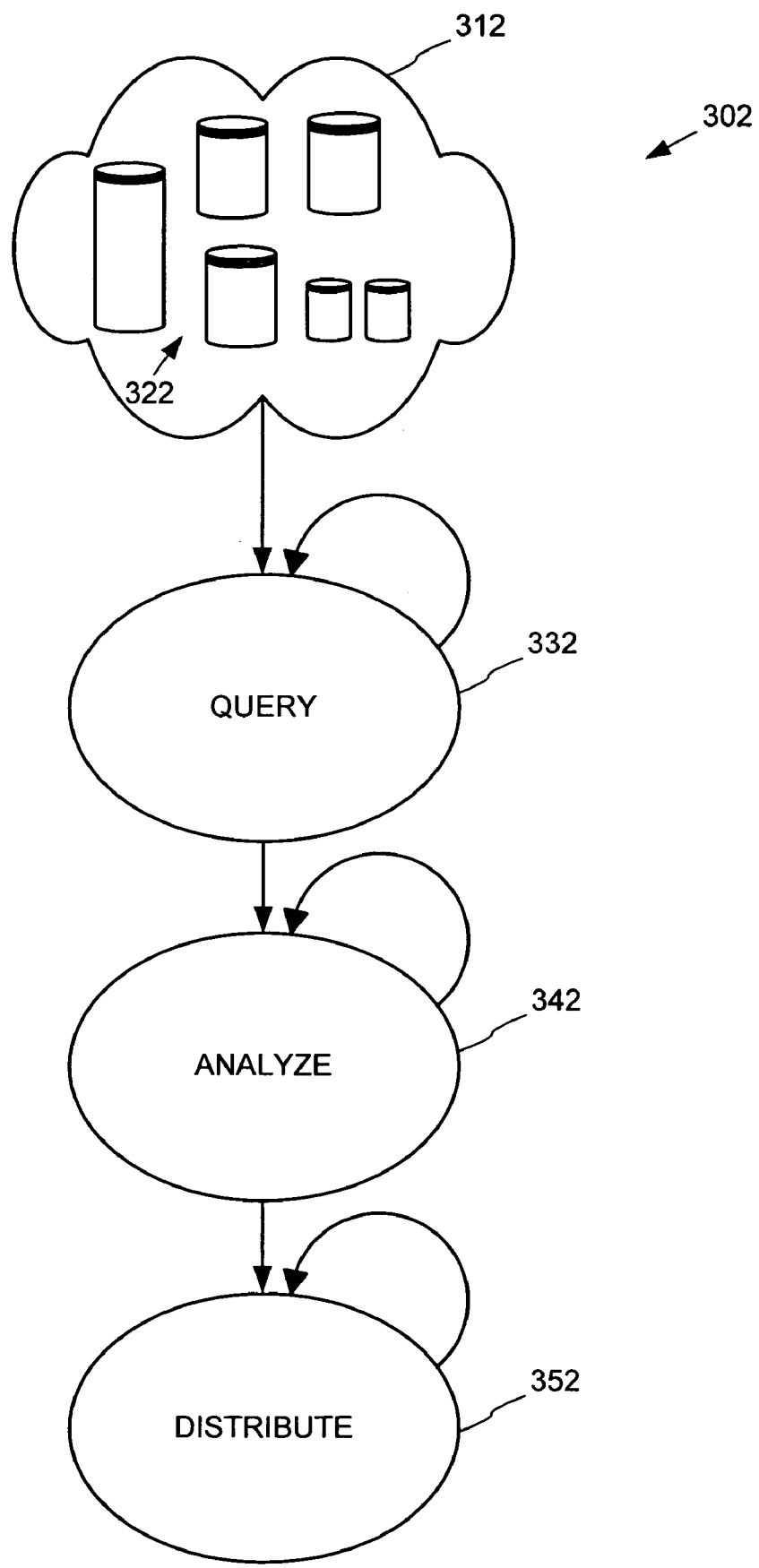
FIG. 3 is a high-level block diagram showing an exemplary query-analyze-distribute approach.

An exemplary implementation of the processing shown in FIGS. 1 and 2 is a query-analyze-distribute approach. For example, FIG. 3 shows such an approach 302. In the example, a data collection 312 includes a set of databases, including a database 322.

A query cycle 332 engages in one or more queries to produce information derived from the data collection 312. Then, an analysis cycle 342 subjects the information from the query cycle to one or more analyses. Then, the distribution cycle 352 distributes information from the analysis cycle to one or more destinations. The distribution cycle 352 typically also includes processing related to formatting the information so it is of proper format when it reaches its destination.

The query-analyze-distribute approach can help an organization better divide the tasks of extracting, processing, and routing information. The various technologies described herein can be combined to provide a rich environment providing users with a wide variety of features related to developing, modifying, and sharing functionality related to the query-analyze-distribute approach.

Example 2

Providing Access to Interim Processing Results

Figure 4:
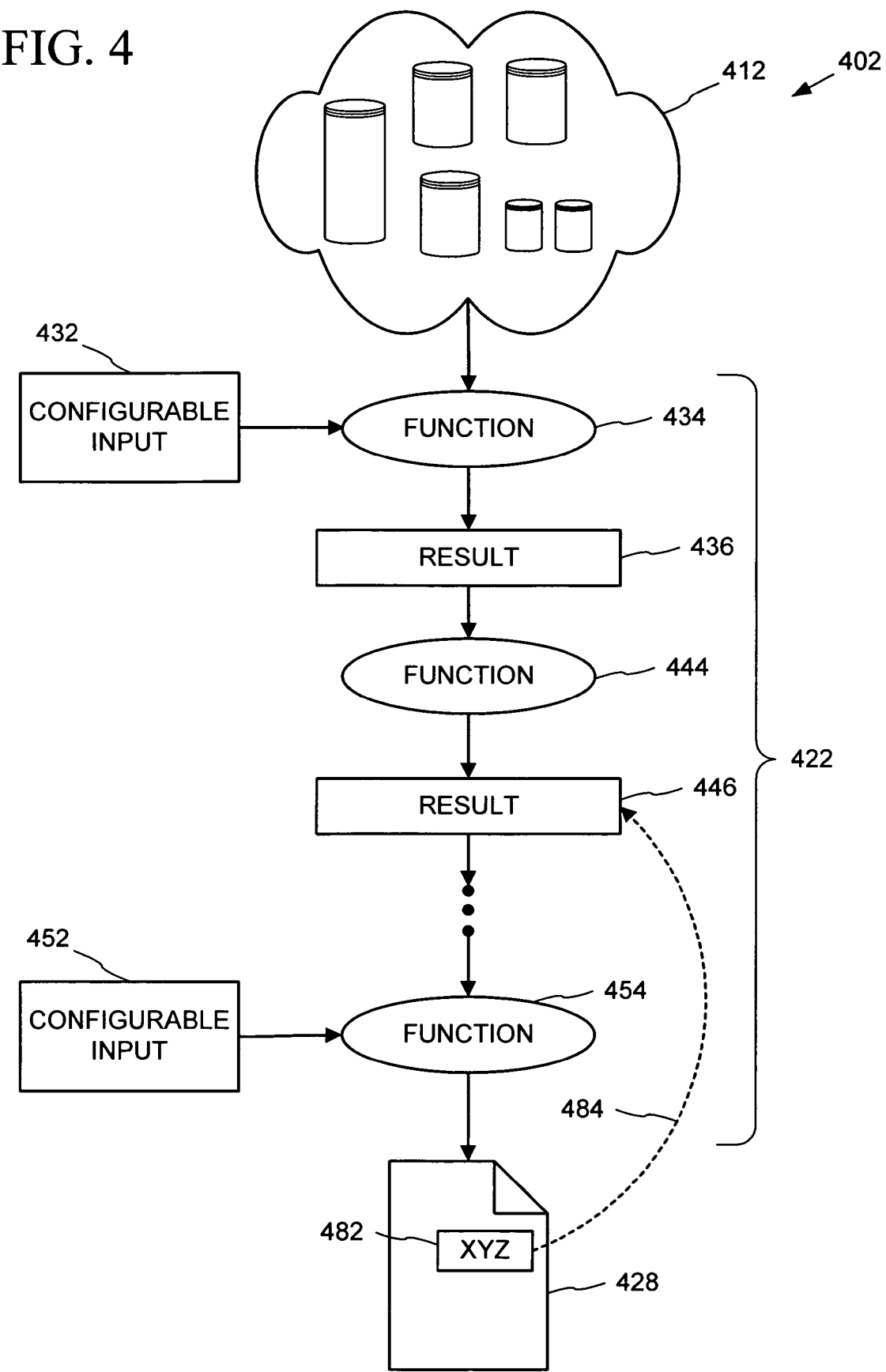
FIG. 4 is a block diagram showing an overview of an exemplary arrangement for providing access to interim processing.

FIG. 4 shows an exemplary arrangement 402 for providing access to interim results (e.g., interim results of processing 122 of FIG. 1). In the example, a data collection 412 is subject to processing 422, resulting in output, which may be in the form of a document 428.

Some of the functions 434, 444, and 454 may be of a form that accepts configurable inputs, such as 432 and 452. The configurable inputs 432 and 452 can take the form, for example, of parameters stored and appropriately associated with the functions 434, 444, and 454.

In the example, the recipient of the document 428 may be provided with access to the interim results, functions, and inputs of processing 422. For example, a list of the various results, functions, and inputs can be presented upon request. Or, as shown in the example, a reference 482 can be included in the document 428, which serves as a link 484 to interim processing (e.g., result 446).

The arrangement can be particularly useful in adjusting the processing 422. For example, the document 428 might be too inclusive, under-inclusive, or simply incorrect. A user can examine the various elements of interim processing to determine why it is that the document 428 appears as it does and to determine how to fix the problem.

Such an approach is well-suited to, for example, slight adjustments and customizations to the document (e.g., sometimes called "tweaking") as might be desired. For example, a user might be annoyed when repeatedly provided with documents that incorrectly indicate a critical condition and may even learn to ignore such documents. However, if the user can easily modify the processing so that notifications are only provided when further investigation warrants, the user will pay more attention to the notifications and might find new ways to use them.

Further, a user can use the described approach to trace the processing to uncover a defect (e.g., "bug") in the processing. Finding such a defect can otherwise consume considerable time and effort.

Example 3

Sequences

To facilitate processing, the various executable processing directives can be associated together into a sequence. Various operations can then be performed on the sequence, such as execution, scheduling, modification and sharing.

Figure 5:
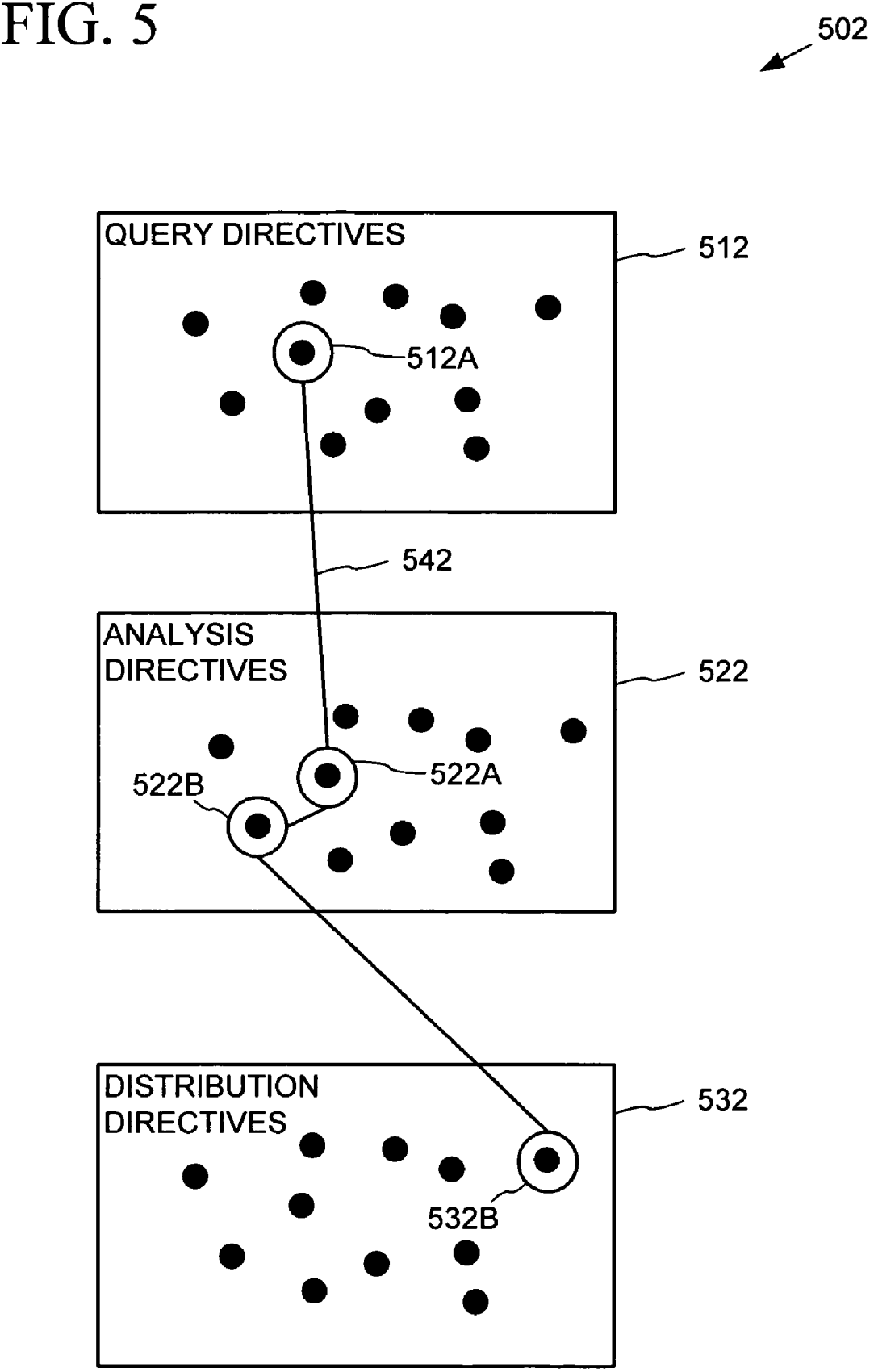
FIG. 5 is a block diagram showing an overview of an exemplary arrangement involving a sequence.

An exemplary arrangement 502 showing sequences is shown in FIG. 5. In the example, an environment stores a set of executable query directives 512, a set of executable analysis directives 522, and a set of executable distribution directives 532. The executable processing directives shown can be associated together into a sequence 542. In such an arrangement, when the sequence is executed, the query directive 512A is processed. The results of the query 512A are then provided to the analysis directive 522A, and the results of the analysis directive 522A are then provided to the analysis directive 522B. Finally, the results of the analysis directive 522B are provided to the distribution directive 532B.

Another type of executable processing directive, an executable event directive, can be used to trigger initiation of execution or resume execution based on an event or detected condition. For example, execution can be initiated upon detection of a state change in a collection of data. Or, execution can be suspended until expiration of a timer or detection of activation of a user interface element.

Of course, in some cases, more or fewer queries, analysis directives, and distribution directives can be included in the sequence. And, more than one sequence can incorporate any of the query directives, analysis directives, distribution directives, and event directives. Typically, a sequence can have more than one processing directive and at least one query. Other sequences have at least one query and at least one distribution directive. Still other sequences have at least one query, at least one analysis directive, and at least one distribution directive.

On a general level, the queries can serve to extract the information from a data collection. Some queries may involve minimal processing, such as taking records from a single database table. Other queries can be quite complex, such as performing a join across multiple tables in disparate databases in a data warehouse. In addition, the queries can include additional processing related to ensuring the query is properly completed, such as monitoring a query's progress, and re-running the query if it does not successfully complete.

Again on a general level, the analysis directives can serve to process the information extracted by the queries. Some analysis directives may involve minimal processing, such as finding all records relating to a particular value. Other analysis directives can be more complex, such as finding values that are both in the top ten percent and over a specified threshold. Still others may include custom code for performing any arbitrary analysis.

Still again on a general level, the distribution directives can serve to format and route the information provided by the analysis directives. Some distribution directives may involve minimal processing, such as simply printing information in tabular form. Other distribution directives can be more complex, such as formatting data appropriate for presentation on an interactive web page, transferring the web page to a web site, and emailing the page to a web administrator. Still other distribution directives can present a decision to a decision-maker and record the response.

To assist in creating sequences, a graphical user interface providing a list of menu options can be presented. Additionally, the user interface can be of a markup format (e.g., HTML) appropriate for presentation via a web browser. In this way, sequences can be created remotely or locally within the organization. A sequence can be assembled from pre-made processing directives, or the processing directives (e.g., a query) can be created as the sequence is created. In this way, a sequence can be built entirely by selecting menu options and filling in fields, rather than engaging in conventional code-based programming.

When the sequence is defined, at least two of the processing directives can be denoted as coupled. When executed, the flow of execution can pass from the first coupled element to the second coupled element. Information can be passed between coupled elements as described in the below example involving result sets.

In addition, the sequence's processing directives can be based on templates, and the templates can be selected from a menu. For example, in an example involving extracting all records related to a particular department, the value for the department can be left unbound. Subsequently, when the sequence is specified, a value for the department can be provided and then bound for use when the query is executed.

Figure 6:
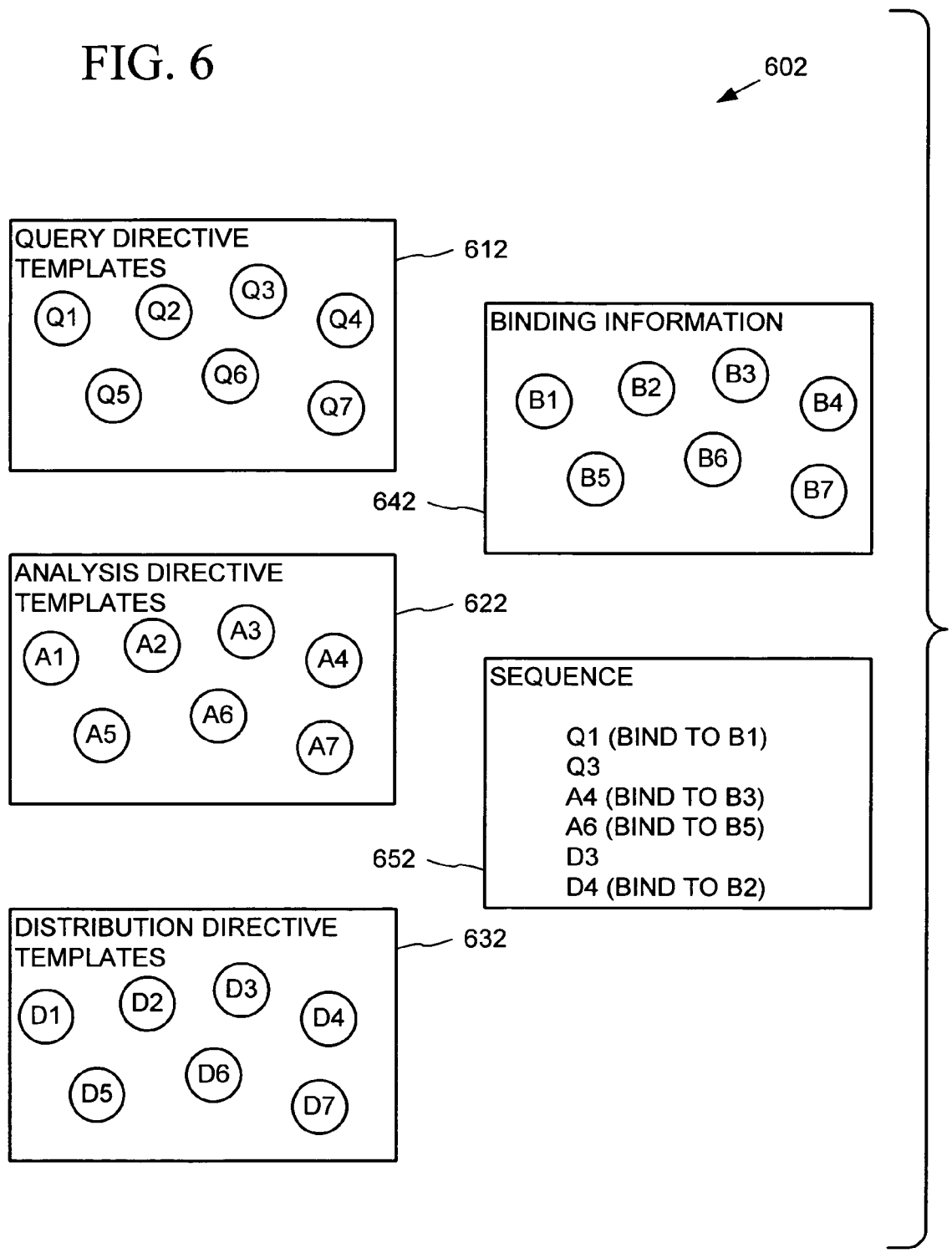
FIG. 6 is a block diagram showing an exemplary arrangement involving a sequence having processing directives based on templates.

An arrangement 602 involving templates in a sequence is shown in FIG. 6. In the example, the query directive templates 612, analysis directive templates 622, and distribution directive templates 632 can be stored in unbound format. Additionally, the binding information 642 is stored for binding to the various processing directives. In this way, a sequence 652 is stored by references to the processing directives 612, 622, and 632 and the binding information 642. Event directive templates can also be supported.

In some cases, it may be advantageous to forgo defining multiple templates. For example, distribution directives might be based on a single, multi-purpose template.

Figure 7:
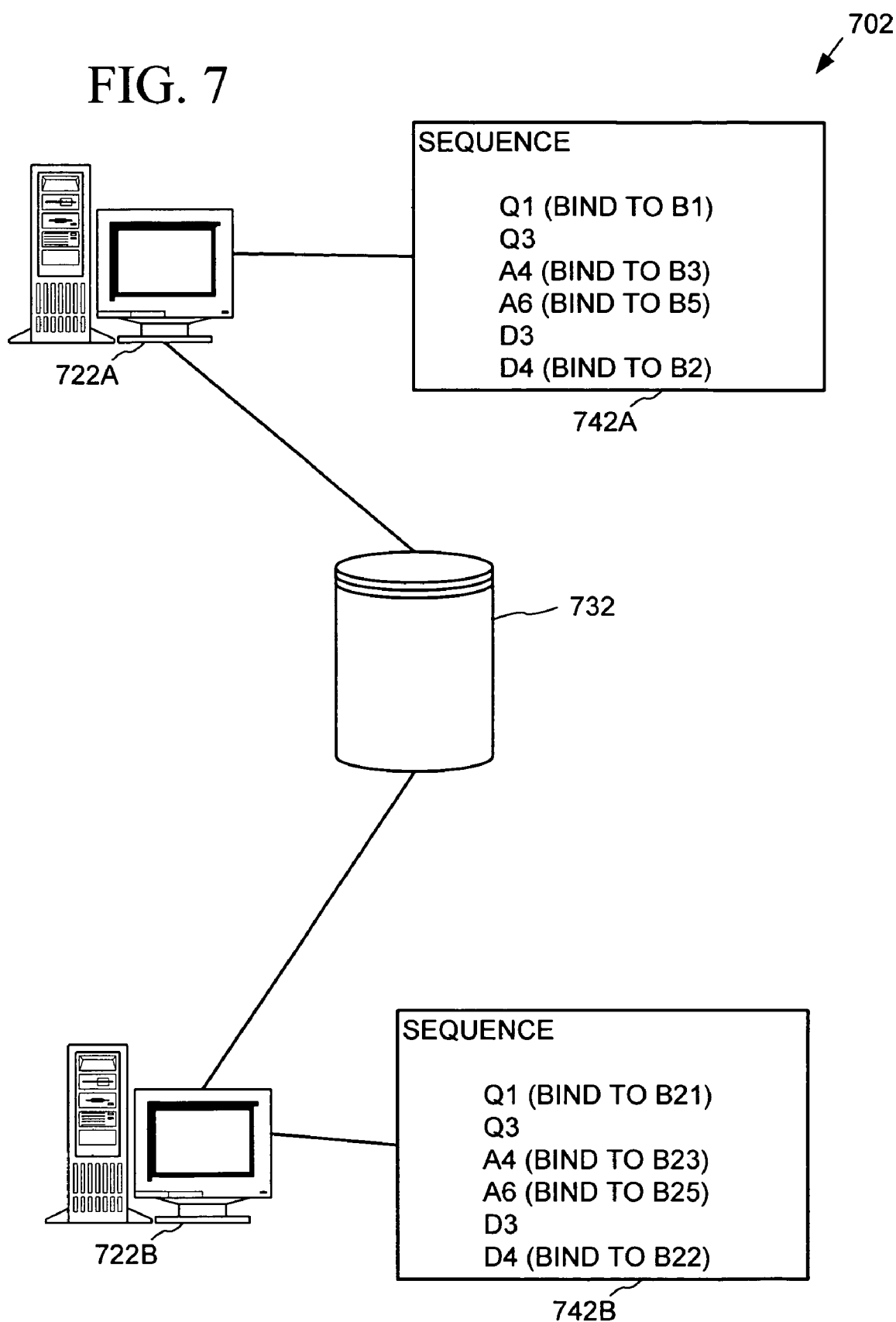
FIG. 7 is a block diagram showing an exemplary arrangement for sharing aspects of a sequence.

Additionally, the various aspects of a sequence can be shared. For example, FIG. 7 shows an exemplary arrangement 702 for sharing a sequence. Data related to a set of sequences is stored in 732 and can be shared by the computers 722A and 722B. Although an identical sequence can be shared, in the example, two similar sequences are shared. The first sequence 742A is similar to the second sequence 742B in that both of the sequences use templates for the same processing directives in the same order, but the templates use different binding information. In this way, two departments in an organization can use and share the same processing logic while customizing certain aspects of processing to suit their particular needs.

Accordingly, a user who develops a particularly useful sequence, processing directive, or template can share work product with others in organization. Similarly, a third party can develop sequences, processing directives, or templates for use by other organizations. Or, an organization can assign a group to develop sequences, processing directives, or templates for use across departments. If desired, the sequences, their elements, and templates can be customized to address the circumstances peculiar to its users. The sequences can be provided for installation by a receiving system or shared within or among systems.

The lineage of a sequence can be tracked to determine from where a sequence originated. For instance, it can be determined that a department is using a variety of sequences, most of which are based on a parent sequence originating from a particular user. Such a user might be identified as a data expert, and others may wish to consult the data expert when building additional sequences.

Finally, the interim processing access feature described above with reference to FIG. 4 can be used in conjunction with sequences, so that a user can modify or debug a sequence.

Example 4

Result Sets

Figure 8:
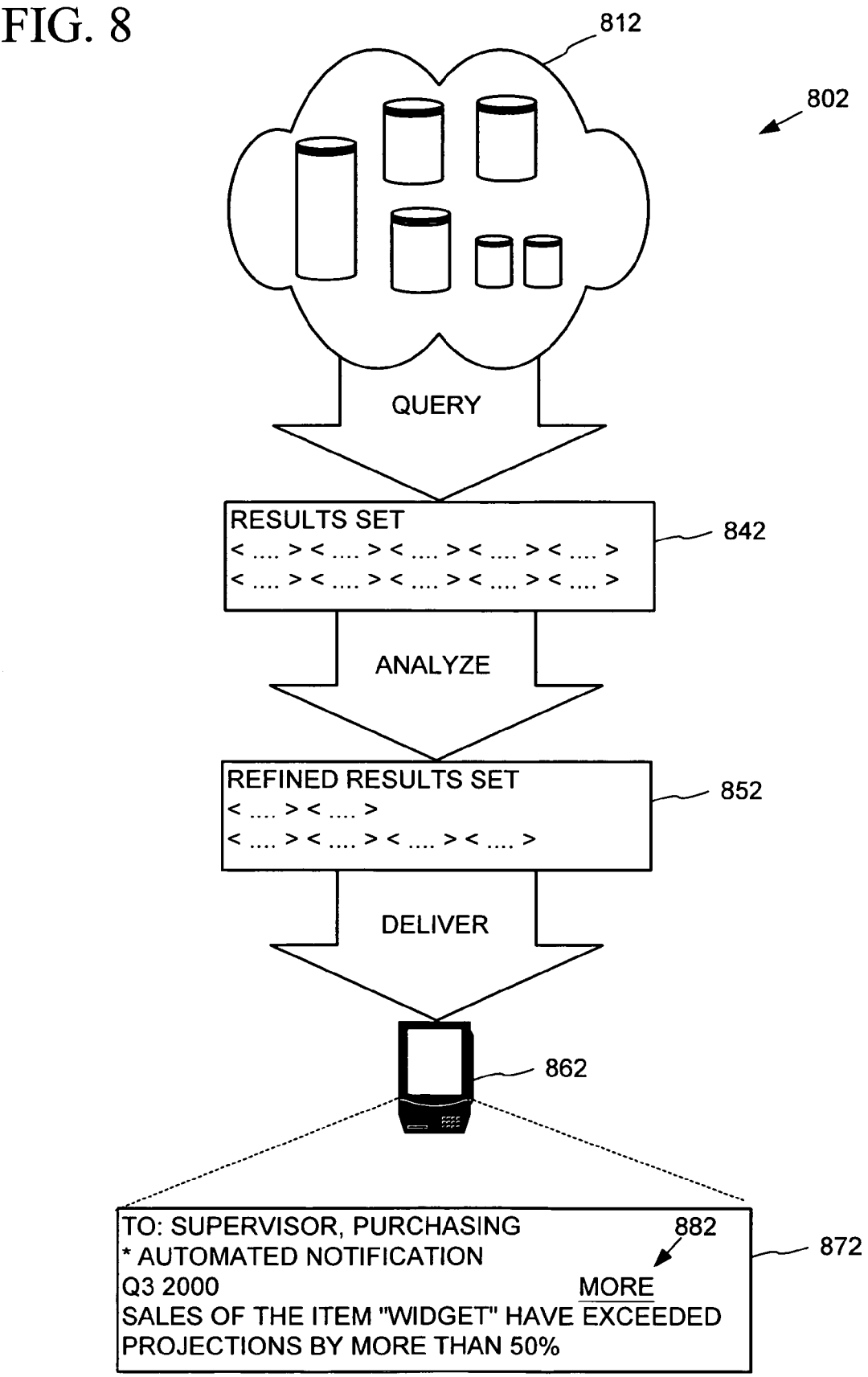
FIG. 8 is a block diagram showing an exemplary arrangement for storing interim results.

An exemplary arrangement 802 for storing interim results is shown in FIG. 8. Result sets can be used to communicate information between coupled directives during execution of a sequence. In the example, a result set 842 is generated by performing a query on a collection of data 812. The result set 842 can be represented via a markup language, such as the Extensible Markup Language (XML). Other markup languages may be used.

The refined result set 852 is generated by performing analysis on the result set 842. The refined result set 852 can be in the same or a similar markup language, again, such as XML. Plural refining analyses may be performed.

The refined result set 852 can then be used to generate formatted output, which can be delivered (e.g., via distribution directives) as desired. In the example, a notification 872 is sent to a wireless device 862. The notification 872 includes a reference 882 (e.g., a hyperlink), which may provide further information, including a way to examine the result sets 842 and 852.

XML typically takes the form of sets of attributes and values, and query results can be represented in XML by indicating the fields and values for a set of records appearing in one or more tables. For example, Table 1 shows an exemplary database table having a set of records.

TABLE 1

Records in Database Table

| cost center | ptd actual | ptd budget | ptd variance |
|---|---|---|---|
| 702 | 123329.23 | 120000.00 | 3329.23 |
| 804 | 58343.98 | 65000.00 | 6656.02 |

Table 2 shows an XML representation of the records of Table 1.

TABLE 2

XML Representation of Records

```
<result_set>
    <row>
        <cost_center>702</cost_center>
        <ptd_actual>123329.23</ptd_actual>
        <ptd_budget>120000.00</ptd_budget>
        <ptd_variance>3329.23</ptd_variance>
    </row>
    <row>
        <cost_center>804</cost_center>
        <ptd_actual>58343.98</ptd_actual>
        <ptd_budget>65000.00</ptd_budget>
        <ptd_variance>6656.02</ptd_variance>
    </row>
</result_set>
```

Although XML representations can be lengthier than conventional result representations, an XML representation has the advantage of permitting loose coupling between the various processing directives.

For example, the logic and format of queries can be modified and upgraded as desired over the lifetime of a system incorporating the described features, but the output of the queries can be uniformly provided in XML format. Accordingly, the logic and format of analysis directives can be modified and upgraded as desired without regard to modifications made in the query logic because the input to the analysis directives is known to be of a common format.

Similarly, the logic and format of distribution directives can be modified and upgraded as desired without regard to modifications made in other logic of the system, again because there exists the common result set representation.

Thus, the queries, analysis directives, and distribution directives are loosely coupled in the example. An additional advantage to an arrangement using XML or a language having similar characteristics is that similar tools can be used to inspect and manipulate interim result sets, regardless of which processing stage generated a particular result set.

Example 5

Destinations

Figure 9:
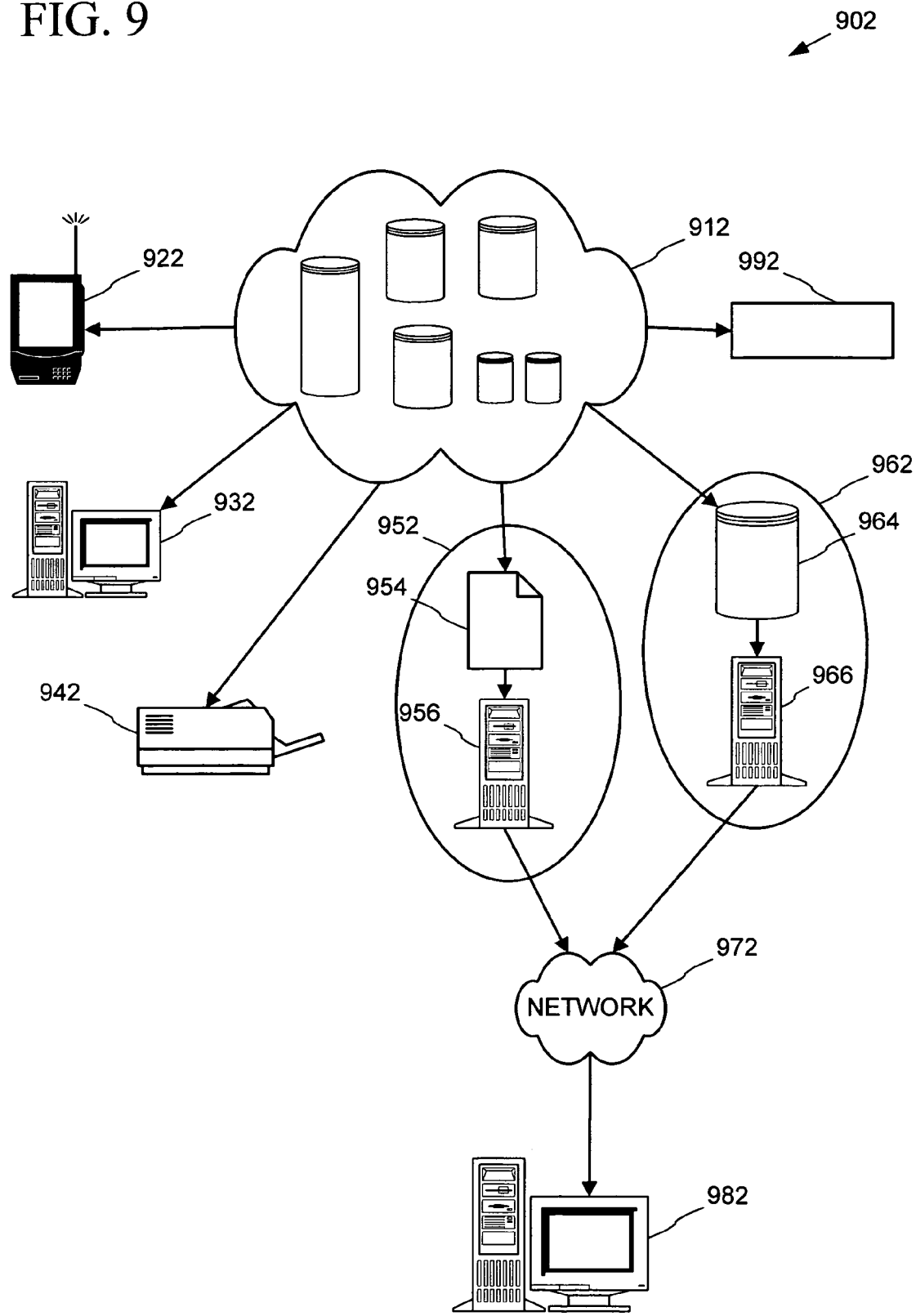
FIG. 9 is a block diagram showing exemplary destinations for information derived from a data collection.

The technologies described herein can support a wide variety of destinations. For example, FIG. 9 shows an arrangement 902 in which information derived from a data collection 912 can be distributed to any number of shown destinations.

Information can be sent as a message to a wireless device 922. For example, a notification can be sent via a wireless access protocol. The notification can include information derived from the data collection 912 or serve as a notification of or reference to such information.

Information can be sent in a variety of ways to a computer 932. For example, an email can be sent to an email server accessible to the computer 932, which can access the information derived from the data collection 912 by reading the email or following a reference embedded in the email.

Also, a network notification (e.g., an instant message) can be sent to the computer 932. Again, the network notification can include information or provide a reference or link to information.

Another way to provide information to the computer 932 is to send the information to a file accessible by the computer 932 (e.g., by floppy disk, CD-ROM, network drive, or the like).

Information can be sent to a printer 942 in a variety of ways, such as via a print server or some other interface to the printer 942.

Information can be sent to a web site 952 by routing the information to a web document 954 (e.g., in HTML format). The information can then be accessed by a computer 982 having access to web server 956 over a network 972 (e.g., the Internet). Alternatively, the information can be sent to a web site 962 by routing the information to a database 964, from which a web server 966 gathers information for serving web pages to the network 972.

Information can also be sent to another destination 992. For example, technologies developed after the system is established can be incorporated into the system by creating appropriate logic.

A system using distribution directives can include distribution directives for specifying any of the illustrated exemplary destinations.

Example 6

A Query-Analyze-Deliver-Refine Loop

The technologies described herein are particularly useful in that they can be combined to create a system that can be constantly refined and revised to address changing conditions and new insights. For example, the system supports automatic periodic execution of sequences. When a recipient receives the results of a sequence, interim processing can be investigated to refine and revise the sequence processing. Upon the next execution of the sequence, more relevant or useful information can be provided.

Figure 10:
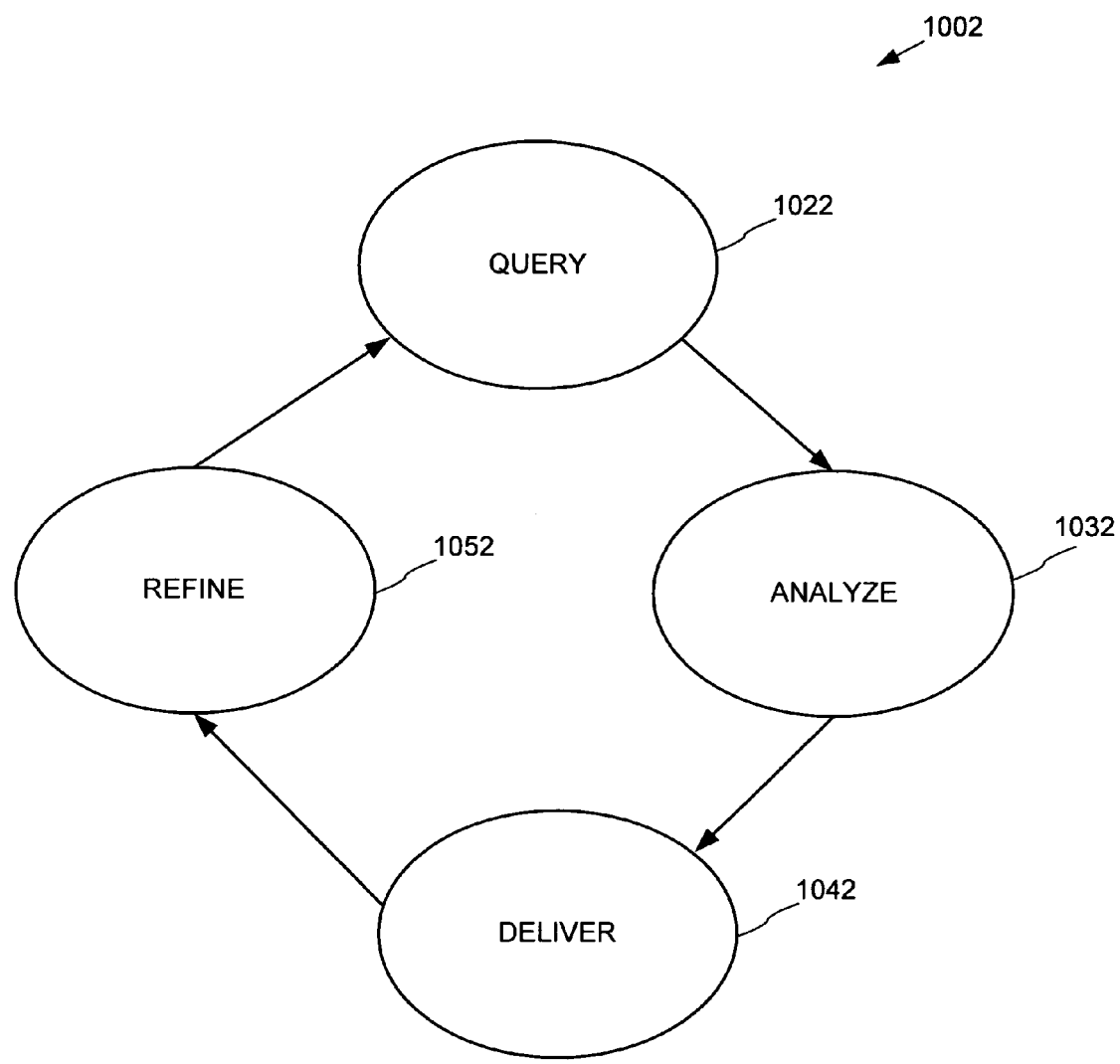
FIG. 10 is a block diagram showing a query-analyze-deliver-refine loop.

A general illustration of such an arrangement 1002 is shown in FIG. 10. At 1022, a query cycle is run on a data collection. Then, at 1032, the resulting information is subjected to an analysis cycle. The resulting information is then delivered at 1042. Refinements to the processing can be done at 1052. Accordingly, the next query cycle incorporates the refinements, if any.

In many cases, the person most knowledgeable about which parameters should be adjusted is a non-technical user. In scenarios utilizing templates, such a non-technical user can change the parameters easily via a user interface without regard to the technical details underlying querying, analysis, and delivery. In this way, non-technical users can become quite skillful in controlling the flow of information to them.

Example 7

Query Directives

A discrete executable query directive is a processing directive that can perform a query and provide a result set. As described above, the query directives supported by a system can range from simple to complex.

Examples of query functions supported include filter operators (e.g., >, <, !=, "in" and the like), run on refresh (e.g., to specify the query is to be run whenever the table is refreshed), grouping (e.g., "SUM" and the like). Typically, a query is specified by designating appropriate columns and appropriate filters. A wide variety of other approaches are possible for queries.

The logic required to implement a rich set of queries can be quite involved. Accordingly, software for executing an instance of the query directive can handle the technical details related to queries. The executing software can serve as an abstraction layer so that users creating queries need not be concerned with the underlying structure of the data collection and how it is accessed. In this way, a generic set of instructions for gathering a data set can be converted into specific instructions appropriate for a particular data collection. The query directives can draw information from any type of source system, such as an On-Line Transaction Processing (OLTP) system or a data warehouse system.

For example, any data collection providing a programmatic interface and having an access language can be supported. Software executing the query directives can translate the query directive into actions (e.g., interaction with the programmatic interface) as appropriate. Specific details of how the data collection works need not be incorporated into the query directive.

An access driver can be used to accomplish translation. A new access driver can be provided for data collection types if needed. In this way, the same query directive can be run on any of a number of data collections, and the executing software can refer to the access driver without having to account for the details of how a particular data collection works or is accessed.

In the case of a data warehouse, the databases may be accessed via different database conventions (e.g., SQL, OLAP, ODBC, and the like). The query executing software can serve as an intermediary between a query and the database to convert the query into an appropriate directive for the particular database according to its protocol.

For example, even in the case of an SQL database, the access language is some form of SQL, but programmatic access can be provided by different SQL products in different ways. Different translations can be applied to the same query directive depending on which SQL product is used to implement the target database. The form of the query directive need not be changed even though it may be run on data collections supporting different protocols.

Alternatively, a data collection can be an email database (e.g., such as one in a MICROSOFT EXCHANGE SERVER email software system or an SMTP mail store). Full text retrieval services (e.g., document management systems, web search engines, or other online services) can also be supported. The data collection can range from simple to complex (e.g., a transactional database system).

In addition, data can be inserted into or modified in a data collection in like fashion by a query directive or other processing directives. Data deletion is also possible.

Further, the data collection may be a data warehouse comprising a set of disparate databases having a hodgepodge of formats, fields, and records. Schema information for the databases can be accessed by the query executing software so that the data warehouse appears to be a more unified, consistent database.

Some of the data may be periodically unavailable, obsolete, or busy. When asked to run a query, the query executing software can delay the query or re-schedule it for a more appropriate time so that the query results will be more complete.

Query directive definition software can present a graphical user interface for selecting the various available options, including the available databases, tables, columns, filters, and the like.

Example 8

Analysis Directives

As described above, the discrete executable analysis directives supported by a system can range from simple to complex. The analysis directive can encapsulate the logic associated with its analysis to transform a result set into a refined result set. For example, analysis directives can be simple "greater than x" filters or include more complex filtering operations. To facilitate definition of analysis directives, a graphical user interface can be presented for selecting from various available options.

In any of the scenarios relating to analysis directives described herein, the analysis directives can be used as filters to restrict a sequence so that it continues only if records satisfy the filter. Such an arrangement can be useful for exception notification. In other words, a notification is provided only if values fall outside a specified range (e.g., at least 20% over budget and at least $300,000) or threshold. The values provided for the filter may vary depending on the destination of the notification. For example, a higher-level manager may be interested in particularly critical exceptions from any of numerous departments; a lower-level manager may be interested in more exceptions, but only for one department.

Filter values can be specified as unbound so that a single analysis directive template can be used by a variety of users (e.g., by binding it to a variety of values).

In addition, an analysis directive can include arbitrary processing and branching logic so that it can choose between two or more alternate paths of execution.

Example 9

Distribution Directives

Discrete executable distribution directives can format, distribute, and deliver information. Various features such as those in conventional report generators can be incorporated into the distribution directives.

To assist in defining the distribution directives, a graphical user interface can be presented by which a user can choose how and where information will be presented. For example, in the case of a document, the document may have headers, footers, page numbers, and the like.

Also, simple text can be output, such as "Subject: Shortage Alert; Part: W5-45-7778 is short by 2000 units, and Part W5-45-7779 is short by 5000 units." Such information can be delivered by email, a text pager, or a PDA client.

A particular type of distribution directive called a "presentation directive" presents information to a user. The information presented by the presentation directive can include links to interim processing or user interface items (e.g., a graphical pushbutton) that can be activated by a user. In this way, the user's interaction with the system can be monitored and recorded via event directives as described below.

Example 10

Event Directives

Discrete executable event directives can monitor a variety of conditions or receive communications from other directives. The event directive can be coupled to other directives in a sequence. For example, an event directive can be used in a sequence to wait until a timer expires or an event is received. Such an event might be generated via activation of a user interface element or upon completion of processing.

Figure 11:
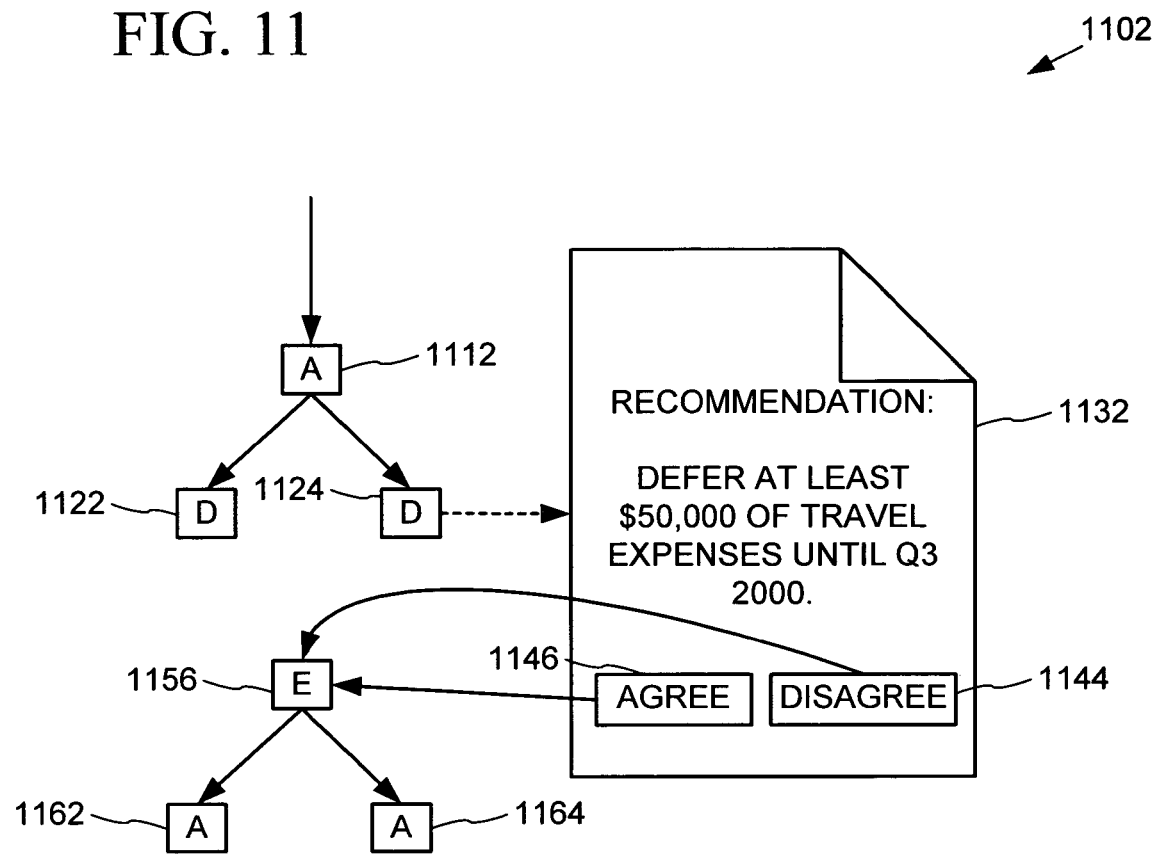
FIG. 11 is a block diagram showing an exemplary event directive.

FIG. 11 shows an example scenario 1102 involving an event directive 1156. As a result of execution of a sequence including an analysis directive 1112, execution was selectively routed between distribution directives 1122 and 1124 to the distribution directive 1124, which sent out the document 1132 (e.g., via email) to a decision-maker. The document 1132 includes a recommendation to the decision-maker. The decision-maker can indicate agreement or disagreement with the recommendation via the user interface elements 1144 and 1146. Upon activation of one of the user interface elements 1144 or 1146, the event directive 1156 is triggered (e.g., by an event indicative of the user's choice) and can further direct execution between subsequent directives 1162 and 1164.

Event directives can also be used to watch for state changes in data, such as when the state of a data collection deviates from a specified threshold, or the like. The event directive can then invoke other directives upon being triggered.

Thus, in addition to being scheduled for automatic execution at regular intervals via a scheduler, execution of sequences can be automatically initiated upon detection of a specified condition via an event directive.

The occurrence of the event can be recorded and stored in the collection of data so that it can be included in subsequent queries. In this way, a sequence can be constructed to evaluate the events, including events relating to user interaction.

Example 11

Metasequences

Because event directives can be used to record user reaction or acknowledgement of information provided by a sequence, a sequence can evaluate its own or another sequence's effectiveness based on user interaction. A sequence that evaluates or takes action based on the effectiveness of itself or another sequence, for convenience, is sometimes called a "metasequence." For example, a metasequence might be constructed to detect that requested acknowledgements are being ignored or that a course of action recommended to a user has been particularly effective.

When sequences are used to inform a group of decision-makers about possible courses of action, metasequences can be used to inform those managing the decision-makers about possible courses of action to take with respect to the decision-makers. For example, a metasequence might indicate that a particular manager has successfully employed sequences to produce superior results. Or, a metasequence might indicate that a particular manager has been unresponsive to automated recommendations by a sequence but has still produced superior results. Such information can be used to identify effective sequences, improve existing sequences, or eliminate ineffective sequences.

Example 12

Gates within a Sequence

A feature called a "gate" can be used to implement sequences having a one-to-many, many-to-one, or many-to-many relationship between coupled directives. For example, FIGS. 12A–E show three examples of how a gate feature operates.

Figure 12A:
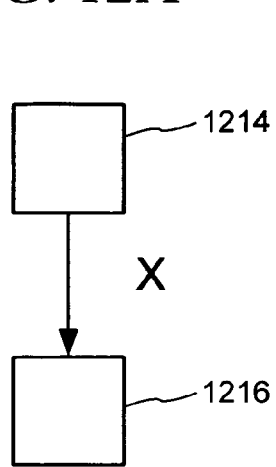
FIGS. 12A–E are block diagrams showing exemplary implementations of a gate feature.

The scenario 1202 shown in FIG. 12A shows two executable processing directives 1214 and 1216 of a sequence that have been defined as coupled. The processing directive 1216 has been defined as accepting a particular data set X. The data set can be arbitrarily defined. For example, it might be a single number, a database table, a database row, a database column, a pair of numbers, a combination thereof, or the like.

Figure 12B:
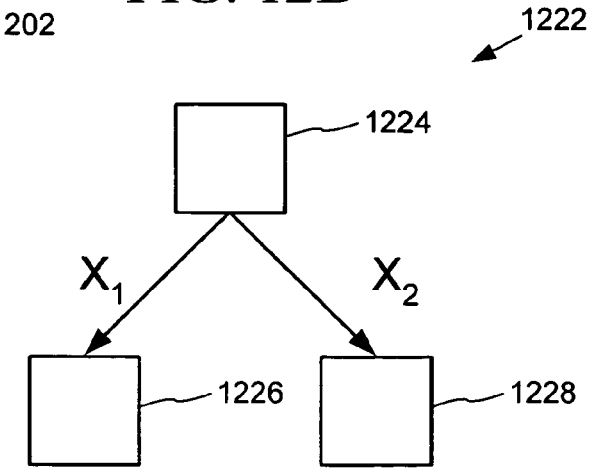

Execution of the sequence is shown in FIG. 12B. During execution, the executing processing directive 1224 (e.g., corresponding to the processing directive 1214) produces two of the data sets, $X_1$ and $X_2$. For example, two database rows might be produced.

Responsive to detecting that more than one input has been produced (e.g., for the processing directive 1216), software executing the sequence automatically creates two executing instances 1226 and 1228 of the same processing directive (e.g., corresponding to the processing directive 1216) for processing the inputs $X_1$ and $X_2$. Thus, a one-to-many relationship can be achieved via coupling.

Figure 12C:
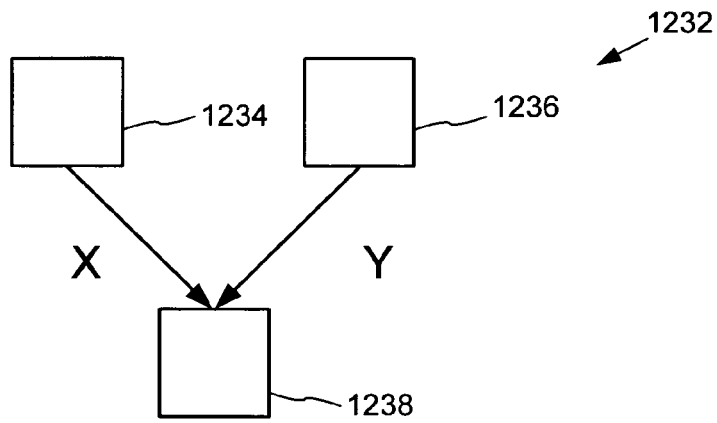

Another scenario 1232 is shown in FIG. 12C. Two processing directives 1234 and 1236 are defined to produce output data sets X and Y, respectively. The directives 1234 and 1236 have been defined as coupled to the processing directive 1238, which takes as its input the two data sets X and Y. During execution, execution of the processing directive 1238 can be delayed until both of the processing directives providing input 1234 and 1236 have provided the proper input. Thus, a many-to-one relationship can be achieved via coupling.

Figure 12D:
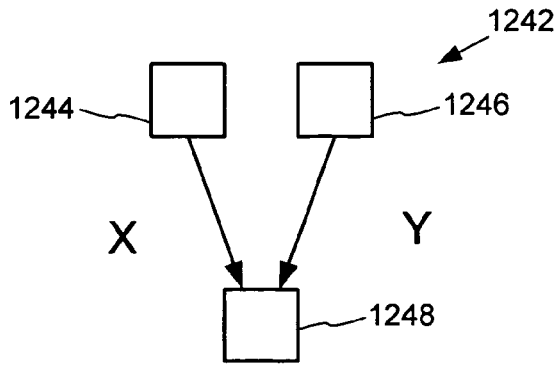

Yet another scenario 1242 is shown in FIG. 12D. Similar to that of FIG. 12C, two processing directives 1244 and 1246 are defined in a sequence as coupled to the processing directive 1248. The processing directives 1244 and 1246 output data sets X and Y, respectively. The processing directive 1248 has been defined to accept as input two data sets X and Y.

Figure 12E:
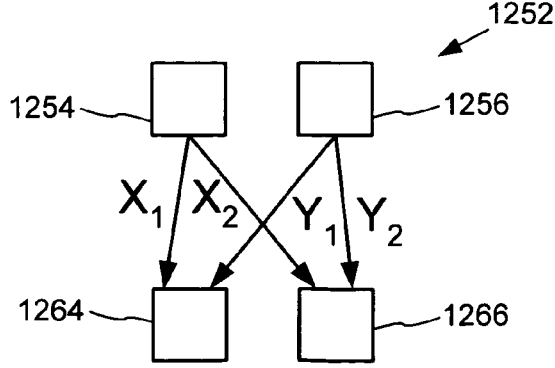

During execution, as shown in FIG. 12E, the arrangement 1252 can take place. Each of the processing directives have generated two data sets, so two instances 1264 and 1266 of a processing directive (e.g., corresponding to the processing directive 1248) have been created during execution. Thus, a many-to-many relationship can be achieved via coupling.

As shown in the above examples, a sequence can be constructed without regard to the particular number of data sets that may result because the software can appropriately process multiple data sets by instantiating multiple instances of a processing directive to handle the multiple data sets.

Although the above examples show the gate feature in scenarios involving two inputs, any number of inputs can be used instead. The gate feature is particularly useful for use with analysis directives.

Example 13

Branching within a Sequence

The system can support branching within a sequence. In this way, a sequence can have multiple paths of execution.

For example, branching can evaluate any arbitrary mathematical expression that resolves to a true or a false. In this way, an analysis directive can contain branching logic to detect whether a particular condition is satisfied, and thereby selectively choose between one or more possible paths of execution. Thus, processing directives can be coupled in a sequence, but one or more of the directives might not be executed during a particular iteration of the sequence.

Example 14

Additional Exemplary Features

A variety of other features can be used in conjunction with the technologies described herein. For example, it may be advantageous to define groups of users so that sequences or processing directives (e.g., a query) can be shared within the group.

Further, access privileges can be specified for a user, group, or other collection of users, so that certain users can perform create, read, write, delete, and modify operations if desired.

Further, it may be advantageous to count the number of times a particular sequence or processing directive (e.g., query) is used. In this way, observation of the numbers can help identify more significant elements of the system that possibly warrant further investigation or refinement. In a system using groups, a user might be interested to know which of the sequences or analysis directives are the most popular ones within her group. A metasequence can be constructed to report the most popular sequences to a supervisor.

In an environment having groups, it may also be advantageous to support a publishing feature. Such a feature not only provides a sequence or other element to a group, but provides a notification that the sequence or other element is now available. In this way, users can be notified if a particularly useful sequence is released or if a defect in a sequence has been fixed.

Another aspect that can be particularly useful is scheduling execution of sequences. A scheduler can receive user input via a graphical user interface to run a sequence at a particular time or periodically (e.g., every hour, day, week, or month). The scheduler can include an interface for supplying binding information for sequences based on templates. For example, filters can be supplied when the sequence is scheduled.

Scheduling can also be accomplished via an event directive. In this way, a sequence can itself schedule other sequences for execution.

Example 15

Exemplary Software Architecture

Figure 13:
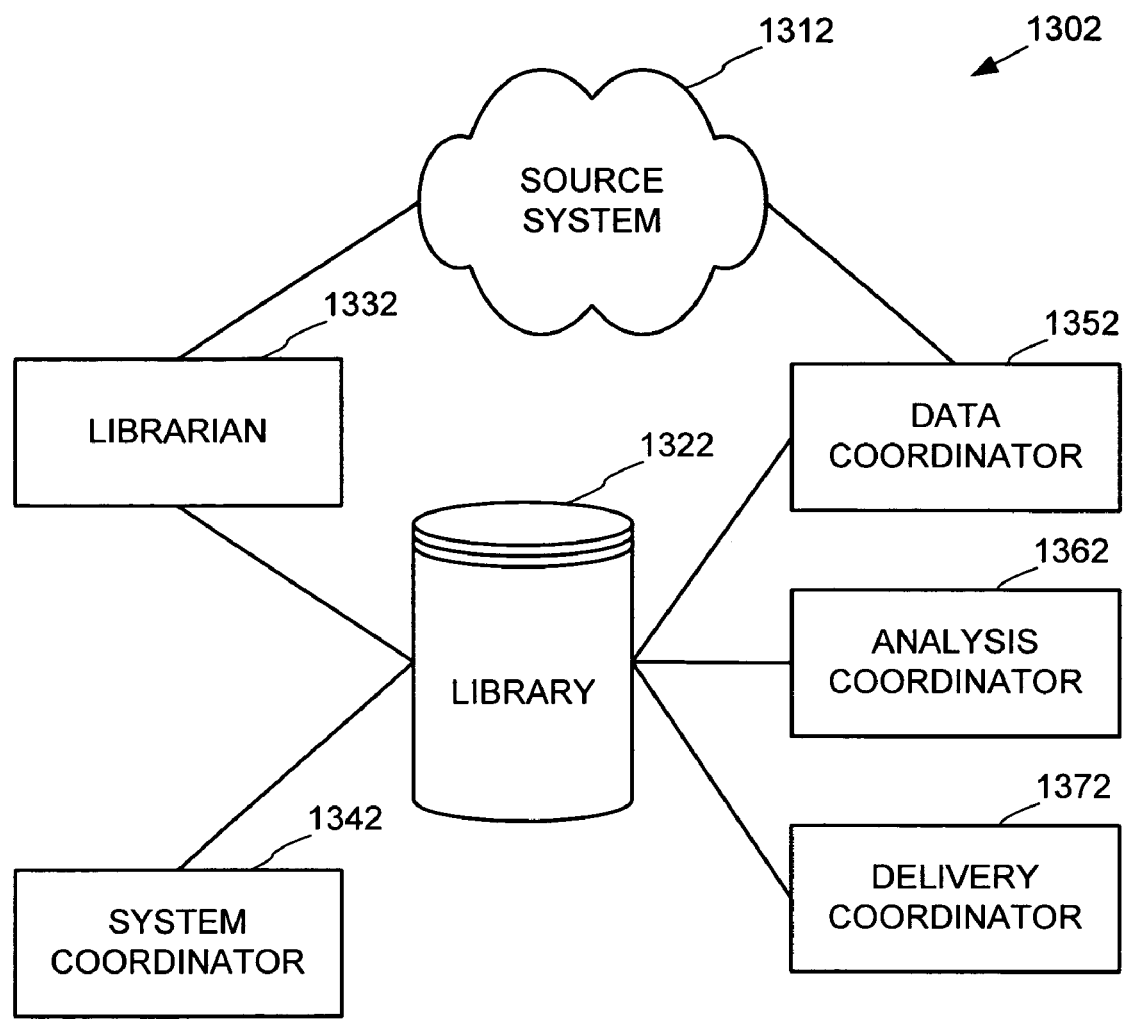
FIG. 13 is a block diagram showing an exemplary software architecture for a system providing a query-based analysis environment.

FIG. 13 shows an exemplary software architecture 1302 for a system providing a query-based analysis environment. The source system 1312 can be any of a variety of data collections, such as data warehouses and the like. The source system 1312 can be a hodge-podge collection of databases based on a variety of standards and software. The architecture can process the data stored by the source system 1312 to generate information for distribution to a variety of destinations.

In the example, the library 1322 is a comprehensive central store of configuration information, including, for example, configuration information regarding the source system 1312, information for use by the librarian 1332, information for use by the system coordinator 1342, information for use by the data coordinator 1352, information for use by the analysis coordinator 1362, and information for use by the delivery coordinator 1372. The library 1322 may have one or more of the above information as well as other information.

In the example, the various components of the system may be separate subsystems that can be started, stopped, or suspended independently. The progress of tasks to be executed can be stored in the library 1312 so that operation of the various components can be coordinated.

The data coordinator 1352, the analysis coordinator 1362, and the delivery coordinator 1372 are exemplary processing directive coordinators in that they work in concert to execute processing directives. The system coordinator 1342 coordinates the activities of the processing directive coordinators.

For example, sequences of processing directives and their scheduled times of execution can be stored in the library 1322. Based on the information in the library 1322, the system coordinator 1342 can then initiate execution of a sequence of processing directives by modifying a scheduling information in the library 1322. The data coordinator 1352 can periodically check the scheduling information to see if any sequences are to be processed by it, begin processing, and note the status of the processing.

After the data coordinator 1352 has completed its processing, it can so note in the scheduling information in the library 1322. The analysis coordinator 1362 can periodically check the scheduling information to see if any tasks are in condition for it to begin processing, begin processing such tasks, and note the status of the processing.

After the analysis coordinator 1362 has completed its processing, it can so note in the scheduling information in the library 1322. The delivery coordinator 1372 can periodically check the scheduling information to see if any tasks are in condition for it to begin processing, begin processing such tasks, and note the status of the processing.

After the delivery coordinator 1372 has completed its processing, it also can so note in the scheduling information in the library 1322. The scheduling information can be stored as one or more database tables with appropriate entries indicating the status of tasks to be performed. Results from each of the steps in the processing can be stored in the library 1322, which thus serves as a communication mechanism between the various components.

Thus, a single sequence may involve coordination between the various components of the system, but the library 1322 allows the processing between the components to be loosely coupled in that one of the components can be suspended or shut down or suspended while the other components continue to run.

Additional components can be included to handle other functions, such as events. The librarian 1332 can help maintain information in the library 1322, such as information related to the source system 1312. For example, the librarian 1332 can determine various characteristics of the source system 1312 on a periodic basis and update the library 1322 accordingly.

In this way, the architecture 1302 may support execution of sequences without direct initiation by a user. In such an arrangement, the user can schedule a sequence by using a tool that manipulates the information in the library 1322. Sequences can be scheduled to be automatically periodically executed as set intervals, at set times, or upon detection of a state condition in the source system 1312.

Example 16

Exemplary Library

In the example shown in FIG. 13, the library 1322 is a comprehensive central store for information relating to the system. For instance, the library 1322 can store information related to configuration of the source system 1312, definitions of sequences of processing directives, result sets (e.g., in XML format), and system logging information. The library 1322 itself can be implemented as a relational database, such as an ORACLE 8.1.6 relational database management system available from Oracle Corporation of Redwood Shores, Calif. The described ORACLE database system includes XSU utility and XML parser features that can be used to advantage when dealing with XML. However, another database or DBMS can be used.

Examples of database tables that can be used to store information in the library 1322 are shown in FIGS. 14A–14H. Additional or fewer tables can be used, and columns can be rearranged or relocated depending on circumstances. Also, the formats of the columns can be changed without affecting the principles of the system.

Figure 14A:
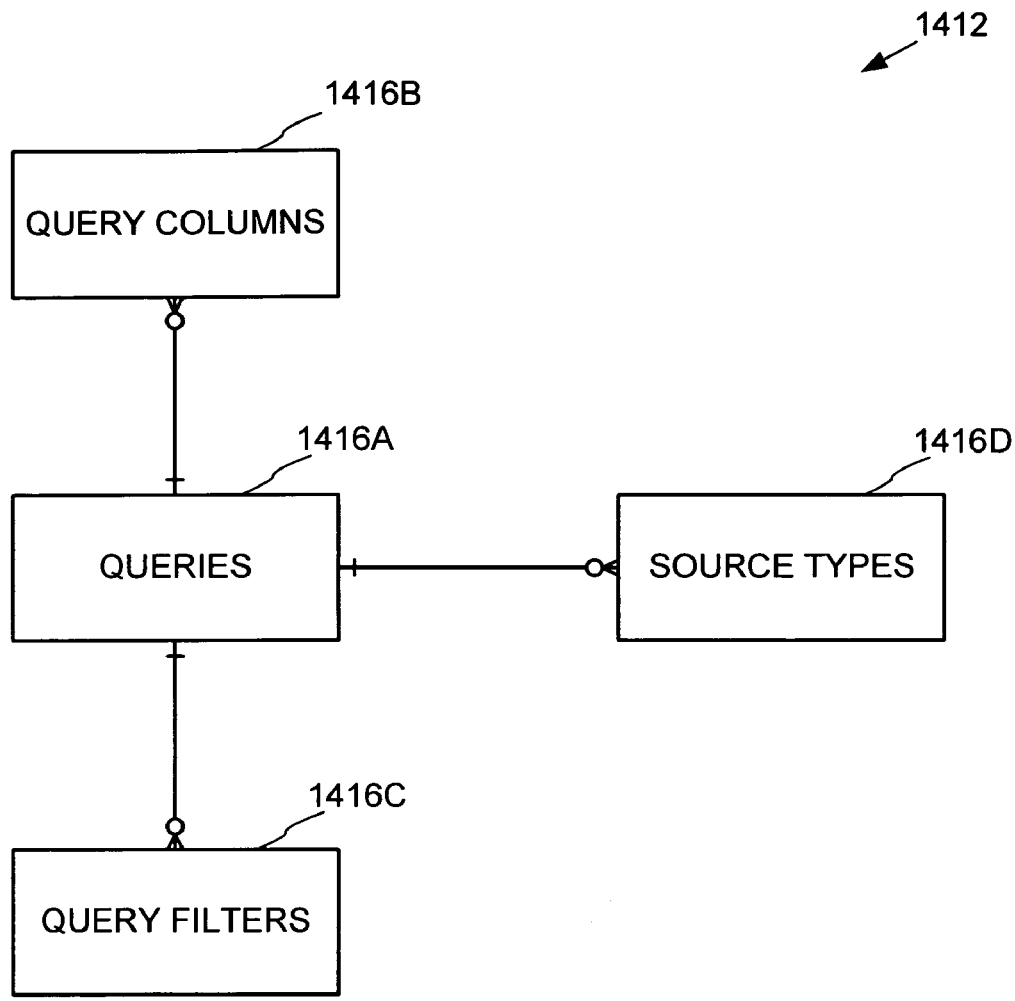
FIGS. 14A–14H are block diagrams showing exemplary database tables for representing information in a library, such as that shown in FIG. 13.

FIG. 14A shows exemplary database tables 1412 related to queries. The queries database table 1416A can include an entry for each query directive (e.g., such as those shown in FIG. 15A, discussed below). An exemplary layout is shown in Table 3.

TABLE 3

Exemplary Layout for the Database Table "Queries" 1416A

| Column | Format | Description |
| --- | --- | --- |
| query_id | int | uniquely identifies the query in the database table (primary key) |
| query_name | text(60) | name of the query |
| query_desc | text(200) | description of the query |
| orig_query_id | int | identifier of query on which this query is based |
| source_type | text(20) | type of source system on which query is run |
| creation_date | date | creation date of query |
| last_updated_by | text(30) | the last user who updated the query |
| last_updated_date | date | date that query was last updated |
| user_name | text(30) | user who created the query |
| query_status | text(20) | status of the query |
| query_version | int | indicates a version of the query |
| identifying information | — | uniquely identifies this item in the system |
| version information | — | version information |

For each entry in the query directives listed in the database table 1416A, there can be one or more entries in the query columns table 1416B, which indicates a column associated with the query (e.g., such as those shown in FIG. 15E, discussed below). An exemplary layout is shown in Table 4.

TABLE 4

Exemplary Layout for the Database Table "Query Columns" 1416B

| Column | Format | Description |
|---|---|---|
| query_column_id | int | uniquely identifies the query column in the database table (primary key) |
| query_id | int | relates the query column with the query database table (foreign key) |
| table_name | text(30) | name of the database table in the source system in which the column can be found |
| column_name | text(30) | name of the column in database table of the source system in which the column can be found (e.g., used in the "SELECT" component of a SQL query definition) |
| group_by | text(1) | indicates whether or not to group by this column |
| summary_type | text(20) | summary type (e.g., sum, count, avg), if any |
| xml_tag | text(30) | XML tag to be associated with this column |
| query_version | int | version of the query |
| run_on_refresh | text(1) | indicates whether or not to run the query on refresh |
| column_order | int | indicates how to order this column |
| identifying information | — | uniquely identifies this item in the system |
| version information | — | version information |

For each entry in the queries database table 1416A, there can also be one or more entries in the query filters table 1416C, which indicates a query filter to be associated with the query directive (e.g., see the exemplary query filters shown in FIG. 15G, below). An exemplary layout is shown in Table 5.

TABLE 5

Exemplary Layout for the Database Table "Query Filters" 1416C

| Column | Format | Description |
|---|---|---|
| query_filter_id | int | uniquely identifies the query filter in the database table (primary key) |
| query_id | int | relates the query filter with the query database table (foreign key) |
| table_name | text(30) | name of the database table in the source system to which the query filter is to be applied |
| column_name | text(30) | name of the column in database table of the source system in which the column can be found |
| filter_operator | text(10) | indicates a filter operator to be applied (e.g., =, <, >, < >, and the like) |
| query_version | int | query version |
| run_on_refresh | text(1) | indicates whether or not to run the query on refresh |
| query_version | int | version of the query |
| ref_table_name | text(30) | referring database table's name |
| ref_column_name | text(30) | column name in referring database table |
| identifying information | — | uniquely identifies this item in the system |
| version information | — | version information |

The source types that can appear in the queries database table 1416A can be listed in the source types database table 1416D. An exemplary layout is shown in Table 6.

TABLE 6

Exemplary Layout for the Database Table "Source Types" 1416D

| Column | Format | Description |
|---|---|---|
| source_type | text(20) | uniquely identifies the source type (primary key) |
| source_type_desc | text(200) | description of the source type |
| identifying information | — | uniquely identifies this item in the system |
| version information | — | version information |

Thus, the database tables 1412 can be used in conjunction to define a query, including the source system on which the query is to be run. In this way, the query is combined into a configurable unit that can be executed by the data coordinator 1352. Information about the source system assists the data coordinator 1352 in determining how to address the peculiarities and idiosyncrasies of the source system indicated.

Figure 14B:
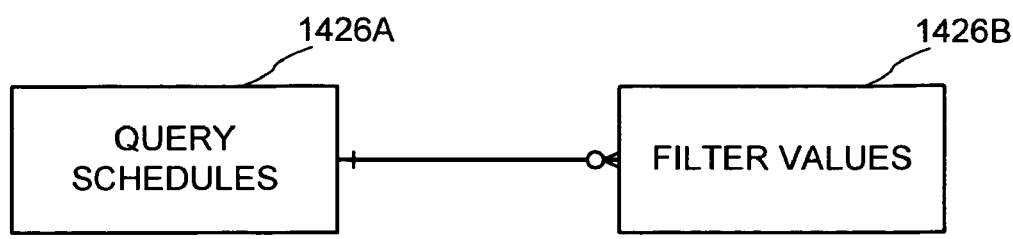

Turning now to FIG. 14B, a set of exemplary database tables 1422 related to query scheduling are shown. The query schedules database table 1426A can include entries for queries being executed, to be executed, or completed. Although not shown, the query schedules database table 1426A can be related to the queries database table 1416A (e.g., via the query_id column). An exemplary layout is shown in Table 7.

TABLE 7

Exemplary Layout for the Database Table "Query Schedules" 1426A

| Column | Format | Description |
|---|---|---|
| query_schedule_id | int | uniquely identifies the query schedule in the database table (primary key) |
| query_id | int | query appearing in the queries database table 1416A |
| user_name | text(30) | user who scheduled the query |
| query_status | text(10) | status of the query |
| query_priority | int | priority of the query |
| query_started | date | indicates when the query was started |
| query_finished | date | indicates when the query completed (e.g., can be used to determine turn-around time for the query) |
| data_coordinator_queue | int | indicates data coordinator queue in which query appears |
| source_name | text(20) | source system against which query is to be executed |
| query_version | int | version of the query |
| source_set | text(20) | source set against which query is to be executed |
| sequence_schedule_id | int | sequence schedule item with which the query is associated (foreign key) |
| sequence_step | int | which step in the sequence this query is |

The query filter values database table 1426B can include entries for scheduled queries and indicate query filter values to be bound to the queries for use with filters indicated in the query (e.g, values for use in conjunction with =, >, <, and the like). An exemplary layout is shown in Table 8.

TABLE 8

Exemplary Layout for the Database Table "Query Filter Values" 1426B

| Column | Format | Description |
|---|---|---|
| query_schedule_id | int | the query schedule with which the query filter value is associated |
| query_filter_id | int | the query filter with which the query filter value is associated |
| filter_value | text(2000) | the query filter value |

Thus, the database tables 1422 can be used in conjunction to indicate that a query in the queries database table 1416A is scheduled and query filter values to be used when the query is executed.

Figure 14C:
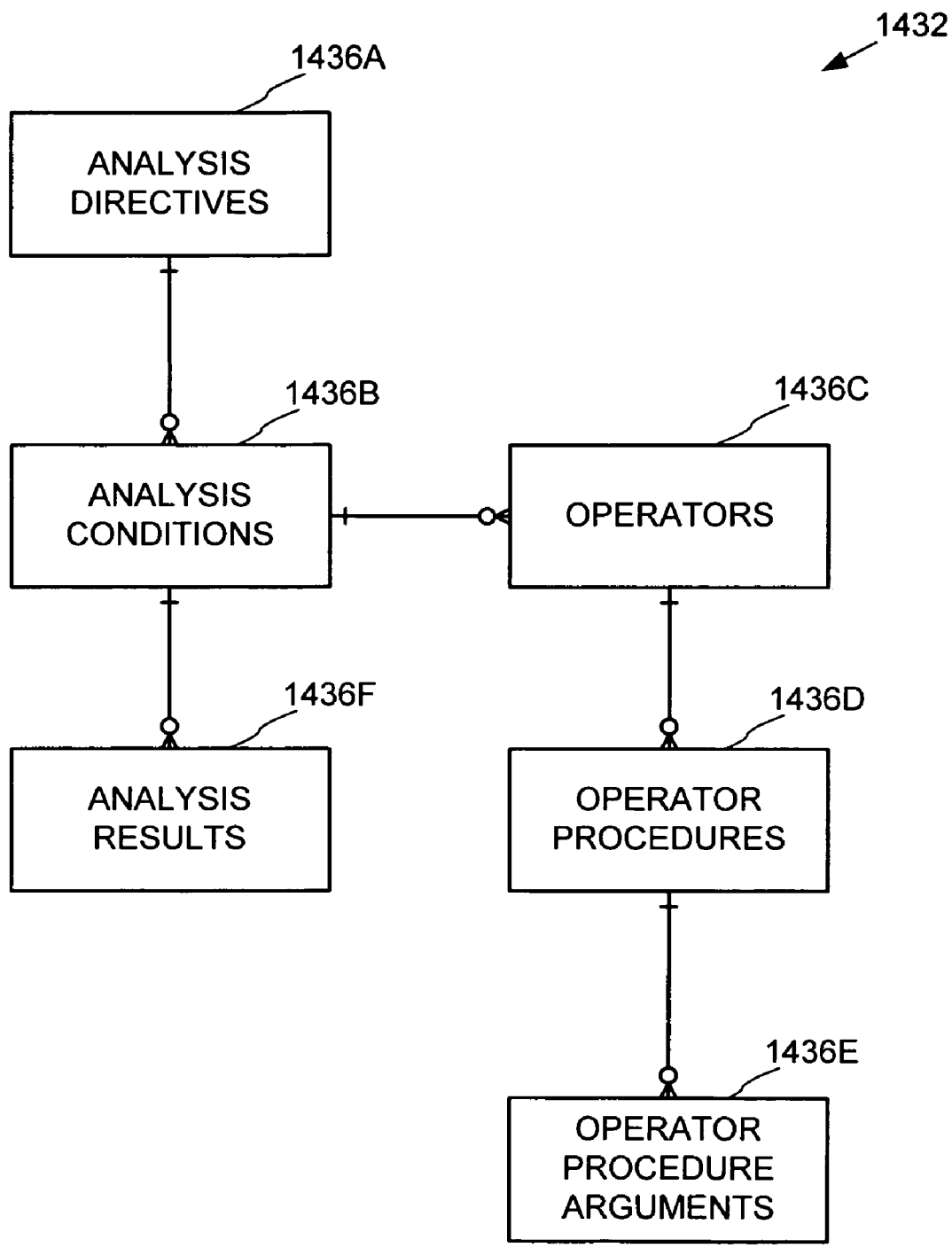

FIG. 14C shows exemplary database tables 1432 related to analysis directives. The analysis directives database table 1436A can include an entry for each analysis directive (e.g., the analysis subsequence of FIG. 15H, discussed below). An exemplary layout is shown in Table 9.

TABLE 9

Exemplary Layout for the Database Table "Analysis Directives" 1436A

| Column | Format | Description |
|---|---|---|
| analysis_directive_id | int | uniquely identifies the analysis directive in the database table (primary key) |
| analysis_directive_name | text(100) | name of the analysis directive |
| user_name | text(30) | user who created the analysis directive |
| results_type | text(4) | results type (e.g., show only records meeting specified conditions or show all records but flag ones meeting the conditions) |
| last_run_date | date | last time the analysis directive was run |
| orig_analysis_directive_id | int | Analysis directive identifier on which this analysis directive is based |
| identifying information | — | uniquely identifies this item in the system |
| version information | — | version information |

For each entry in the analysis directives database table 1436A, there can be entries in the analysis conditions database table 1436B, which indicates a condition to be met to satisfy the analysis directive (e.g., the conditions shown in FIG. 15L, discussed below). An exemplary layout is shown in Table 10.

TABLE 10

Exemplary Layout for the Database Table "Analysis Conditions" 1436B

| Column | Format | Description |
|---|---|---|
| analysis_directive_id | int | identifies the analysis directive in the analysis directive database table with which this condition is associated (foreign key) |
| condition_group | int | specifies condition group to which this condition belongs |
| condition_type | text(5) | condition type (e.g., AND or OR) |
| condition_sequence | int | specifies the step number of this condition (e.g., for ordering) |
| condition_function | text(20) | function of the condition |
| xml_tag_name | text(30) | XML tag name associated with the condition |
| xml_tag_data_type | text(8) | Identifies the data type (e.g., VARCHAR, NUMBER, DATE) of the values associated with the xml_tag_name. Used for conversion of data when data is compared to a threshold value. |
| xml_tag_data_format | text(20) | The format mask applied to data when converting the data associated with the xml_tag_name for comparison operators. Mainly used for NUMBER and DATE types. |
| operator | text(20) | operator for the condition from the operators database table 1436D (foreign key) |
| threshold_value | text(2000) | value for comparison to generate results |
| identifying information | — | uniquely identifies this item in the system |
| version information | — | version information |

Operators for use with the conditions can be stored in the operators database table 1436C. An exemplary layout is shown in Table 11.

TABLE 11

Exemplary Layout for the Database Table "Operators" 1436C

| Column | Format | Description |
|---|---|---|
| operator | text(20) | uniquely identifies the operator (primary key) |
| operator_desc | text(20) | description of the operator |
| label | text(50) | label associated with the operator |
| condition_sequence | int | specifies the step number of this condition (e.g., for ordering) |
| identifying information | — | uniquely identifies this item in the system |
| version information | — | version information |

Procedures for the operators can be stored in the operator procedures database table 1436D. An exemplary layout is shown in Table 12.

TABLE 12

Exemplary Layout for the Database Table "Operator Procedures" 1436D

| Column | Format | Description |
|---|---|---|
| operator | text(20) | operator in the operators database table 1436C with which the procedure is associated (foreign key) |
| procedure_sequence | int | order in which the procedure is called to process the result sets |
| procedure_name | text(2000) | name of the stored procedure called to perform the operation |
| identifying information | — | uniquely identifies this item in the system |
| version information | — | version information |

Arguments for the operator procedures can be stored in the operator procedure arguments database table 1436E. An exemplary layout is shown in Table 13.

TABLE 13

Exemplary Layout for the Database Table
"Operator Procedure Arguments" 1436E

| Column | Format | Description |
|---|---|---|
| operator | text(20) | operator in the operators database table 1436C with which the argument is associated (foreign key) |
| procedure_name | text(2000) | name of the stored procedure in the operator procedures database table 1436D with which the argument is associated (foreign key) |
| argument_sequence | int | order in which the argument is passed to the stored procedure |
| argument_name | text(50) | argument name |
| argument_description | text(2000) | argument description |
| argument_value | text(30) | value of the argument passed into the stored procedure |
| identifying information | — | uniquely identifies this item in the system |
| version information | — | version information |

The results of analysis directives can be stored in the analysis results database table 1436F. An exemplary layout is shown in Table 14.

TABLE 14

Exemplary Layout for the Database Table
"Analysis Results" 1436F

| Column | Description |
|---|---|
| analytical_results_id | identifies the results within the analysis results database table (primary key) |
| analysis_directive_id | analysis directive in the analysis directives database table 1436A (and analysis conditions database table 1436B) with which the results are associated (foreign key) |
| condition_sequence | the step number out of the analysis conditions database table 1436B with which the results are associated (foreign key) |
| query_schedule_id | query schedule in the query schedules database table 1426A with which the results are associated (foreign key) |
| parent_results_id | Identifier that matches the analytical_results_id of a result set from a prior condition step in a set. A value of zero can indicate no parent result set. |
| record_number | value of the argument passed into the stored procedure |
| xml_tag_value | value of the line of XML data |
| analytical_results_date | date the results were generated |
| sequence_schedule_id | sequence with which the results are associated (foreign key) |
| sequence_step | step number in the sequence with which the results are associated |
| xml_split_value | XML split value |
| xml_split_tag | XML split tag |

Thus, the database tables 1432 can be used in conjunction to indicate analysis directives associated with a sequence and the operators, procedures, and arguments associated with the analysis directives. Further the tables 1432 serve to persistently store the results so that they can be used by subsequent processing directives or referred to later during reverse navigation of a sequence and inspection of interim results.

Figure 14D:
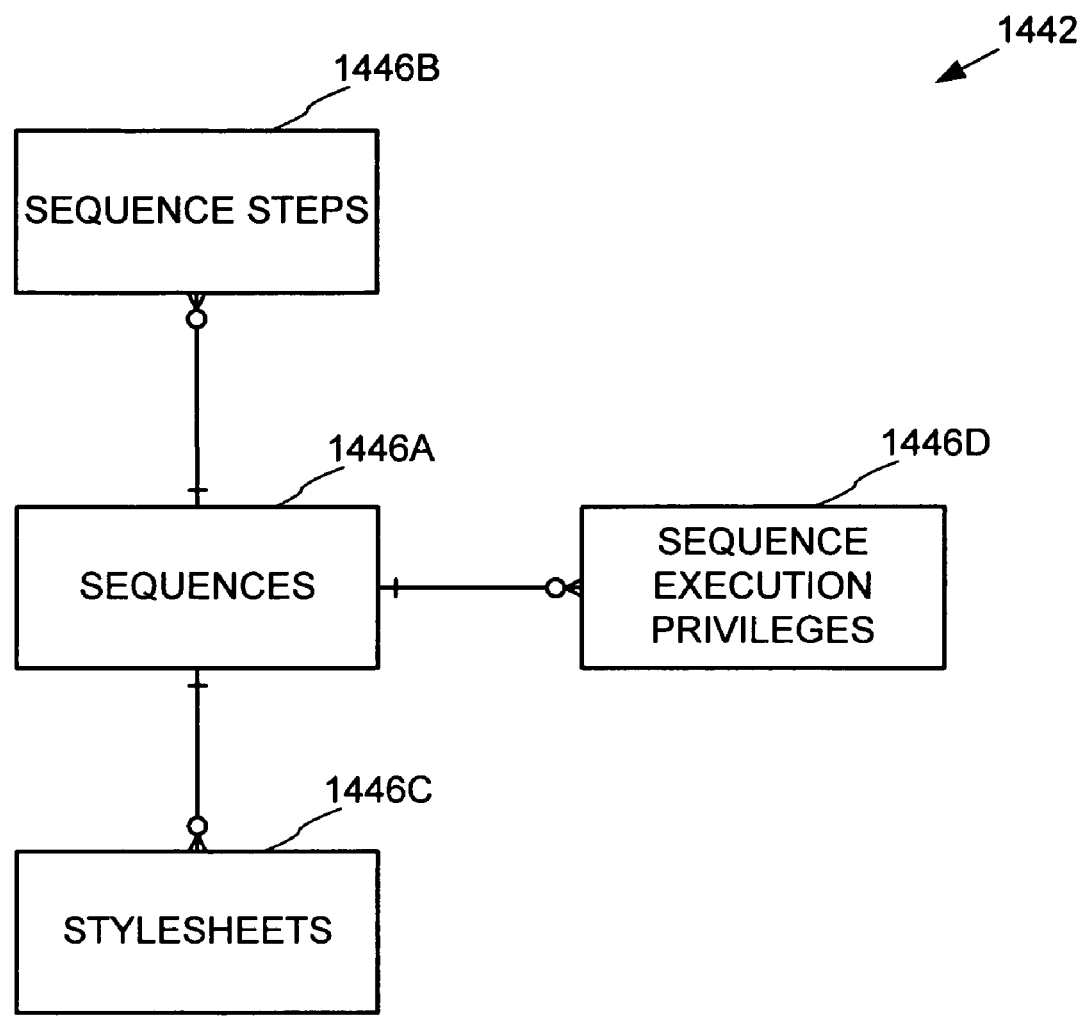

FIG. 14D shows exemplary database tables 1442 related to sequences. The sequences database table 1446A can include an entry for a sequence to indicate a sequence definition (e.g., for the exemplary sequences shown in FIG. 15M, discussed below) and effectively serve as header information for the sequence. An exemplary layout is shown in Table 15.

TABLE 15

Exemplary Layout for the Database Table
"Sequences" 1446A

| Column | Format | Description |
|---|---|---|
| sequence_id | int | uniquely identifies the sequence in the database table (primary key) |
| sequence_label | text(50) | short description of sequence |
| sequence_desc | text(4000) | description of the sequence |
| sequence_status | int | sequence status (e.g., available = available for general use; invalid = definition is currently invalid; disabled = not available for general use) |
| user_name | text(30) | name of user who created the sequence |
| sequence_version | int | version of the sequence (e.g., a sequential number that changes whenever a significant change is made to the sequence definition) |
| orig_sequence_id | int | Link to sequence_id of sequence on which this sequence is based. Allows tracking of sequence lineage (e.g., if this sequence was copied from a prior definition) |
| creation_date | date | date sequence definition was created |
| last_updated_by | text(30) | user last updating the sequence |
| last_updated_date | date | date sequence was last updated |
| identifying information | — | uniquely identifies this item in the system |
| version information | — | version information |

Steps (e.g., those shown for example in FIG. 15P, discussed below) related to the sequences defined in the sequences database table 1446A can be stored in the sequence steps database table 1446B. An exemplary layout is shown in Table 16.

TABLE 16

Exemplary Layout for the Database Table
"Sequence Steps" 1446B

| Column | Format | Description |
|---|---|---|
| sequence_id | int | sequence in the sequences database table 1446A with which this sequence step is associated (foreign key) |
| sequence_step | int | step number in the sequence; allows ordering |
| coordinator_type | text(50) | type of coordinator associated with step: (e.g., data, analysis, distribution) |
| coordinator_id | int | Associated coordinator identifier. For example, can be related to the query_id column of the queries database table 1416A for the data coordinator or the analysis_directive_id column of the analysis directives database table 1436A. |
| sequence_version | int | version of the sequence (e.g., a sequential number that changes whenever a significant change is made to the sequence definition) |
| last_updated_by | text(30) | user last updating the sequence |
| last_updated_date | date | date sequence was last updated |
| identifying information | — | uniquely identifies this item in the system |
| version information | — | version information |

Stylesheets (e.g., those generated via the exemplary interface 1536 of FIG. 15Q, discussed below) related to the sequences defined in the sequences database table 1446A can be stored in the stylesheets database table 1446C. An exemplary layout is shown in Table 17.

TABLE 17

Exemplary Layout for the Database Table "Style Sheets" 1446C

| Column | Format | Description |
| --- | --- | --- |
| sequence_id | int | sequence in the sequences database table 1446A with which this sequence step is associated (foreign key) |
| format_id | int | Format ID |
| sequence_version | int | version of the sequence (e.g., a sequential number that changes whenever a significant change is made to the sequence definition) |
| user_name | text(30) | user name |
| line_number | int | line number |
| xml_stylesheet | text(4000) | XML stylesheet |
| created_by | text(30) | creator |
| creation_date | date | creation date |
| changed_by | text(30) | indicates user who last changed the entry |
| change_date | date | indicates date and time of last change |
| identifying information | — | uniquely identifies this item in the system |
| version information | — | version information |

Privilege information related to the sequences defined in the sequences database table 1446A can be stored in the sequence execution privileges database table 1446D. An exemplary layout is shown in Table 18.

TABLE 18

Exemplary Layout for the Database Table "Sequence Execution Privileges" 1446D

| Column | Format | Description |
| --- | --- | --- |
| sequence_id | int | sequence in the sequences database table 1446A with which this sequence step is associated (foreign key) |
| user_name | text(30) | Name of a user having execution privileges for the sequence |
| group_name | text(30) | Name of a group having execution privileges for the sequence |

Thus the database tables 1442 can be used in conjunction to indicate a sequence, including its steps. The tables 1442 can persistently store the sequences so that they can be scheduled for execution.

Figure 14E:
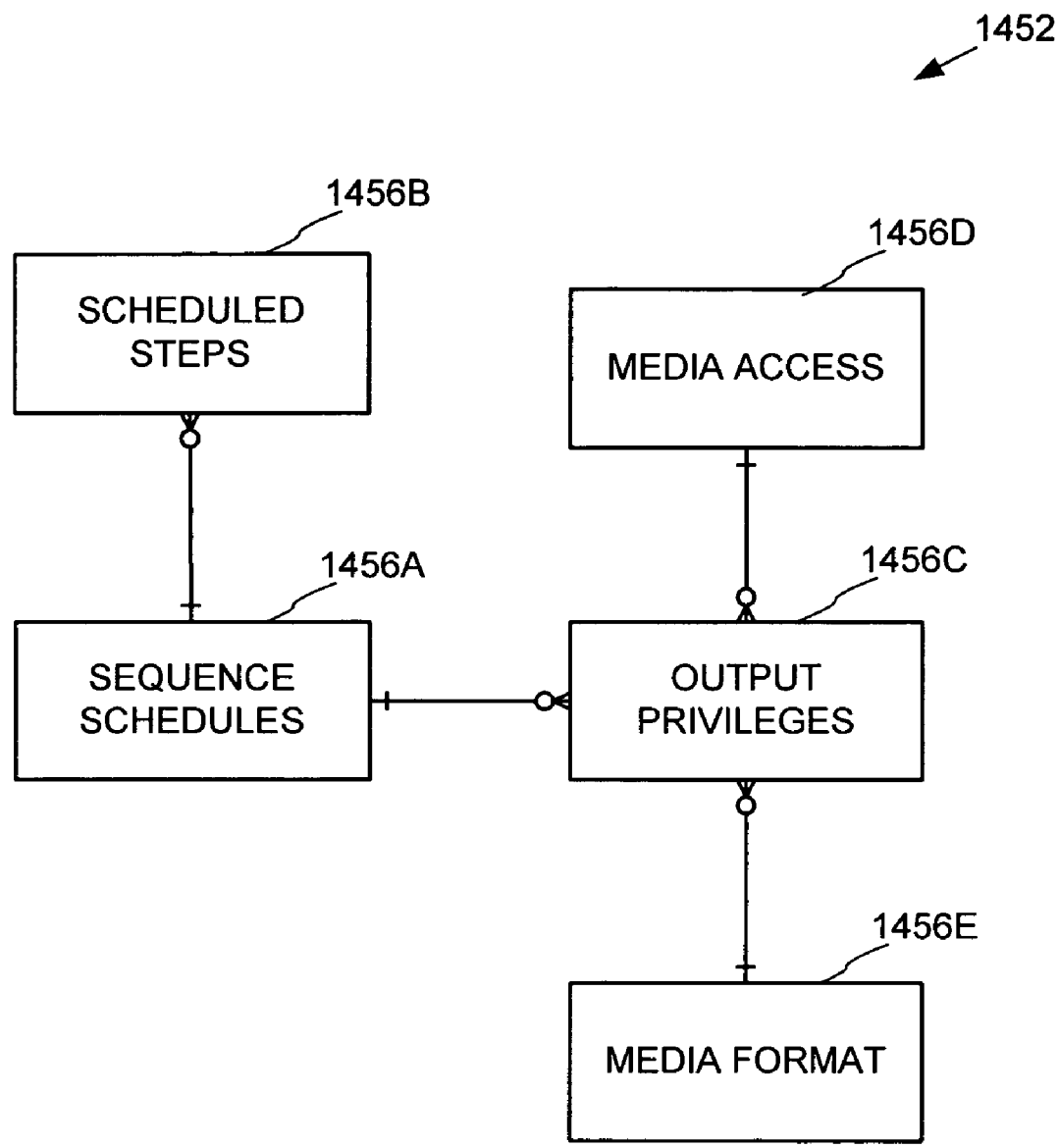

FIG. 14E shows exemplary database tables 1452 related to sequence scheduling. The sequence schedules database table 1456A can include entries for scheduled sequences (e.g., those shown for example in FIG. 15EE, discussed below) to indicate a sequence is scheduled for execution. An exemplary layout is shown in Table 19.

TABLE 19

Exemplary Layout for the Database Table "Sequence Schedules" 1456A

| Column | Format | Description |
| --- | --- | --- |
| sequence_schedule_id | int | Uniquely identifies the schedule entry in this database table (primary key) |
| sequence_id | int | sequence in the sequences database table 1446A with which entry is associated (foreign key) |
| user_name | text(30) | name of user who scheduled the sequence (foreign key) |
| sequence_sched_desc | text(4000) | description (e.g., can be given by user when scheduling the sequence) |
| sequence_status | text(10) | sequence schedule status (e.g., scheduled or extract) |
| sequence_frequency | text(10) | Can control when run and whether re-run after completion |
| sequence_priority | int | Sequence priority (e.g., can be taken from user's profile) |
| sequence_start_date | date | Date and time when sequence is to be started |
| sequence_version | int | version of the sequence (e.g., from sequences database table 1446A) |
| run_days | int | Can control when sequence is run (e.g., which day of the week and the like) |
| run_time | int | Can control time of day when sequence is run (e.g., specified by user or when sequence is rescheduled) |
| sequence_end_date | date | Date and time execution was completed (e.g., can be used to determine turn-around time for sequence) |
| identifying information | — | uniquely identifies this item in the system |
| version information | — | version information |

The scheduled steps database table 1456B can include an entry for scheduled sequence steps to indicate steps are scheduled for execution. An exemplary layout is shown in Table 20.

TABLE 20

Exemplary Layout for the Database Table "Scheduled Steps" 1456B

| Column | Format | Description |
| --- | --- | --- |
| sequence_schedule_id | int | associated sequence schedule in sequence schedules database table 1446A (foreign key) |
| sequence_step | int | step of the sequence |
| sequence_id | int | sequence in the sequences database table 1446A with which entry is associated (foreign key) |
| user_name | text(30) | name of user who scheduled the sequence (foreign key) |
| coordinator_type | text(50) | coordinator associated with the scheduled step (e.g., from the sequence steps database table 1446B) |
| source_name | int | for use by data coordinator to determine the source system to be queried |
| source_set | text(20) | for use by the data coordinator to determine which set of data within the source system will be queried. The source set may map to the data set. |
| step_status | text(20) | status of step (initially set to "waiting") |
| step_started | date | date (and time) when step started executing |
| step_finished | date | date (and time) when step finished executing |
| coordinator_id | int | indicates the coordinator job to be executed; for the data coordinator, can be query_id from the queries database table 1416A; for the analysis coordinator, can be analysis_directive_id from the "Analysis Directives" database table 1436A; for delivery coordinator, can be NULL |
| sched_coordinator_id | int | used to store unique identifier associated with job in execution. Can tie back to a query (e.g., query_schedule_id of the query schedules database table 1426A) for data coordinator step (column populated when sequence is scheduled so link is made to query scheduling database tables |

TABLE 20-continued

Exemplary Layout for the Database Table
"Scheduled Steps" 1456B

| Column | Format | Description |
|---|---|---|
| | | and query can be scheduled at the same time the voyage is scheduled); or can be set to NULL for analysis coordinator step, which will populate the column upon completion of the step); or can be set to NULL for delivery coordinator step. |
| coordinator_ | int | coordinator (e.g., data coordinator) |
| queue | | can use this column if using a queuing mechanism to execute jobs in parallel |

Output privileges related to the steps (e.g., those shown, for example, in FIG. 15DD) can be stored in the output privileges database table 1456C. An exemplary layout is shown in Table 21.

TABLE 21

Exemplary Layout for the Database Table
"Output Privileges" 1456C

| Column | Format | Description |
|---|---|---|
| sequence_output_priv_id | int | Uniquely identifies the privilege entry in this database table (primary key) |
| sequence_schedule_id | int | sequence schedule in sequence schedules database table 1446A with which the step is associated (foreign key) |
| user_name | text(30) | user to receive output from the scheduled sequence (foreign key) |
| group_name | text(30) | group to receive output from the the scheduled sequence (foreign key) (group can include child groups) |
| sequence_step | int | step within sequence for which user or group should receive output |
| condition_subsequence | int | condition sequence for which user or group should receive output |
| result_tag | text(4000) | name of XML tag for which additional filtering of output should be applied when distributing output; this allows the system to specify a subset of a result set for distribution to a user or group |
| result_value | text(4000) | XML document describing which values to create for outputting a subset for distribution to the user or group. The values contained in the XML document can be used to compare against the XML tag specified above. Example: <?xml version = "1.0"?> <SPLIT_VALUES> <VAL>Commercial Sales</VAL> <VAL>Residential Sales</VAL> </SPLIT_VALUES> |
| access_id | int | type of distribution access method for which result set should be distributed to the user or group |
| format_id | int | type of distribution access format for which result set should be distributed to the user or group |

Media access and media format information can be stored in the database tables 1456D and 1456E respectively. Thus, the database tables 1452 can be used in conjunction to indicate scheduling information associated with sequences. Further, the tables 1452 can serve to measure the performance of the scheduled sequences.

Figure 14F:
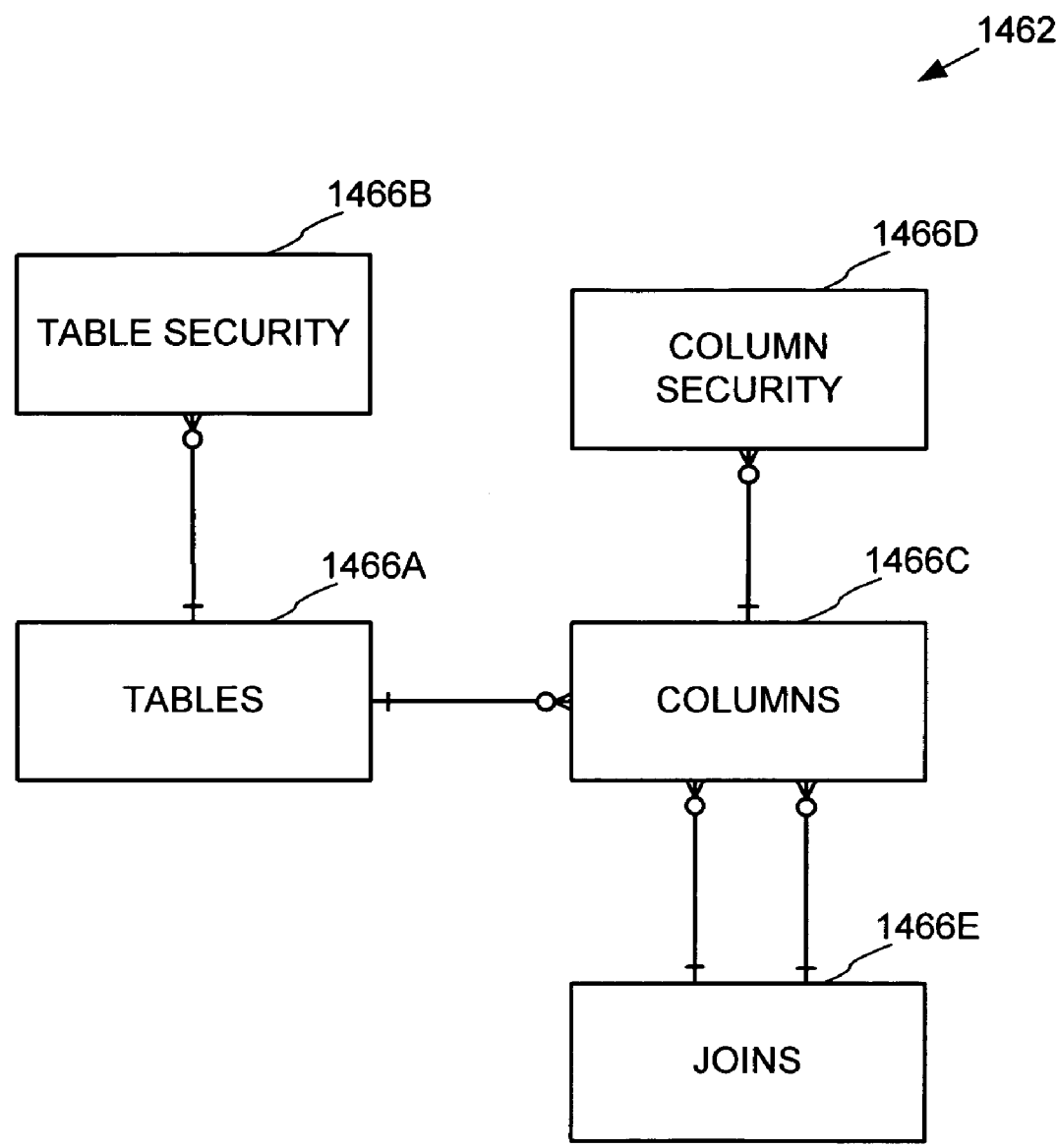

FIG. 14F shows exemplary database tables 1462 storing metadata related to a source system, which can be used for a data collection. The tables database table 1466A can include an entry for a table in a source system. An exemplary layout is shown in Table 22.

TABLE 22

Exemplary Layout for the Database Table
"Tables" 1466A

| Column | Format | Description |
|---|---|---|
| source_name | text(20) | source name (e.g., from sources database table) (key) |
| table_name | text(30) | physical table name in database (key) |
| table_label | text(60) | short description (label) of table |
| base_object_owner | text(30) | database user account that owns base/default object used during data access; can be different from user account that owns the physical table |
| base_object_name | text(30) | database object name used during data access; can be different from table name; one can reference default end-user view accessed by users rather than the physical table |
| user_table_name | text(30) | table name users associate with; can have the table name without the data set appended |
| enabled | text(50) | indicates whether the table is enabled for use |
| source_set | text(20) | source set within the source to which table belongs (e.g., to group tables within a source); one can map back to a data set |

Information related to security for the tables of the tables database table 1466A can be stored in the table security database table 1466B. An exemplary layout is shown in Table 23.

TABLE 23

Exemplary Layout for the Database Table
"Table Security" 1466B

| Column | Format | Description |
|---|---|---|
| source_name | text(20) | source name (e.g., from sources database table) |
| table_name | text(30) | table name from the tables database table 1466A with which security entry is associated |
| base_object_owner | text(30) | owner of security base object that user or group should reference (e.g., may be different from the user account that owns the object defined in the tables database table 1466A) |
| base_object_name | text(30) | name of security base object that user or group should reference (e.g., may be different from the base object defined in the tables database table 1466A); can reference a view, synonym, or table |
| source_group_name | text(30) | user name to which data security is applied |
| source_user_name | text(30) | group to which data security is applied |
| addl_sql | text(2000) | [reserved for additional SQL] |
| table_security_type | text(1) | security type: A-user/group is partially restricted from table (i.e., there is some form of data security applied) R-user/group is fully restricted from table (i.e., they cannot access it) |

Information on columns associated with the tables of the tables database table 1466A can be stored in the columns database table 1466C. An exemplary layout is shown in Table 24.

TABLE 24

Exemplary Layout for the Database Table "Columns" 1466C

| Column | Format | Description |
|---|---|---|
| source_name | text(20) | source name (e.g., from sources database table) (key) |
| table_name | text(30) | table name from the tables database table 1466A with which security entry is associated (with the same source_name) (key) |
| column_name | text(30) | name of column (key) |
| column_label | text(60) | short description of column |
| data_type | text(10) | data type (e.g., number, varchar2, date) |
| column_length | text(10) | length of column |
| additive | text(1) | indicates whether column is additive (for number columns) |
| enabled | text(1) | indicates whether column is enabled (e.g., yes or no) |
| aggregate | text(1) | indicates whether column is aggregate column rather than a physical database column. if aggregate, then the column_formula is used rather than the column name when generating a query |
| column_formula | text(2000) | calculation (e.g., SQL) that is used rather than referencing a physical column name in the table (e.g., "COUNT (LINE_NUMBER)") |

Information related to security for the columns of the columns database table 1466C can be stored in the column security database table 1466D. An exemplary layout is shown in Table 25. In the example, users who are not permitted to access a column are tracked.

TABLE 25

Exemplary Layout for the Database Table "Column Security" 1466D

| Column | Format | Description |
|---|---|---|
| source_name | text(20) | source name (e.g., from sources database table) |
| table_name | text(30) | table name from the tables database table 1466A with which security entry is associated |
| column_name | text(30) | column name (e.g., from columns database table 1466C) |
| source_user_name | text(30) | user name restricted from accessing the column |
| source_group_name | text(30) | group restricted from accessing the column |

Information related to joins between the columns of the columns database table 1466C can be stored in the joins database table 1466E. An exemplary layout is shown in Table 26.

TABLE 26

Exemplary Layout for the Database Table "Joins" 1466D

| Column | Format | Description |
|---|---|---|
| source_name | text(20) | source name (e.g., from sources database table) |
| from_table | text(30) | table name from the tables database table 1466A for "from" end of join |
| from_column | text(30) | column name from columns database table 1466C for "from" end of join |
| to_table | text(30) | table name from the tables database table 1466A for "to" end of join |

TABLE 26-continued

Exemplary Layout for the Database Table "Joins" 1466D

| Column | Format | Description |
|---|---|---|
| to_column | text(30) | column name from columns database table 1466C for "to" end of join |

Thus, the database tables 1462 can be used in conjunction to indicate information associated with tables of a source system. Further, the tables 1462 can serve to provide security to limit access to the tables.

Figure 14G:
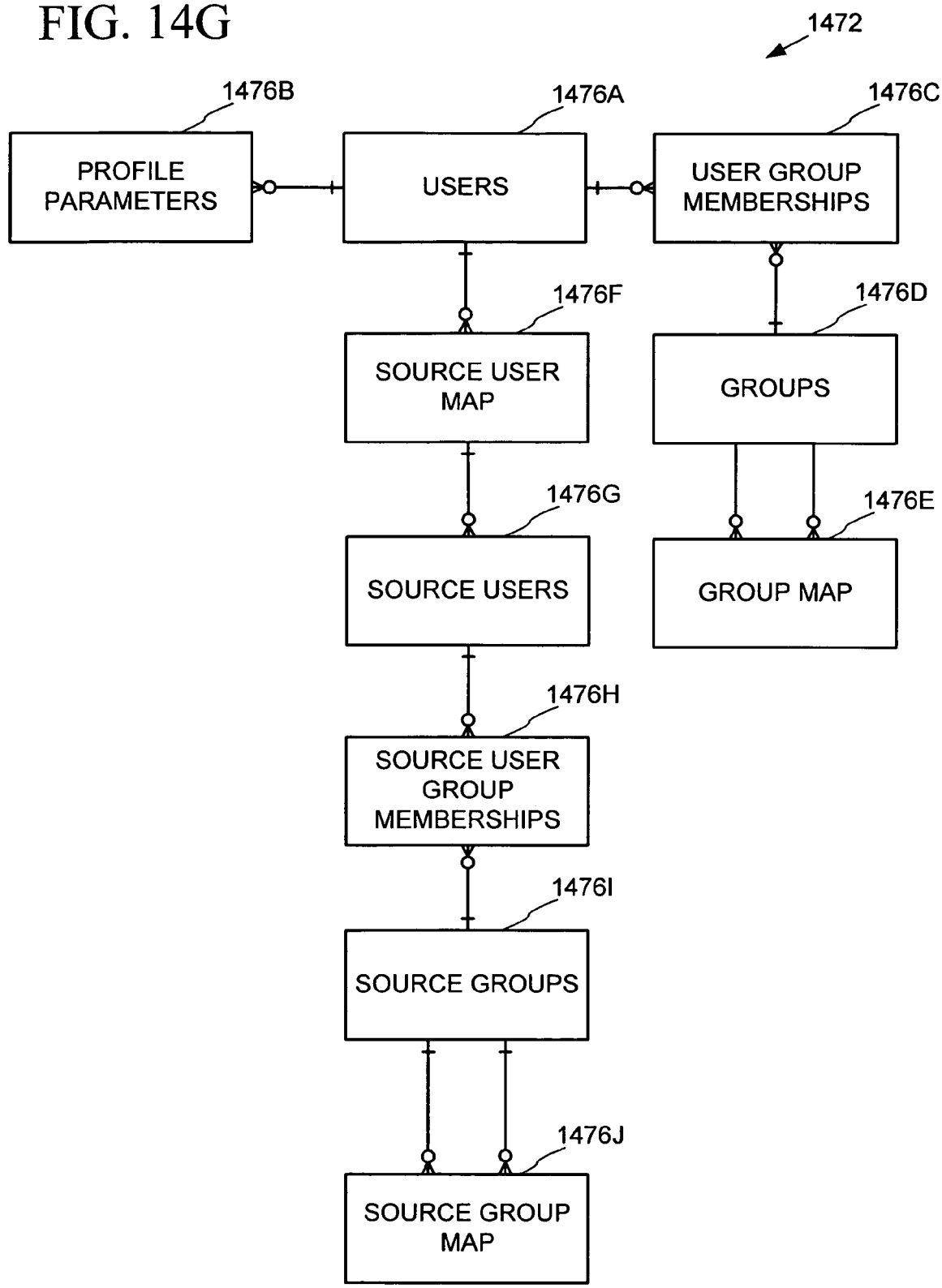

FIG. 14G shows exemplary database tables 1472 storing information related to users and groups. The users database table 1476A can include entries for users of the system. An exemplary layout is shown in Table 27.

TABLE 27

Exemplary Layout for the Database Table "Users" 1476A

| Column | Format | Description |
|---|---|---|
| user_name | text(30) | user name (primary key) |
| first_name | text(50) | first name |
| last_name | text(50) | last name |

The profile parameters database table 1476B can include entries to indicate parameters for users in the users database table 1476A. A user's profile can be built from the parameters appearing in the profile entries database table 1476B for a particular user. The parameters can be used for a variety of functionality related to the system, including, for example, storing preferences, a primary email address, and a phone number for a user. The profile can have assorted other functionality. An exemplary layout is shown in Table 28.

TABLE 28

Exemplary Layout for the Database Table "Profile Parameters" 1476B

| Column | Format | Description |
|---|---|---|
| user_name | text(30) | user name from users database table 1476A (foreign key) |
| eup_name | text(50) | parameter name (key) |
| eup_value | text(200) | parameter value |

The user group memberships database table 1476C can include entries to indicate users in the users database table 1476A belong to one or more groups in the groups database table 1476D. An exemplary layout is shown in Table 29.

TABLE 29

Exemplary Layout for the Database Table "User Group Memberships" 1476C

| Column | Format | Description |
|---|---|---|
| user_name | text(30) | user name from users database table 1476A |
| group_name | text(30) | group from groups database table 1476D to which user belongs |
| eup_value | text(200) | parameter value |

The groups database table 1476D can include entries for groups. Groups can contain users or other groups of users. An exemplary layout is shown in Table 30.

TABLE 30

Exemplary Layout for the Database Table "Groups" 1476D

| Column | Format | Description |
| --- | --- | --- |
| group_name | text(30) | name of group (primary key) |
| group_desc | text(100) | description of the group |

The group map database table 1476E can include entries to place a group within one or more other groups. An exemplary layout is shown in Table 31.

TABLE 31

Exemplary Layout for the Database Table "Group Map" 1476E

| Column | Format | Description |
| --- | --- | --- |
| parent_group_name | text(30) | parent group from groups database table 1476D |
| group_name | text(30) | group from groups database table 1476D that is defined as contained in the parent group |

The source user map database table 1476F can include entries to associate users from the users database table 1476A with users in the source users database table 1476G. Entries in this table can be used to control whether or not a user can schedule a sequence for a source system. An exemplary layout is shown in Table 32.

TABLE 32

Exemplary Layout for the Database Table "Source User Map" 1476F

| Column | Format | Description |
| --- | --- | --- |
| user_name | text(30) | user name from users database table 1476A |
| source_name | text(20) | name of source system |
| source_user_name | text(30) | source user name from source users database table 1476G |

The source users database table 1476G can include entries for users of source systems. An exemplary layout is shown in Table 33.

TABLE 33

Exemplary Layout for the Database Table "Source Users" 1476G

| Column | Format | Description |
| --- | --- | --- |
| source_name | text(20) | name of source system from sources database table |
| source_user_name | text(30) | user account on the source system |

The source user group memberships database table 1476H can include entries to indicate sources users in the source users database table 1476G belong to one or more groups in the source groups database table 1476I. The layout of the table can be the same or similar to that for the user group memberships database table 1476C, but it can also include a column to indicate the source system.

The source groups database table 1476I can include entries for source groups. The layout of the table can be the same or similar to that for the groups database table 1476D, but it can also include a column to indicate the source system.

The source group map database table 1476J can include entries to place a source group within one or more other source groups. The layout of the table can be the same or similar to that for the group map database table 1476E but can also include a column to indicate the source system.

Thus, the database tables 1472 can be used to define users and security groups to enforce security within the system.

Figure 14H:
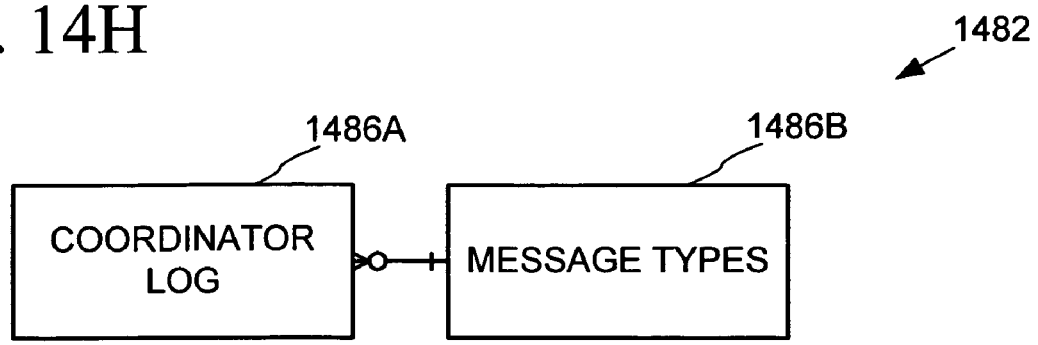

FIG. 14H shows exemplary database tables 1482 storing information related to logs. The coordinator log database table 1486A can include entries for log messages relating to information processing for the system. An exemplary layout is shown in Table 34.

TABLE 34

Exemplary Layout for the Database Table "Coordinator Log" 1486A

| Column | Format | Description |
| --- | --- | --- |
| coordinator_log_id | int | unique identifier for log message |
| line_number | int | line number for log message; messages can space multiple lines in the database table; this column allows for ordering so that lines can be put back together in the right order |
| coordinator_type | text(20) | coordinator associated with the error message (e.g., data, analysis, or distribution) |
| log_type | text(1) | type of log message (e.g., w - warning, i - information, e - error) |
| log_date | date | timestamp of message |
| vendor_error_number | int | error number from source system (e.g., ORACLE database system error) |
| vendor_error_mesg | text(2000) | error message from source system (e.g., ORACLE database system error) |
| log_text | text(2000) | log text |
| query_schedule_id | int | identifier of scheduled query for data coordinator (if appropriate) |
| sequence_schedule_id | int | identifier of executed sequence (if appropriate) |
| analytical_voyage_id | int | identifier of executed analysis sequence (if appropriate) |

The message types database table 1486B can include entries to define message types. An exemplary layout is shown in Table 35.

TABLE 35

Exemplary Layout for the Database Table "Message Types" 1486B

| Column | Format | Description |
| --- | --- | --- |
| log_type | text(1) | type of log message (e.g., w - warning, i - information, e - error) |
| log_type_desc | text(30) | description of log type |
| identifying information | — | uniquely identifies this item in the system |
| version information | — | version information |

Thus, the database tables 1482 can work in conjunction to track information relating to log messages generated during processing.

Additional database tables can be maintained by the system. For example, tables related to the librarian can store jobs to be executed by the librarian. In this way, jobs can be scheduled for execution by adding them to the appropriate database table.

Database tables related to metadata exchange can also be included to facilitate collection of metadata describing the configuration of a source system. For example, XML documents can be retrieved from the source system that serve as interface documents. The interface documents can be stored in appropriate database tables and updated periodically via metadata exchange.

Other database tables can track a variety of information, such as a source for identifiers, coordinator control, lists of source systems, and the like.

Any of the above database tables may contain additional version and identifying information. For example, the fields such as those shown in Table 36 can assist in determining the version of the system under which the entry in the table should be interpreted and uniquely identify the item within the system. In this way, as the system is improved, entries from prior versions can continue to be interpreted according to the semantics of previous versions.

If more than one system is used, an additional system identifier can be used in conjunction with the serial number to produce a globally-unique identifier.

TABLE 36

Exemplary Fields for Versioning and Identifying Information

| Column | Format | Description |
| --- | --- | --- |
| release_number | text(32) | release number for the item - indicates a system release number |
| serial_number | text(100) | uniquely identifies this item within the system |
| version_number | text(32) | version of the item |
| revision_number | int | revision of the item |
| fgn | int | A fine-grained number |

Configurations of the above tables can be modified as needed. For example, various columns may not be needed, or different formats can be used.

Example 17

Exemplary System Coordinator

In the example shown in FIG. 13, the exemplary system coordinator 1342 is responsible for coordinating processing of the data coordinator 1352, the analysis coordinator 1362, and the delivery coordinator 1372, based on information found in the library 1322. For example, if the library 1322 indicates that a sequence is to be initiated, the system coordinator 1342 can modify the library 1322 to indicate to the data coordinator 1352 that a query for the sequence should be executed. Processing then continues until the sequence is completed. The sequence can contain any number of query directives, analysis directives, distribution directives, and event directives.

An alternative implementation can create instances of executable objects representing the various directives and coordinate flow of execution and information as indicated in the sequence. The instances can be created by the system coordinator or the system coordinator can direct creation by other coordinators.

The system coordinator 1342 can achieve coupling between processing directives by passing the information between coordinators. For example, data can be passed directly in memory or via an entry in a database table (e.g., identified by a unique identifier).

In some cases, there may be more than one query in a sequence, and the system coordinator coordinates communication of the query results to the proper processing directives as indicated by whether the directives are coupled. A gating feature is also supported during instantiation of executing processing directives.

The system coordinator 1342 can, for example, track sequence execution duration by recording a start and stop time.

Example 18

Exemplary Data Coordinator

In the example shown in FIG. 13, the data coordinator 1342 is responsible for processing query directives according to the information found in the library 1322. For example, the data coordinator can initiate and process query directives. The data coordinator achieves an abstraction layer and can function as a data server.

In this way, the query directives need not contain logic related to the idiosyncrasies related to a particular source system configuration (e.g., database schema or access language).

The data coordinator 1342 can comprise several processes residing in the background and monitoring the library 1322 for query directives to execute. The results of the query processing are stored in the library 1322 so that processing can continue (e.g., by the analysis coordinator or delivery coordinator). If the library 1322 so indicates, interim results can also be stored in the library 1322.

Example 19

Exemplary Analysis Coordinator

In the example shown in FIG. 13, the analysis coordinator 1342 is responsible for processing analysis directives as specified in the library 1322. Input for the analysis directives can come from the data coordinator as described above, or from another processing directive.

The analysis coordinator can support analysis directives containing arbitrary logic in a programming language, such as the JAVA programming language of Sun Microsystems. In this way, the possible functionality of an analysis directive is essentially unlimited. Code for the programming language can be entered during definition of the analysis directive (e.g., at sequence definition time).

The analysis coordinator 1342 can comprise several processes residing in the background and monitoring the library 1322 for analysis directives to execute. The results of the analysis directives processing are stored in the library 1322 so that processing can continue (e.g., by the delivery coordinator). If the library 1322 so indicates, interim results can also be stored in the library 1322. Alternatively, results can be passed directly via memory. Various parameters can be passed by the analytical coordinator to procedures to facilitate a wide variety of functionality.

Example 20

Exemplary Delivery Coordinator

In the example shown in FIG. 13, the delivery coordinator 1342 is responsible for processing distribution directives as specified in the library 1322. Input for the distribution directives comes from the data coordinator or analysis coordinator as described above.

The delivery coordinator 1342 can access information regarding how to format output for a variety of devices and methods of delivery. For example, the same information might be presented in different ways depending on how it is delivered.

The delivery coordinator can process distribution directives, which can include a wide variety of destinations. Further, choices concerning which media are appropriate can be made based on preferences provided by a user and instructions specified in a distribution directive.

For example, a sequence may contain a distribution directive that specifies that a document is to be distributed via e-mail. However, a user may have set preferences to indicate that communications should be sent to a wireless device because the e-mail is not accessible. In such a case, the delivery coordinator can choose between the specified media.

Example 21

Exemplary Librarian

In the example shown in FIG. 13, the librarian 1332 is responsible for maintaining and administrating various aspects of the library 1322. For example, the librarian 1332 can periodically monitor the source system 1312 to determine various characteristics and update the library 1322 accordingly.

A metadata exchange technique can be used by the librarian to organize exchange of information between the source system 1312 and the library 1322. For example, XML metadata definitions can be taken from source systems and loaded into the library 1322.

The librarian can periodically poll appropriate tables to see if any jobs are to be run and then initiate execution of scheduled jobs. Jobs can be defined as PL/SQL procedures executable in an ORACLE database environment.

Example 22

Exemplary Operation: Defining a Sequence

FIGS. 15A–15FF illustrate techniques related to defining and scheduling a sequence for execution. One approach is to define the processing directives as the sequence is constructed. Alternatively, some or all of the processing directives can be defined during one session and then assembled into a sequence during another session. Or, alternatively, a mix of the two approaches can be used.

The processing directives can come from a user other than the user assembling them into a sequence (e.g., a co-worker or a third party developer). Further, the sequence can be defined with one or more processing directives in template form. Values for binding to the template can be provided at a later time (e.g., when scheduling the sequence for execution). In this way, a sequence can be shared among users, and each user can provide values appropriate for the user's particular situation.

Figure 15C:
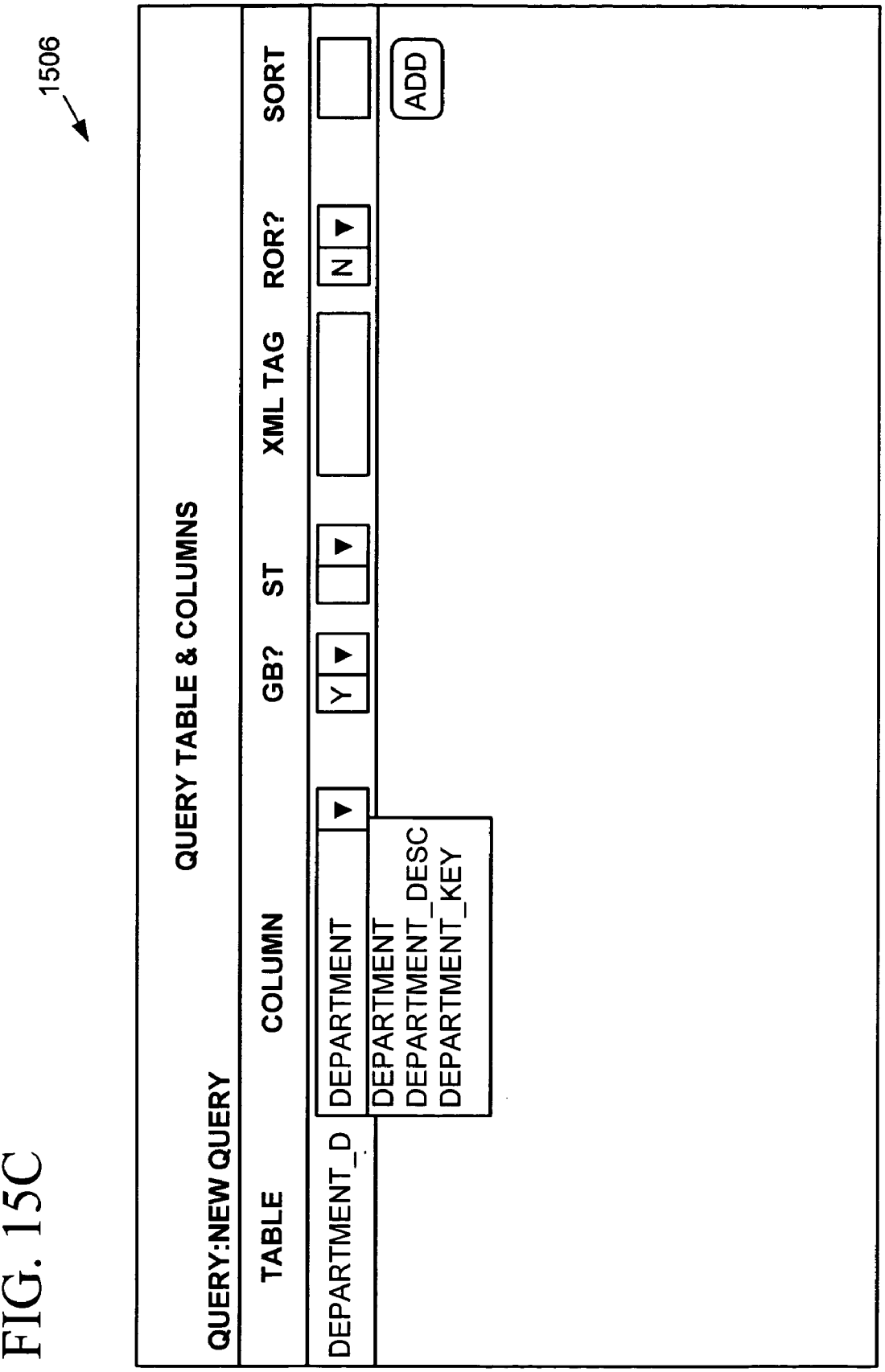
FIGS. 15A–15FF are screen shots showing exemplary techniques for defining and scheduling a sequence.
Figure 15I:
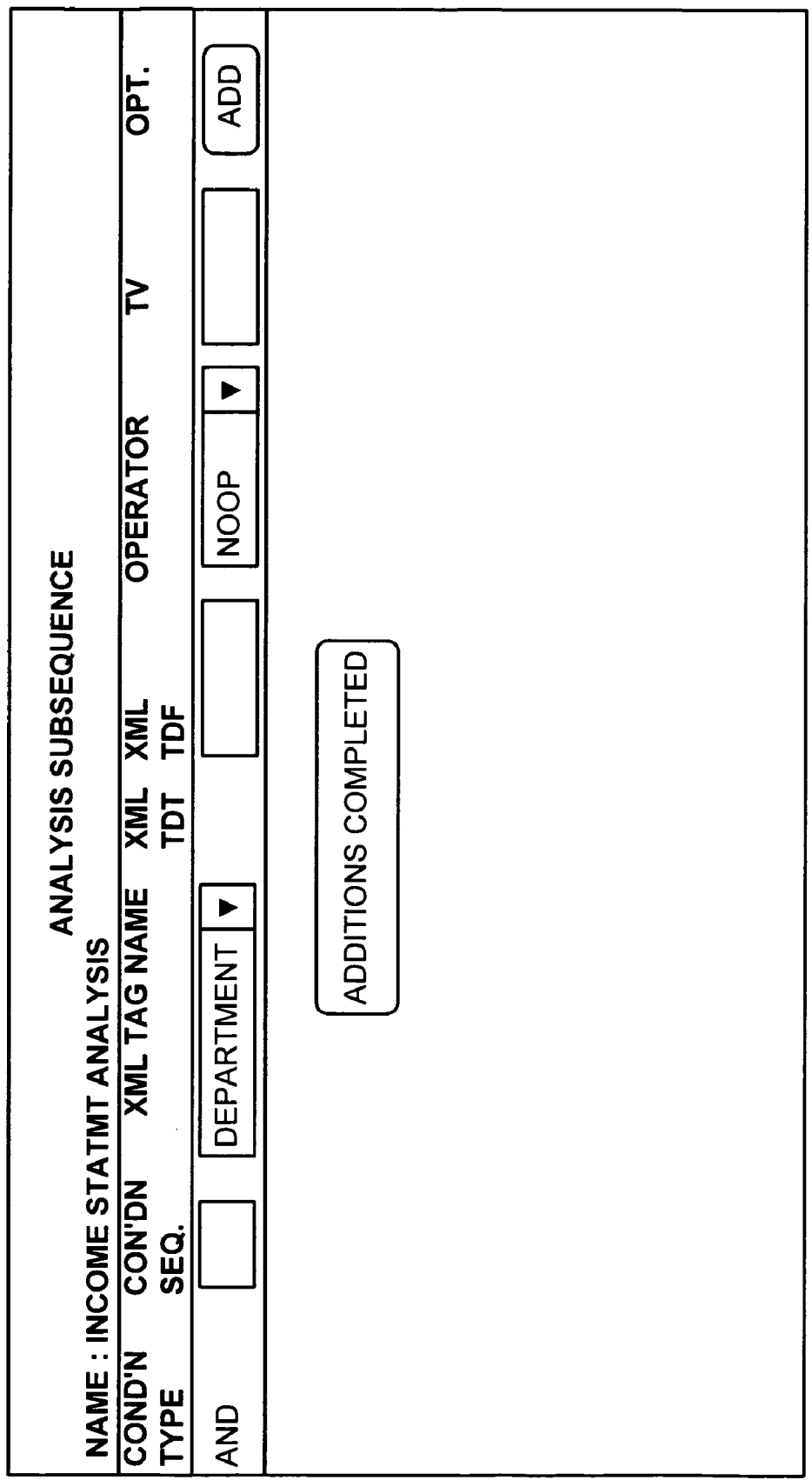
Figure 15J:
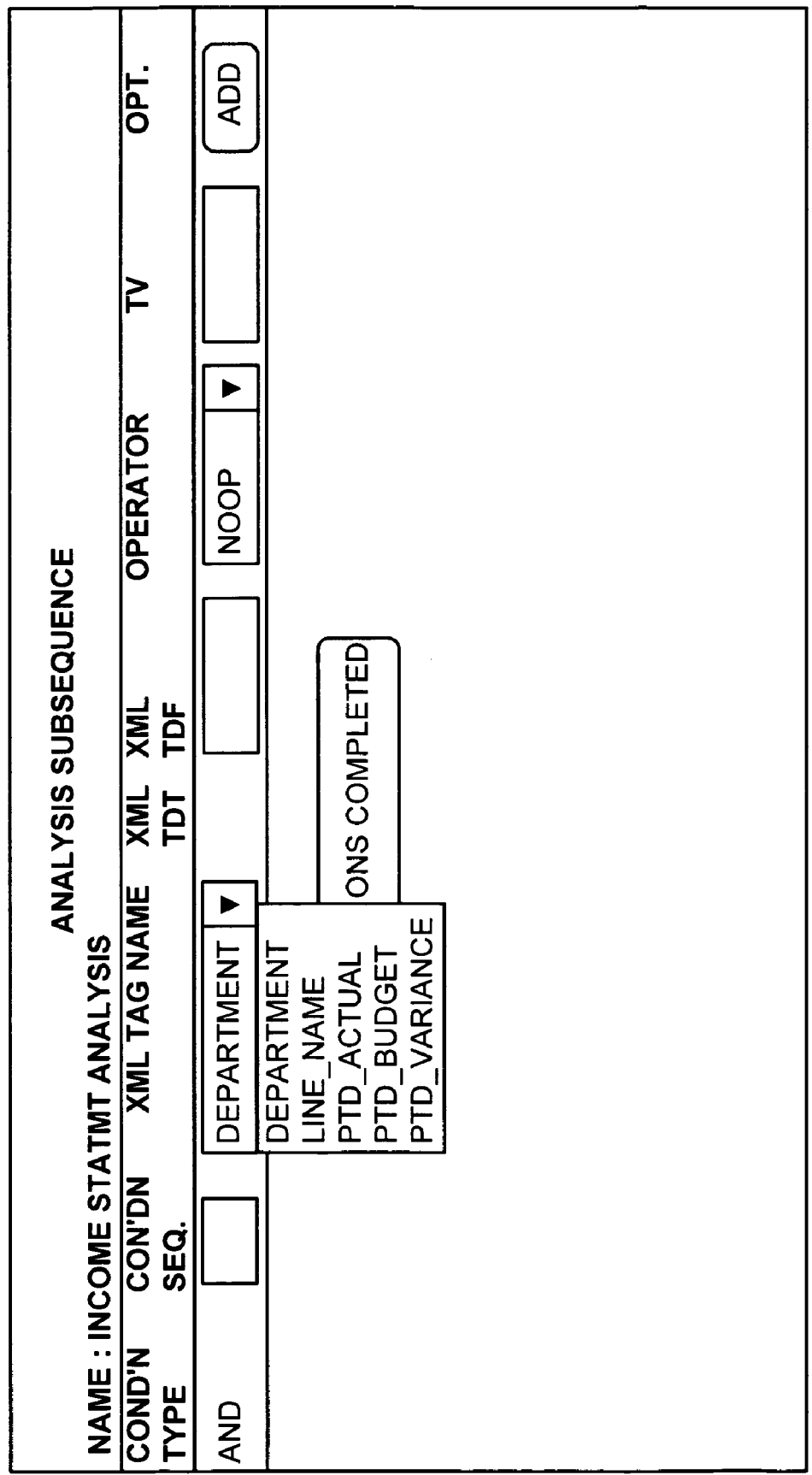
Figure 15K:
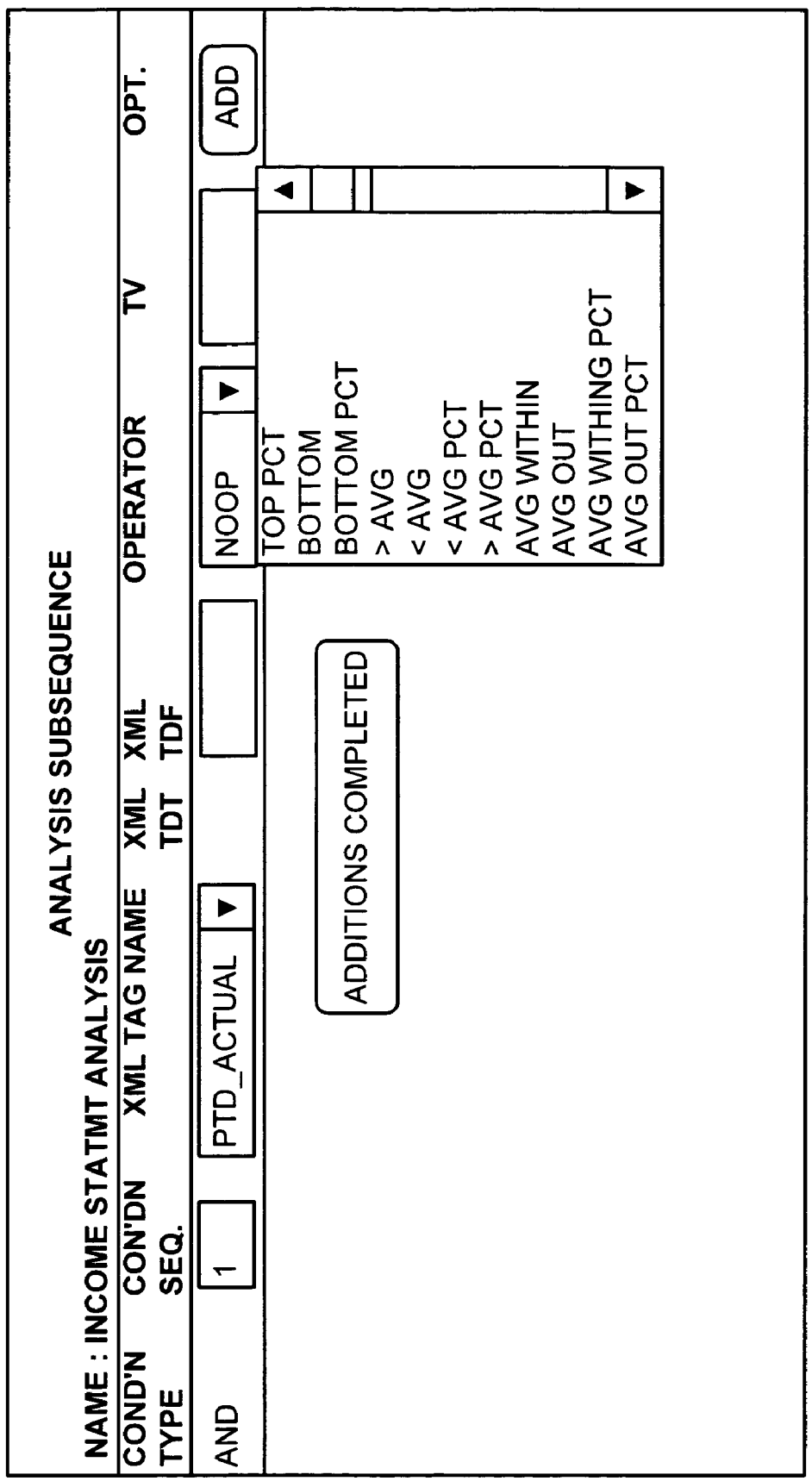
Figure 15Q:
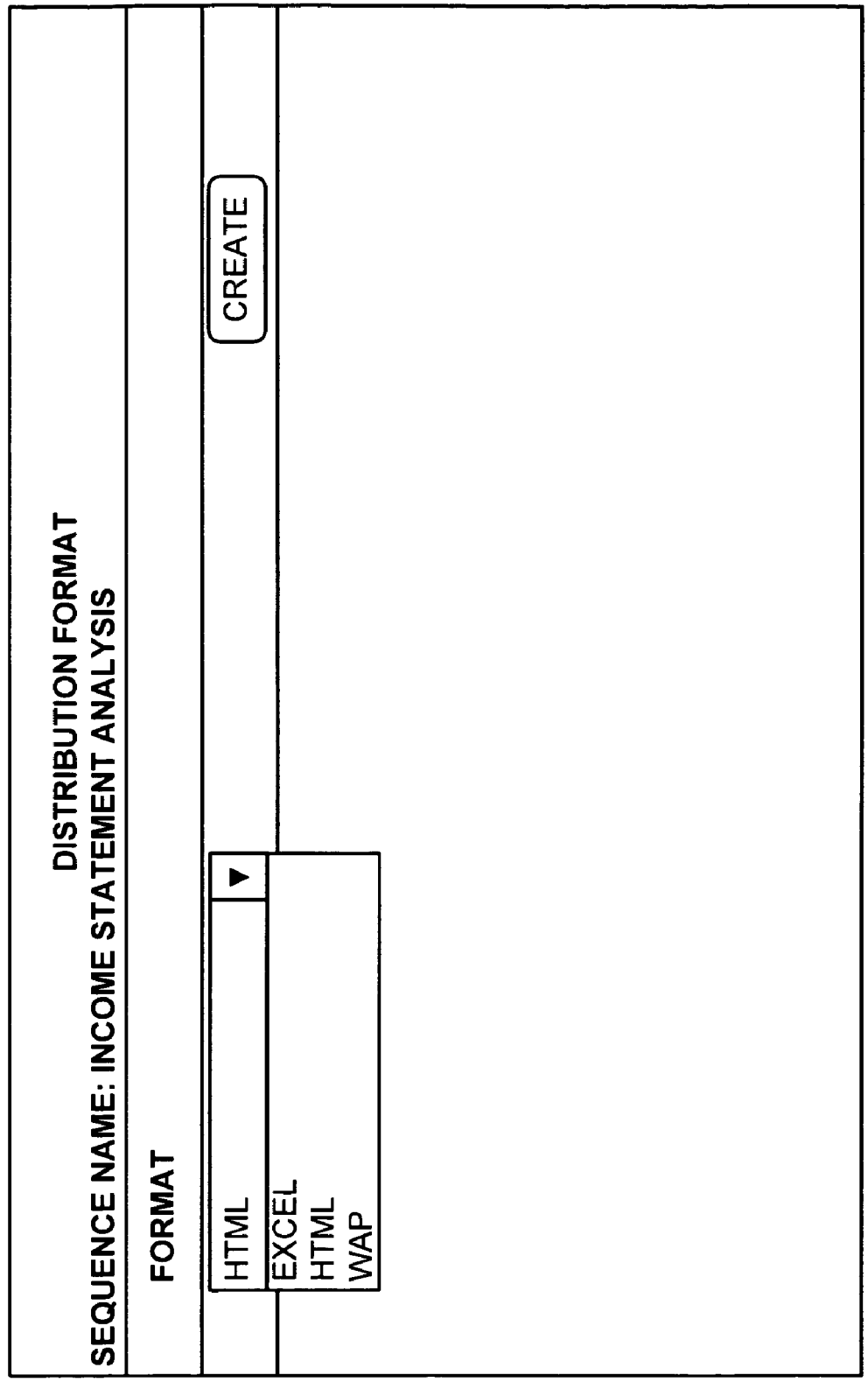
Figure 15T:
Figure 15U:
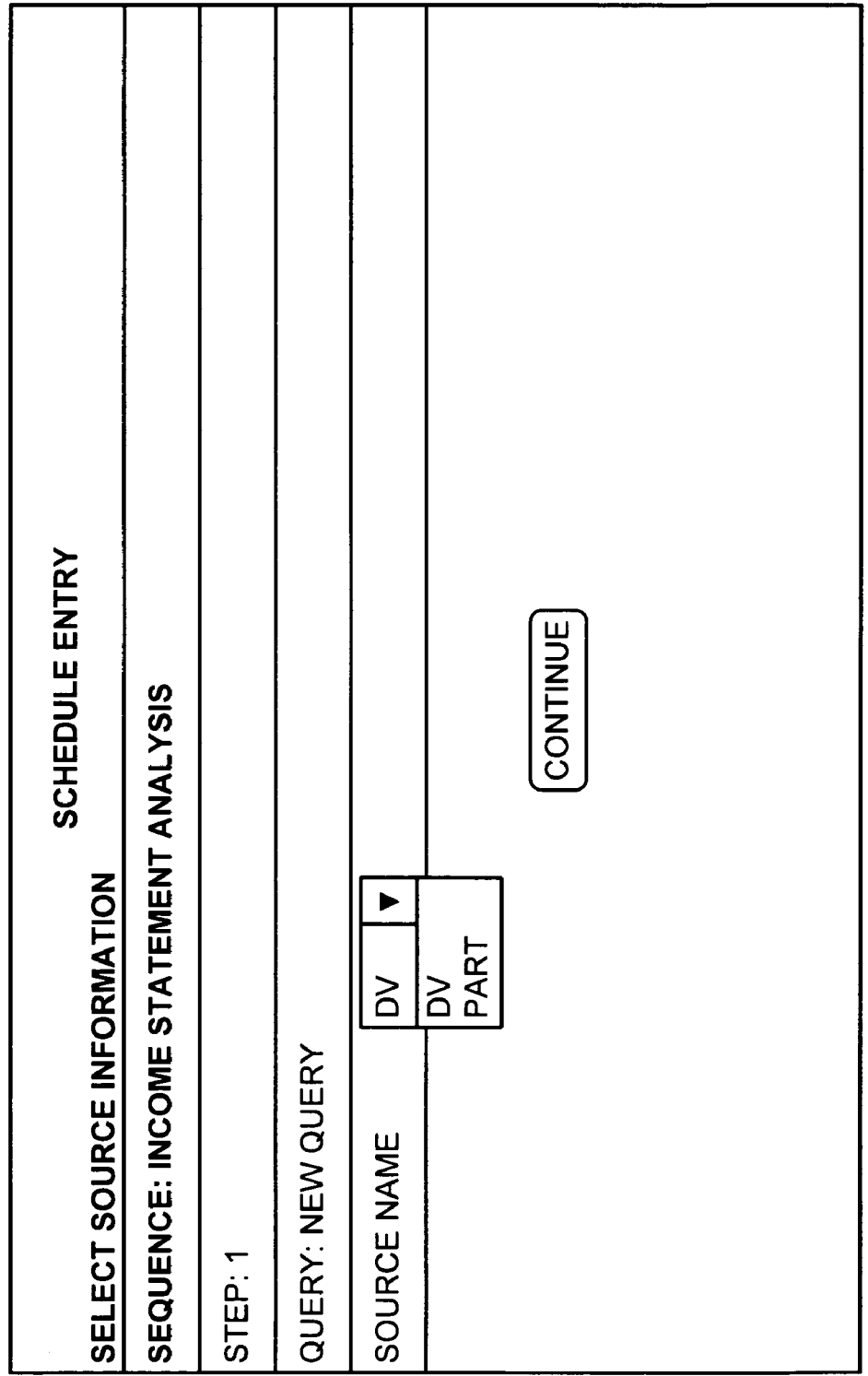
Figure 15A:
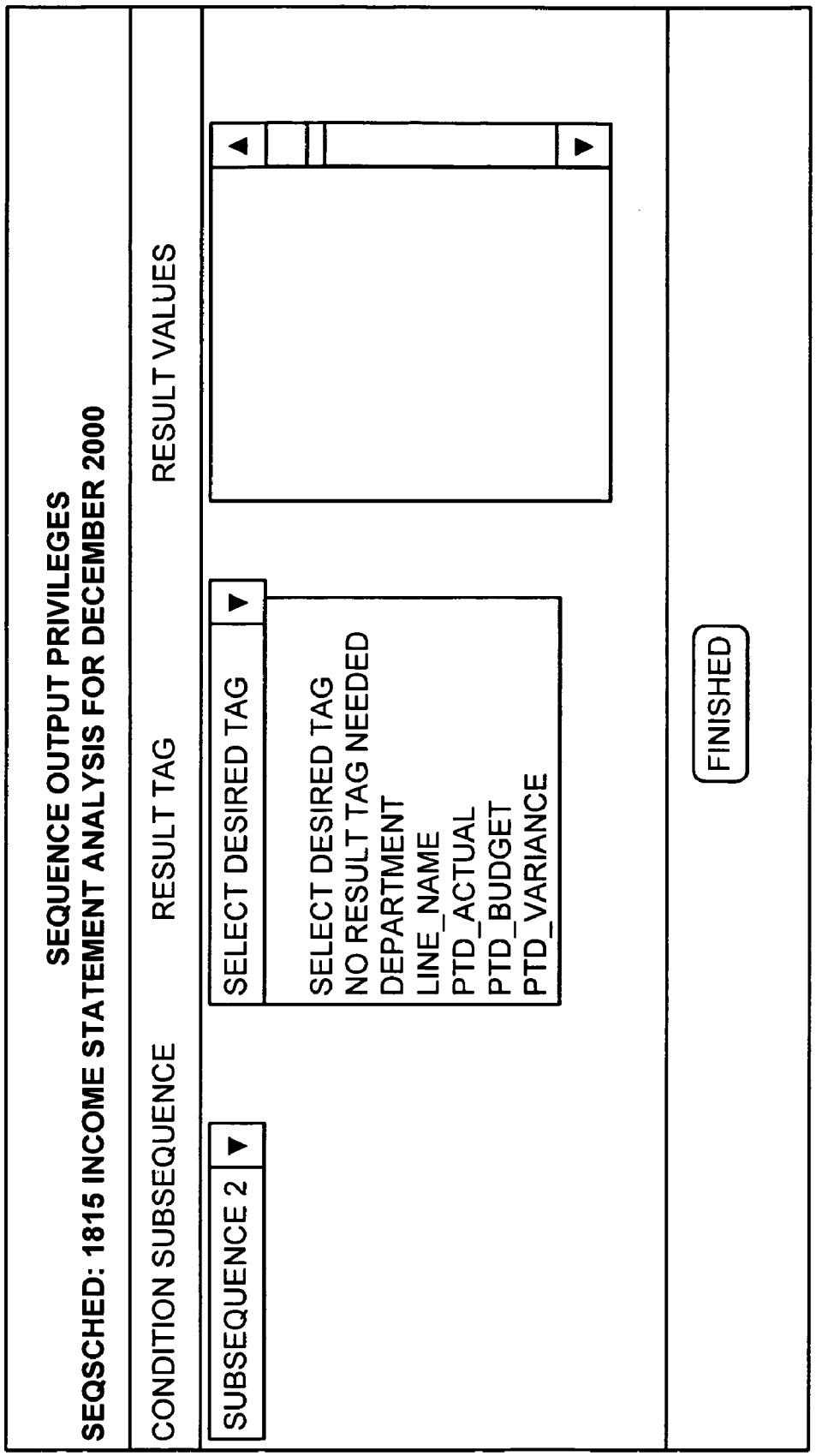

FIGS. 15A–15R illustrate a technique for defining processing directives and then assembling them into a sequence. FIGS. 15S–15DD illustrate a technique for scheduling a sequence. Finally, FIGS. 15EE–15FF illustrate a technique for viewing a sequence's scheduling status. Any of the user interfaces can be displayed in a viewer, such as, for example, in a browser via HTML.

FIG. 15A shows an exemplary interface 1502 presented to a user for adding or modifying query directives. Listed query directives can be modified by activating the displayed "MOD" buttons, and a new sequence can be added by filling in the proper fields and activating the "ADD" button. FIG. 15A shows a user entering the new query directive "NEW."

In the example, the exemplary user interface 1504 of FIG. 15B may be then presented for choosing an appropriate table for defining a query directive "NEW QUERY." The user can select an appropriate table and column to be included in the "SELECT" component of the SQL query definition. In the example, the user selects the table "DEPARTMENT_D" from the menu presented in the drop down box and presses the "SELECT COLUMN" button.

The exemplary user interface 1506 of FIG. 15C may then be presented for choosing an appropriate column from those in the earlier-selected table. In the example, the user selects the column "DEPARTMENT_DESC" from the menu presented in the drop down box and presses the "ADD" button.

Other selectable options, for example, include whether the column should be included as part of a "group by" clause during execution of the SQL statement. The "group by" feature should be set to "N" if aggregation is to be performed (e.g., SUM or COUNT). Another selectable option indicates a summary type (e.g., "SUM," "COUNT," or "AVG"). The summary type is enabled if the column is numerical (or can be converted to numerical) and the "group by" feature is off.

Another selectable exemplary option indicates a mark-up tag. The mark-up tag is used within the XML document that stores the contents for the column. If none is specified, the column name is used.

Still another option "run on refresh" indicates whether the table is relevant when the query is activated due to a refresh of a related table. A sort option can be used to order results.

The exemplary user interface 1508 of FIG. 15D may then be presented for possibly adding further columns via the "ADD COLUMN" button. After the appropriate columns have been added, the user activates the "DONE" button.

The exemplary user interface 1510 of FIG. 15E may then be presented showing that five columns have been added to the query directive. The user can then select the "DONE" button.

As a result, the exemplary user interface 1512 of FIG. 15F may then be presented by which the user can define filters to be applied during query directive execution. The filters can be applied as conditions in an appropriate SQL statement. A drop down menu of tables and columns from the query directive may be provided, and the user can select an appropriate table and column. In the example of 15F, the user has selected the "BUDGET_D" table and the "BUDGET" table.

The user can then select a filter operation (e.g., ">," "<," "!=," and the like), "run on refresh," a referring table and column (e.g., to force a join on a specific table and column— or left blank for specification at run time). The filter is added via the "ADD" button.

As a result, the exemplary user interface 1514 of FIG. 15G may then be presented showing that three filters have been added, and the user can activate the "ADD FILTER" button to define additional filters. Or, the "FINISH" button can be activated to indicate that no additional filters are desired and complete the query directive definition.

Analysis directives can then, for example, be defined to analyze the output from a query directive (e.g., columns from a database query). The analysis directive can include one or more steps (e.g., conditions). The result set from the query directive can be passed as input to the first step in the analysis directive. The output from the first step is then submitted to subsequence steps, if any. The output of the last step is then passed to the next processing directive in the sequence (e.g., another analysis directive or a distribution directive). The results set for a step (e.g., an interim step) can be stored (e.g., in the library) for later retrieval.

FIG. 15H shows an exemplary interface 1516 that may be presented to a user for use in defining an analysis directive. The user has entered the name "INCOME STMT ANALYSIS" as the name of the analysis directive and activates the "ADD" button to begin defining the directive.

Subsequently, the exemplary user interface 1518 of FIG. 15I may be presented for use in defining steps (e.g., conditions) that will be applied to the input data for the analysis directive. The steps are performed in order according to the specified condition sequence.

The user can select an appropriate XML tag (e.g., an element based on the associated query directive's output) for which to apply the condition. The tag can be selected via a menu as shown in the exemplary interface 1520 of FIG. 15J. In the example, the user has selected "PTD_ACTUAL." A tag data type and tag data format can be provided or selected.

Subsequently, the user can select an operator (e.g., ">," "<," "!=," and more complex analysis functions as shown and listed above) to be performed on the element related to the tag name as shown in the exemplary interface 1522 of FIG. 15K. The user can then enter a threshold value for use with the operator, if desired. Pressing the "ADD" button adds the condition to the directive.

Then, as shown in the exemplary user interface 1524 of FIG. 15L, the user can select the "ADDITIONS COMPLETED" button to complete adding conditions and complete definition of the analysis directive. In the example, the user has added three conditions to pick out period-to-date values not equal to zero that have a variance in the top ten percent and over $300,000.

One or more processing directives can be assembled into a sequence, with each processing directive performing a specific task in the sequence. In the example below, the directives are assembled into a sequence having unbound values, and the values are supplied when the sequence is scheduled. The processing directives are loosely coupled in that they encapsulate the logic related to their respective tasks.

The processing directives can include query directives (e.g., pre-defined queries to select data from a source system and generate an XML result set and used as input for following steps in the sequence), analysis directives (e.g., take the result set and perform various analysis functions), and distribution directives (e.g., take a final-form result set and distribute to specified users, using a pre-determined distribution method).

The exemplary interface 1526 of FIG. 15M may be presented to a user to define a new sequence or modify an existing one. In the example, the user is adding the new sequence "INCOME STAT'T ANALYSIS" and activates the "ADD" button.

The user may then enter the processing directives (e.g., steps) in the sequence as shown in the exemplary interface 1530 of FIG. 15N. The user can select the appropriate processing directive type (e.g., query, analysis, or distribution) and then choose the desired directive from a menu in a drop down box. Alternatively, the user can define the processing directive during the sequence assembly process by activating "DEFINE." The interface can further indicate a "last updated by" and a "last updated date."

In the example, the user has selected the "QUERY DIRECTIVE" directive type and selects "NEW QUERY" (which was created earlier). The user can then activate the "ADD" button to add the directive.

After adding the directive, the user can select further directives if desired, as shown in the exemplary interface 1532 of FIG. 15O. In the example, the user adds an analysis directive "INCOME STMT ANALYSIS" (which was created earlier). Another directive (e.g., a distribution directive) is shown as being added in the exemplary interface 1534 of FIG. 15P.

Information related to distribution can then be added via the exemplary interface 15Q shown in FIG. 1536. Upon activating the "CREATE" button, a default XSL stylesheet can be generated for the sequence. The stylesheet indicates how the data should appear and can format it for appropriate presentation to an end user, inclusion in a report, or distribution as a web page.

A sequence has thus been defined. The user can define additional sequences if desired.

After the sequence has been defined, it can be scheduled for execution. A sequence can be scheduled by specifying a date and time or by specifying a particular state change. Sequences can be set to execute at re-occurring intervals. In the example, further information is provided (e.g., an appropriate source system and filter values for the query directive template definition).

An exemplary interface 1538 of FIG. 15R can be presented by which a user can enter new scheduling information via the "ADD" button or view current scheduling information via the "VIEW" button. In the example, the user LS is adding a new sequence schedule entry named "INCOME STAT'T ANALYSIS." The user has also entered the description "ISA FOR DEC '00." As shown in the exemplary interface 1540 of FIG. 15S, the frequency can, in this example, be selected from a menu in a drop down box showing various options (immediate, once, extract, daily, weekly, monthly, and the like). The user can select "DAILY" and activate the "ADD" button to add the scheduling entry.

Immediate execution can be used for a one-time immediate execution. The once execution option can be used for one-time execution at a specified date and time. Extract execution can be used to schedule a sequence to be executed when a change has been made to one of the base tables defined in a query directive related to the sequence.

Extract execution can be achieved via the source data warehouse generating a list of tables (e.g., "post extract objects") that were modified during the load/refresh operations of data warehouse. Such sequences are considered to be reoccurring because they will then be re-executed if another appropriate change to the data warehouse is detected.

The daily feature can be used to execute a sequence on one or more days during the week. The user can specify which day(s) and time (e.g., Monday, Wednesday, and Friday at 8:30 pm). The weekly feature can be used to execute on a particular day of the week (e.g., Monday at 8:30 pm). The monthly feature can be used to execute on a particular day of the month (e.g., $1^{st}$ of the month at 8:30 pm).

FIG. 15R also shows an exemplary navigation pane including hyperlinks to various functions related to the system, such as viewing available sequences, and performing administrative tasks (e.g., system settings, user settings, logs, application settings, and media settings).

Subsequently, an exemplary interface 1542 of FIG. 15T may be presented to the user for selecting a desired day and time. The user can select Monday, Wednesday, and Friday at 8:30 PM, starting on Dec. 15, 2000, and activate the "SUBMIT" button.

Then, the user can choose the source system against which the sequence is to be run (e.g., for the query directive) via the exemplary interface 1544 of FIG. 15U and activate the "CONTINUE" button. Then, the user can select the source set out of the source system via the interface 1546 of FIG. 15V. In one exemplary warehouse environment, the source set may be a data set within the warehouse. Other environments may have other (e.g., a single) values.

In the illustrated example, some of the filters associated with the sequence had values that were unbound during definition time. Late binding is shown in the exemplary user interface 1548 of FIG. 15W by which the user supplies appropriate filter values at scheduling time. The user can then activate the "FINISHED" button. In this way, a sequence in template form can be scheduled against multiple different source systems and have completely different filters applied at each execution.

Then, further distribution information can be provided via the exemplary user interface 1550 shown in FIG. 15X. The user selects a destination user (e.g., "NEILB") to which the information (e.g., the formatted result set) is to be sent. A group can be specified. The method for delivering the output is then selected via the exemplary user interface 1552 shown in FIG. 15Y. The information can be sent via email (e.g., as HTML or via a link to HTML), to a web site, or to a desk alert (e.g., an instant message or wireless communication).

Then, after the method is selected, the user can choose the format for the data delivery as shown in the exemplary interface 1554 of FIG. 15Z. The user can select HTML, XML, WAP (e.g., cell phone), EXCEL (e.g., an attached CSV file), or PALM (e.g., delivery to PALM devices, such as those available from Palm Incorporated of Santa Clara, Calif.). Devices from others can be incorporated into the system.

Further, the user can specify interim results are to be provided by specifying the step of the sequence and any condition steps within an analysis directive. Still further, the user can specify additional filtering to be performed via the "RESULT TAG" feature. Any tag in the result set can be specified to further tailor output to a particular user. Only information meeting the specified result values will be forwarded if desired. If left blank, the entire result set may be sent to the user.

The exemplary user interface 1556 of FIG. 15AA shows a user selecting a desired result tag (e.g., "DEPARTMENT"). Then, as shown in the exemplary user interface 1558 of FIG. 15BB, the user selects the desired departments (e.g., Commercial Sales, Communications Resources, East Region Sales, Finance, Government Sales, Non-Product Sales, Product Sales, and Training). An appropriate XML document representing the selections is then built, as shown in the exemplary user interface 1560 of FIG. 15CC.

The user can then activate the "ADD" button. As shown in the exemplary user interface 1562 of FIG. 15DD, the user can then add additional users and groups or activate the "FINISHED" button to complete the process of scheduling the sequence. The sequence is then executed as scheduled.

Privileges to view the output can be controlled as indicated in the scheduling information. In this way, a user is prevented from accessing results for which permission is not indicated.

As shown in the exemplary user interface 1564 of FIG. 15EE, a user is selecting a scheduled sequence from a menu of a drop down box. The user selects the sequence "TEST SEQUENCE FOR PRIVS AND STEPS" and activates the "VIEW" button. As a result, the exemplary interface 1566 of FIG. 15FF may then be displayed, indicating that the sequence is scheduled to execute daily at 8:30 PM By using templates as shown, the logic relating to a sequence can be encapsulated in the directives, while the values relating to the logic (e.g., filter values) can be supplied at a later time. Accordingly, someone with little or no understanding of how the sequence works can schedule it without regard to its functionality and specify desired values.

In this way, the heuristics of the sequence (e.g., which values are appropriate for a filter) are separated from the algorithm. The system is not limited to the specified interfaces and alternative ordering of the appearance of the interfaces may be used, if desired.

Example 23

Exemplary Operation: Defining a Sequence

Figure 16A:
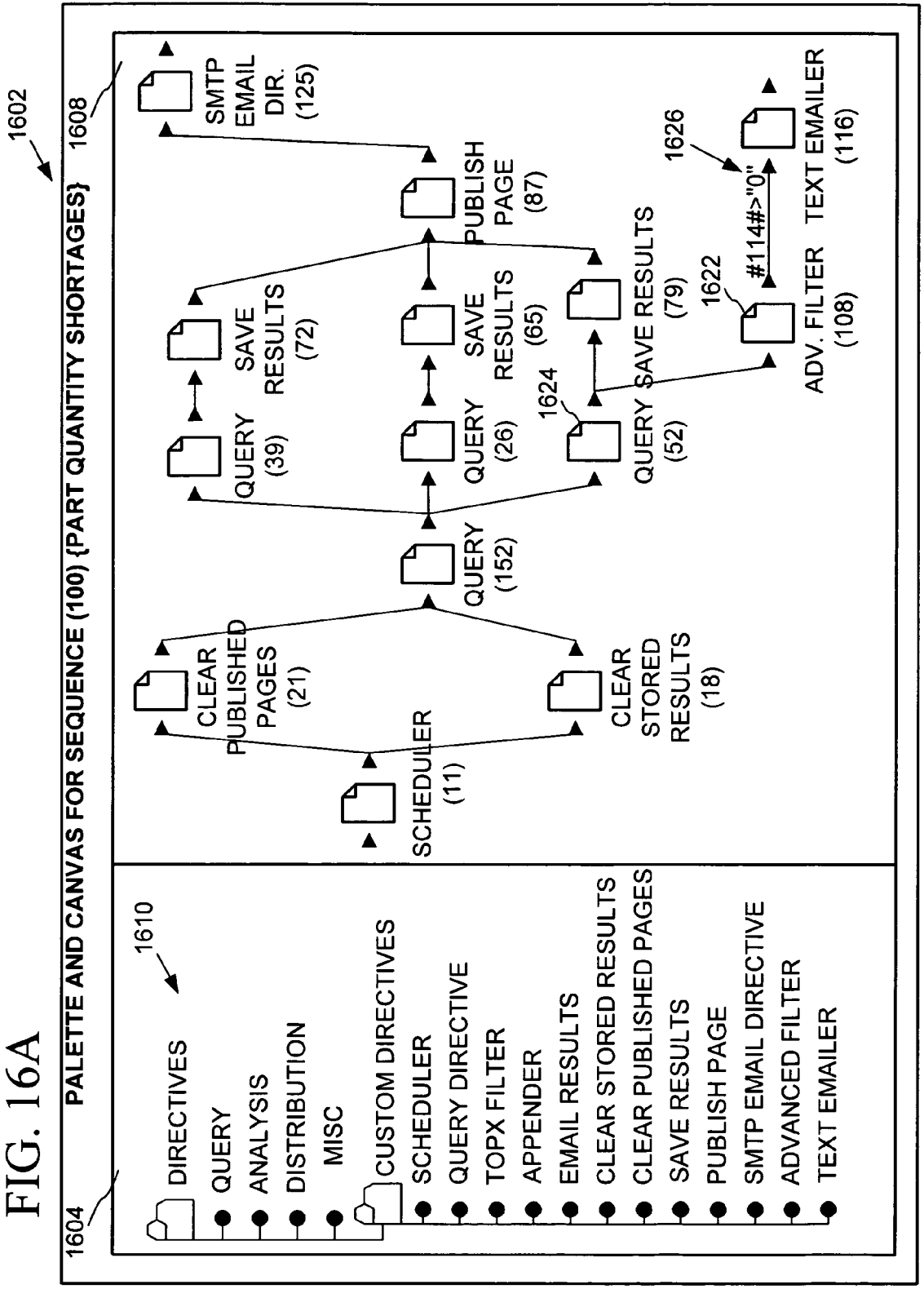

An alternative technique for defining a sequence is shown with respect to FIGS. 16A–16C. In the example, a user interface 1602 is presented by which directives 1610 are dragged from a palette 1604 and dropped onto a visual canvas 1608, where they can be assembled and configured as desired. In this way, visual programming for the sequence is achieved. The directives 1610 can include directives shipped with the software system, developed by the user, or developed by third parties.

Transitions between directives are achieved by connecting them on the canvas 1608. A condition can be attached with a transition so that the transition does not take place if the condition is not met.

The sequence shown in FIG. 16A can, in the specific example, determine part quantity shortages by obtaining information from several sources (via query directives) and assembles and publishes the results to a web page (i.e., via the "SMTP EMAIL" distribution directive). If shortages are found over a given threshold, a text message is generated and sent via email (i.e., the "TEXT EMAILER" distribution directive). This same technique may be applied to monitor other data warehouse processing, parameters, and results.

Variables can be defined to be available to any of the sequence's directives. Exemplary variables are shown in the interface 1630 of FIG. 16B, which is displayed responsive to activation of a flow properties item appearing in a context menu.

A wide variety of processing directives, can be included such that some of them might not necessarily fit into the category "query," "analysis," "distribution," or "event." Input to the directives can be gathered from defined variables, output from other directives, or specified values.

FIG. 16C shows a user interface 1660 by which a directive 1622 (FIG. 16A) can be configured. The parameter "FILTER EXPRESSION" is specified to have the value "REQUIRED_QUANTITY>200." As shown, the directive draws its input from the results of the previous directive 1624 (FIG. 16A). The options presented can thus be appropriate based on the functionality (e.g., output) of the previous directive. In the example shown, the directive will examine the result set provided by the previous directive (i.e., a query directive) and produce a new result set with rows meeting the specified criteria.

Expressions for branching (e.g., 1626 of FIG. A) can include an expression evaluating to TRUE or FALSE. Expressions can include sequence variables, output from previous directives, or both.

Example 24

Exemplary Operation: Executing a Sequence

When a scheduled sequence is executed, the processing directives are executed in turn to invoke the logic encapsulated within them. The directives can be executed in a system by having a different coordinator for different directives (e.g., query, analysis, distribution, and event). Or, arbitrary code (e.g., JAVA code) can be registered for any directive. Further, one of the directive's properties can be executable code, so that the directive's functionality can achieve any programmable task.

In some systems, the processing directives are executed by instantiating an instance of an appropriate object and executing the object. Multiple instances may run concurrently.

Example 25

Exemplary Output

Figure 17:
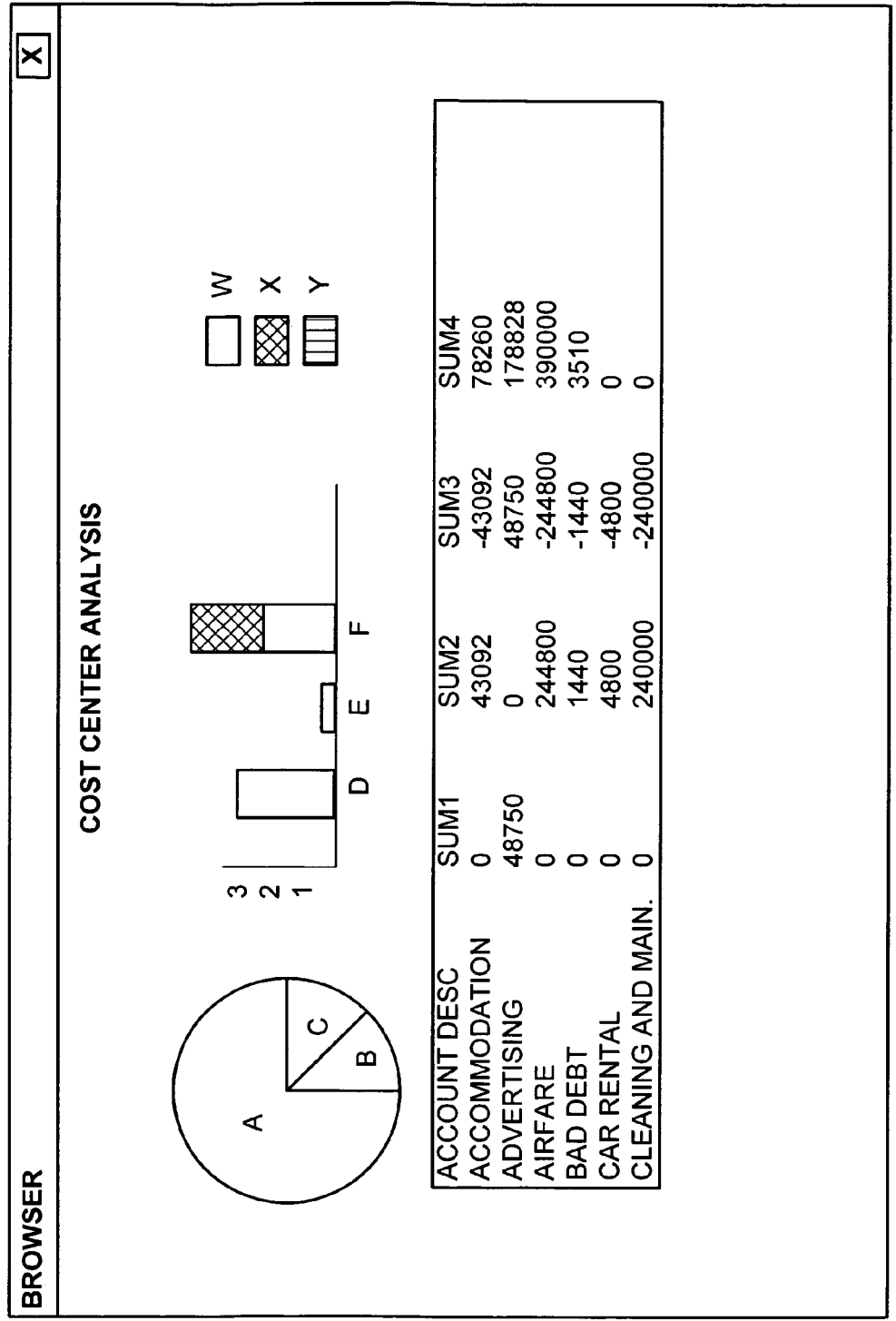
FIG. 17 shows exemplary output from a sequence.
Figure 20E:

A wide variety of output by sequences is possible. For example, FIG. 17 shows exemplary output 1702 by a sequence portrayed in a browser. The charts and grids are dynamic in that the user (e.g., a cost center manager) can activate the portrayal of the information to reveal further detail (e.g., by drilling down, drilling to detail, or changing displayed dimensions).

Viewers for the output can be embedded into any website. Thus, the system output can be incorporated into information portals. The viewers (e.g., applets or HTML) can be pushed to users via email. Thus, information can be delivered on a wide variety of platforms.

The above presentation can also be rendered as static HTML. Thus, a specialized viewer is not required.

Example 26

Exemplary Sequences

Sequences can be constructed using any of the above techniques in combination. For example, sequences can include gates, conditional branching, and notifications.

The sequences can be used to automate a wide variety of processes and help support the decision-making processes within an organization. For example, a user may wish to generate a report. The report may emphasize the top ten items of the report, may be run on a regular basis, and the results may be distributed via various mechanisms.

The user can construct a sequence to perform such a function. For example, the user can build an appropriate query directive and select the columns to display on the output. The user can then apply a filter via an analysis directive to filter out records other than the top ten. The user can then create an appropriate distribution directive specifying various permissions to limit those who can view the output data.

The user can further specify to whom the results should be distributed and via what media (e.g., email, PALM PILOT device, cell phone, B2B exchange, and the like). Security features can enforce restrictions so users can only view what they have permission to see. Such a sequence can be scheduled to run on a regular basis without further interaction by the scheduling user.

In another example, an organization might wish decision-makers to be provided with policy-based analysis. For example, an organization might wish cost center (e.g., department) managers to be provided with income, variance, and variance percentage. Such reports might be often ignored, so the organization wishes to find a way to call the managers' attention to them.

A sequence can be constructed to avoid this problem. A financial controller can define a query directive that produces a financial statement showing dollars spent compared to budgeted amounts, along with variance and variance percent.

An analysis directive can include a filter to exclude data with the following properties: budget amount=0 (there was no budget), budget variance % <30 (only show items where the cost center is 30% over the budgeted amount), and budget variance $<$300,000 (only include budget variance amounts that are over $300,000 variance).

The financial controller can configure the output to be distributed to cost center managers whenever the financial statement is produced. Due to the filter, managers will receive the line items only when there is a significant problem. Additionally, security can be configured so that cost center managers can only access data appropriate for them to access.

Without any action by the cost center managers, they automatically receive a message (e.g., sent to a device of their choosing) informing them of the lines of the financial statement that merit their attention. The sequence can be scheduled to run on a regular basis so the financial controller need not further interact with the system.

In this way, the managers receive a notification when lines on the financial statement meriting their attention are detected. Pointless distribution (e.g., when information meriting attention is not detected) can be avoided. The managers are thus more likely to pay attention to the distributed information.

In yet another example, an organization may wish to identify best practices of decision making and adopt such practices throughout the organization. For example, a financial controller might run various queries and reports and examine the data to see which needs the most attention. The controller might determine what thresholds (e.g., budget variance percentage) are significant and under what conditions. Over time, the thresholds will change. In response to, for example, manually entered instructions, queries may be re-run several times in various configurations to see what makes the most sense for a particular set of data.

A sequence can be used to automate identification of best practices and also promote adoption of the identified best practices. For example, a financial controller could perform the above analysis but not distribute the information to managers just yet. Instead, the controller can schedule various steps to run several times over a specified time period (e.g., over the next week or two). During that period of time, the controller can review the number of exceptions found and modify the configuration until the best way to perform the analysis is determined.

After the process is fine-tuned, the controller can then assign the output to be distributed to the cost center managers appropriately. Additionally, the controller can change the configuration of the analysis at any time to change conditions on which the cost center managers get the exception list by changing the sequence (e.g., without having to make changes for all cost center managers).

Also, another financial controller can copy the sequence and then apply customized exceptions to be analyzed. The sequence can then be published. Any controller can then use the sequence as a basis for new sequences reflecting additional discovered best practices.

In still another example, closed loop processing might be desired so that processing can be performed without further user input. For example, a manufacturing line manager might run various queries and reports to determine if there are any shortages for components needed to manufacture a given set of products. When a shortage is found, the manager enters a purchase order and calls the supplier to order the needed components.

A sequence can be constructed to automate such a decision-making process. For example, a query directive can list needed components along with any related shortage information. An analysis directive can filter the information so only components with a shortage are listed. A distribution directive can send a message to the cell phone of the sales person at the supplier to advise that components are required. Purchase orders can be automatically submitted to the purchasing system for the required components. An EDI transmission can be initiated to send the purchase order to the supplier to place the order. And, the manufacturing line manager can receive an email list of the components having a shortage along with the associated actions that were performed.

For example, in the user interface scenario shown in FIG. 16A, query directives can be dragged onto the canvas and configured to generate the proper information. An analysis directive can analyze the results for a shortage condition. A condition branch is added for processing when a shortage is recognized. A distribution directive can notify the affected manager and gain approval to create a purchase order. Upon approval, a conditional branch can direct execution to a purchase order creation directive and an email or other notification to the supplier. Finally, a message can be sent to the approving manager that the approved action was taken.

In yet another example, a business might wish to keep expenditures for particular cost centers within budgetary constraints. However, it may be that it is not until the end of a period (e.g., quarter) that a manager's cost center is evaluated to determine if a budget overrun has occurred.

A sequence can be assembled to monitor whether a particular cost center is on track to exceed the allowed budget. If so, the sequence can provide a notification to let the responsible manager know that the cost center is on track to exceed the allowed budget. Further, the sequence can make a general recommendation or recommend a course of action (e.g., to defer certain other expenses until the following period or limit a particular item or individual). Still further, the sequence can monitor to determine whether the manager has complied with a recommended course of action (e.g., whether the manager has limited a particular item or individual). The sequence itself or another sequence can monitor a user's reaction to such a sequence to provide information for further refining the sequence.

Of course, any number of other scenarios are possible. Any number of sequences can be assembled from a variety of processing directives. The above examples illustrate the robustness of the system and its capacity to tackle a wide variety of applications.

Example 27

Exemplary Tracking of User Interaction

In another aspect of an embodiment of the system, user interaction can be tracked. Such an approach can be used, for example, to better refine a decision-making process.

In one implementation, information distributed to a decision-maker may include a user interface element that the decision-maker can activate to indicate acknowledgement, agreement, or disagreement with the information. Such an interface element can be provided by a distribution or presentation directive. The decision-maker's reaction can be tracked to better determine whether the information provided is effective. Tracking can, for example, comprise when (e.g., date and time) activation occurred.

For example, various levels of interaction can be defined as shown in Table 37. A "problem" can include potential problems.

TABLE 37

Exemplary Interaction via User Interface Element

| Interaction | Description |
| --- | --- |
| Acknowledgement | User acknowledges receiving information (e.g., report or identification of problem) |
| Agree | User agrees (e.g., with identified root cause of problem) |
| Disagree | User disagrees (e.g., with identified root cause of problem) |
| Concur with recommendation | User concurs (e.g., with recommendation or course of action) |
| Does not concur with recommendation | User does not concur (e.g., with recommendation or course of action) |
| Commit to course of action | User commits (e.g., to recommended course of action) |
| Does not commit to course of action | User does not commit (e.g., to recommended course of action) |

Sequences can be defined to periodically distribute information. In such a case, the user might be presented with an "OK" button by which the user can acknowledge receiving the information. Monitoring such acknowledgements might be useful for determining, for example, whether a manager is so overwhelmed that the information is not being properly reviewed.

Sequences can also be defined to periodically identify problems (e.g., a budget overrun). In such a case, the user might be presented with a "Problem Acknowledged" button by which the user can acknowledge that a problem exists. Monitoring such acknowledgements can help find overwhelmed managers, managers who are ignoring the notifications, or perhaps a sequence that misidentifies a problem.

Yet other sequences can be defined to present a root cause of a problem. For example, based on recognition that a sequence is particularly effective at providing a notification about a problem, a sequence designer might work with a data expert to construct a sequence that postulates a probable root cause (e.g., based on further queries and analyses).

When presented with a root cause, the decision-maker receiving the notification can choose to agree or disagree with the presented root cause by activating a user interface element. Monitoring such user interaction can help identify whether the sequence is effective at identifying the root cause.

Still further, sequences can be defined to present a recommendation. For example, based on recognition that a sequence is particularly effective at identifying a root cause, a sequence designer might work with a data expert to enhance the sequence so that it presents a recommendation for addressing the root cause.

When presented with a recommendation, the decision-maker can choose to concur or not by activating a user interface element. Monitoring such user interaction can help identify whether the sequence is effective at providing a sound recommendation.

Still further, sequences can be defined to present a recommended course of action and then monitor whether the decision-maker has taken the recommended course of action. For example, based on recognition that a sequence is particularly effective at providing a sound recommendation, the sequence can be enhanced to ask the decision-maker to commit to the course of action and then monitor whether the decision-maker has indeed followed the course of action as promised.

Monitoring such interaction can be helpful in determining whether the sequence is recommending a sound course of action and assist in ensuring the recommended course of action is followed. The various levels of interaction can be combined as desired.

Any of the above sequences that evaluate or take action based on the effectiveness of themselves or other sequences are sometimes called, for convenience, "metasequences." The ability to monitor the effectiveness of a sequence allows refinement of a decision-making process to a degree that could not otherwise be possible.

As described above, a diagnosis of a problem (e.g., including simply identifying the problem) can be provided via a sequence. The decision-maker's reaction to the diagnosis can be recorded. Subsequently, the reaction can be analyzed to determine the effectiveness of the sequence. The diagnosis can assist a decision-maker in making a proper decision based on the data collection.

Example 28

Markup Language-Based Representations

In some implementations, aspects of the system can be represented via a markup language, such as XML. XML can serve as a common language for directives and code processing the directives. New features can be easily added because of the flexible nature of XML. In some cases, the XML itself can include code (e.g., the JAVA programming language) so that upon execution of a directive, any functionality achievable via programming code can be incorporated.

Other aspects of the system can be represented, for example, in the JAVA programming language. For example, jobs to be executed for administration of the system can be stored as Java. Analysis directives can include JAVA programming code.

In one implementation, any program can be registered with the system as a processing directive executer via XML. For example, the program can support the JAVA interface shown in Table 38

TABLE 38

Exemplary Interface public interface directive {
    public void start (directive_runner callback,
    Hashtable htParams) throws Exception;
}

The processing directive can be registered with the system via the XML 1801 shown in FIG. 18. The format can be easily changed because the information is represented via XML.

A set of thirteen exemplary processing directive registrations are shown in the XML 1901–1909 of FIGS. 19A–19I. During execution of a sequence, the appropriate processing directive executer is invoked to process the associated processing directive. The format can be easily changed because the information is represented via XML.

A result set (or any other data set) can also be of XML format, enabling the various directives to be loosely-coupled. For example, FIGS. 20A–20E show an exemplary result set in XML 2001–2005. The format can be easily changed because the information is represented via XML.

Further, a sequence can also be of XML format, enabling easy extension of sequence functionality. An example of a sequence defined in XML 2101–2120 is shown in FIGS. 21A–21T. The format can be easily changed because the information is represented via XML.

A source server can provide programmatic access to data residing in databases. An exemplary XML definition 2201–2202 related to a source server appears in FIGS. 22A–22B. The format can be easily changed because the information is represented via XML.

Still further, the source server can communicate database schema to processing directives via XML. In this way, the schema definition can be easily enhanced. An exemplary schema definition defined in XML 2301–2307 is shown in FIGS. 23A–23G. The format can be easily changed because the information is represented via XML.

Although advantageous, the use of JAVA, XML or other specific languages is not required. Other aspects of the system can be represented in XML as desired.

Example 29

Alternative Architecture

Figure 24:
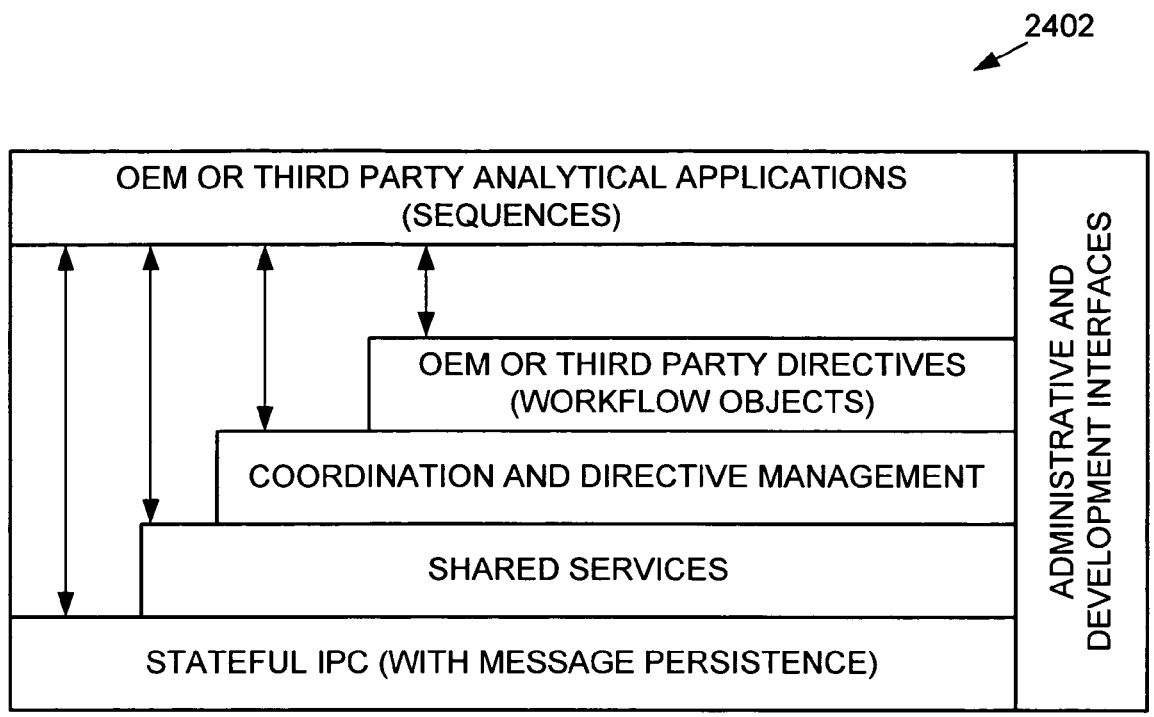
FIG. 24 shows an exemplary architecture for a system implementing sequences.

An alternative architecture 2404 for an exemplary system implementing the technologies is shown in FIG. 24. The architecture includes various layers that can interact. Stateful inter-process communication (IPC) provides a communication framework that allows components to find and communicate with each other whether on the same machine or across a network. Shared services include specialized Java servers having functionality (e.g., storage, registration, queuing, timing, logging, and the like) shared by multiple applications.

Coordination allows for the assembly of encapsulated processing directives into applications. Processing directives can be defined in terms of inputs and outputs that interact with the shared services layer and can be assembled into applications by a sequence designer. The shared services can include, for example, a mechanism whereby a generic set of instructions for gathering a data set can be converted into specific instructions appropriate for a particular data collection, such as that described in "Example 7—Query Directives," above.

Figure 25:
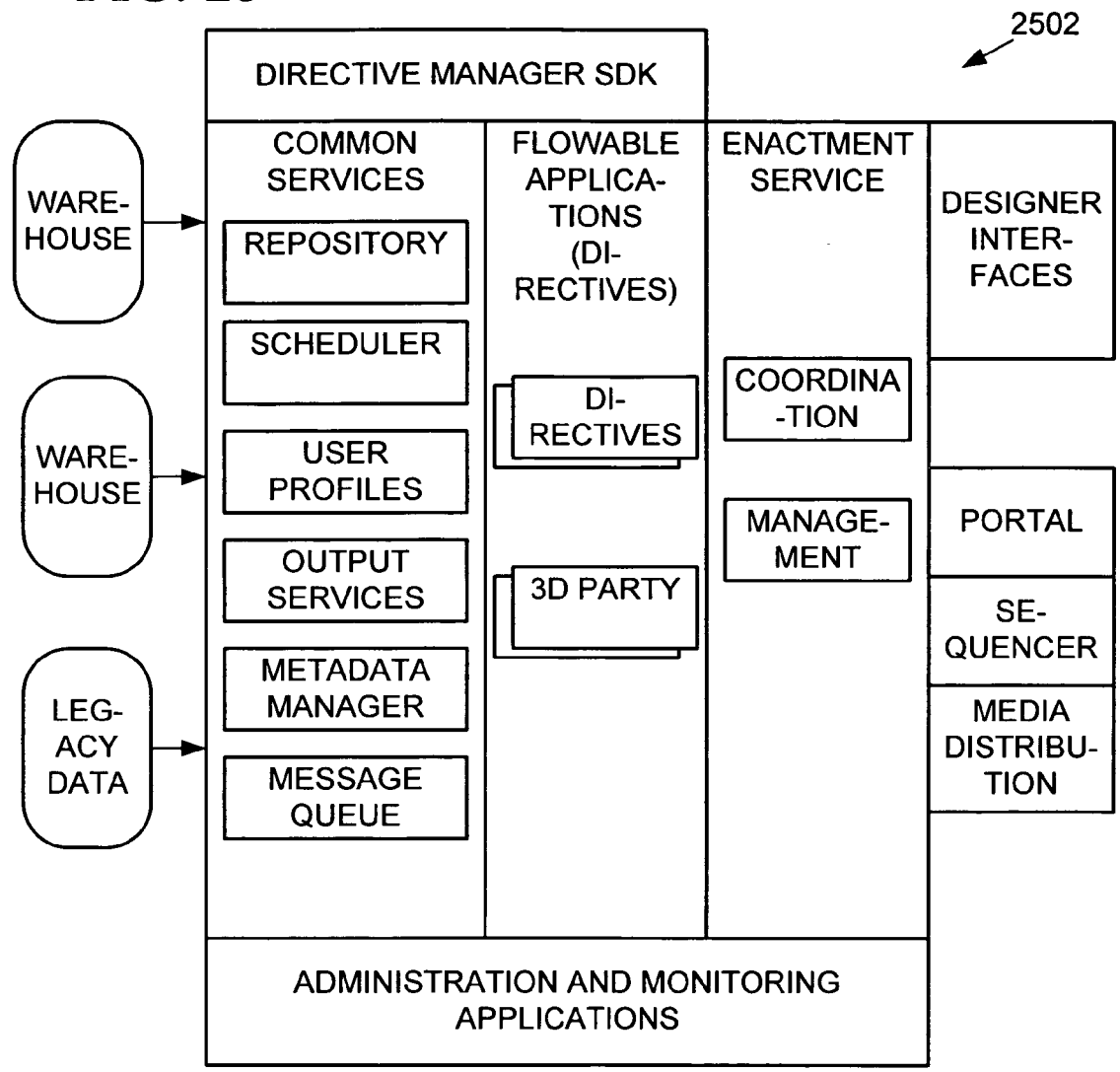
FIG. 25 shows a block diagram for an exemplary system implementing sequences.

A block diagram 2502 of FIG. 25 shows another view of an exemplary system. Any of a variety of source systems can be supported.

Example 30

Roles

Users and systems interacting with the system can play various roles. For example, an application developer might use the directive manager SDK to develop and package processing directives for registration with the system. A developer might be a third party who markets pre-crafted processing directives or assembled sequences.

A sequence designer can design sequences. In some cases, there may be more than one instance of the system, and such a designer might publish designed sequences to other instances of the system.

An end user can receive sequence output in a variety of media or browse sequence output via a portal interface. The end user can also maintain personal preferences information (e.g., delivery preferences).

Transactional systems can be affected by sequences. A sequence might suggest or effect change in a transactional system.

A system administrator can schedule sequences, maintain the users, and monitor the system. Others can be delegated administrator rights if desired.

Example 31

Exemplary Platform

Figure 26:
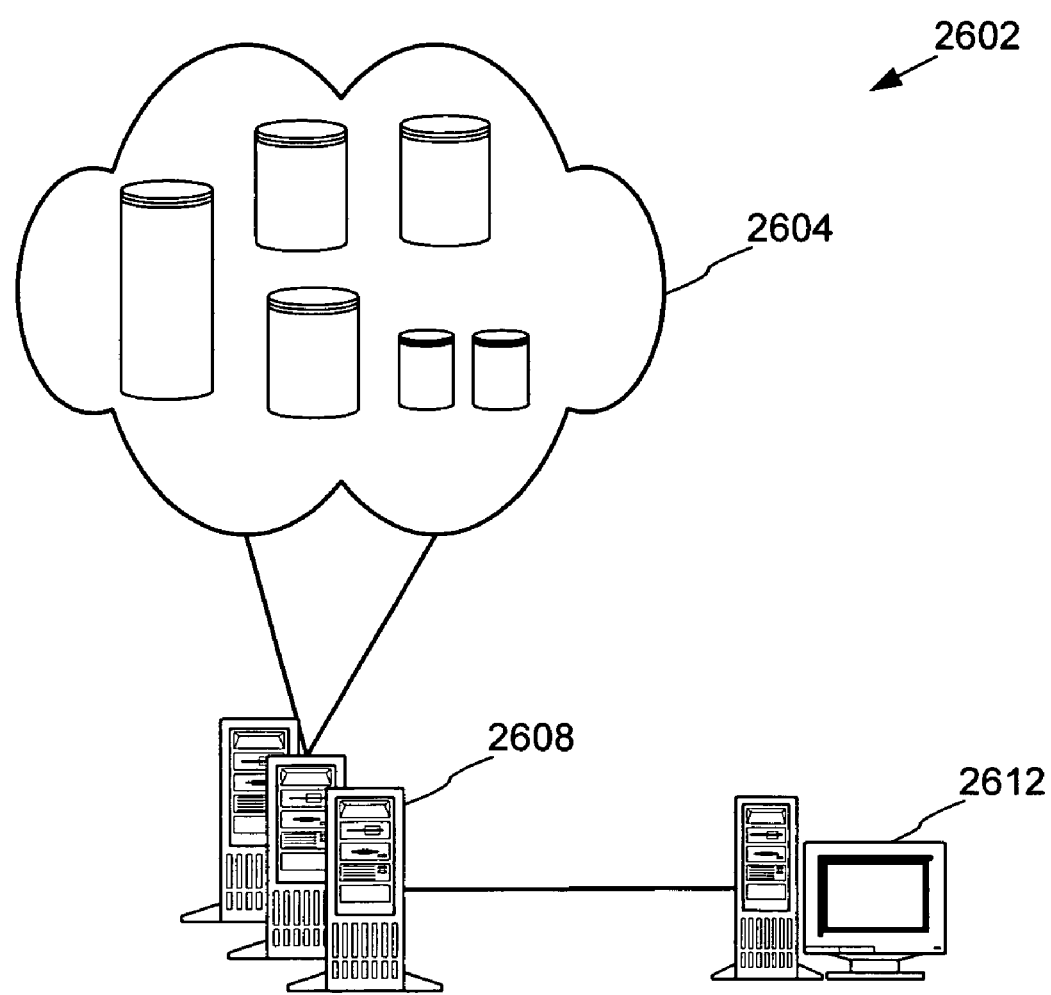
FIG. 26 shows an exemplary platform for carrying out the described technologies.

The technologies described above can be implemented on a wide variety of hardware and software platforms. For purposes of example only, FIG. 26 shows an exemplary arrangement 2602 for carrying out the technologies.

The data collection 2604 can be any of a variety of databases, data marts, or database systems. Data warehouses can be based on any of a variety of software systems, and other types of data collections can be supported.

Other possible data collections include those based on the ORACLE family of software available from Oracle Corporation of Redwood Shores, Calif.

The particular platform supported by the servers 2608 is not of importance, but a UNIX-based environment can be used. The servers can interact with any of a variety of computer-readable media (e.g., RAM, ROM, hard disk, floppy disk, CD-ROM, CD-R, CD-RW, DVD-ROM, and the like).

Information stored on the computer-readable media can comprise computer-executable instructions, such as those executable by a machine, a virtual machine, an interpreter, or another software program performing work based on symbolic instructions.

The client machine 2612 can be any of a variety of platforms, and may be of a different platform than the servers 2608. For example, a machine running any of the operating systems available from Microsoft Corporation of Redmond, Wash. can be used. Any of various other platforms can be supported (e.g., MACINTOSH, UNIX, LINUX, or the like). The client machine 2612 can include browser software for rendering HTML or other markup languages.

Numerous other computer systems and devices can interface within the arrangement 2602, such as those shown in FIG. 9, above.

Example 32

Chainable Discrete Database Operation Items

The processing directives herein can be used as chainable discrete database operation items when combined into a sequence. The chainability feature of the processing directives is that they can be placed in a series of steps and the results of one processing directive can be passed to the next processing directive for processing.

The discreteness feature of the processing directives is that they can encapsulate a plurality of logic but still be specified by a single identifier. The database operation feature of the processing directives is that they can be used for a variety of operations particularly useful for collection of data, such as databases and data warehouses.

Such features are particularly useful for a system involving non-technical users. However, technical users can also use the features to advantage because they can help provide an environment in which information can be more efficiently analyzed. For example, the chainable discrete database operation items can be easily combined via a user interface to provide powerful data analysis with reduced effort.

Example 33

Automating a Decision-Making Process Via an Executable Workflow

The technologies described above can be particularly useful in helping to automate a decision-making process based on a collection of data. In such a case, the decision-making process can be decomposed into discrete activities represented by processing directives performing work associated with the activities. The directives can be executed in a computer-implemented workflow environment providing a rich set of features.

The output of a sequence can be sent to a decision-maker, such as a manager or a strategic decision-maker. In some cases, output information can be provided to a data expert, who may evaluate the information to see if it is appropriate or needs to be refined.

Decision-makers in any of a number of capacities related to the operation and performance of an organization can be provided information, including decision-makers in the fields of sales, finance, inventory, and the like.

In some cases, a sequence of processing directives supporting the decision-making process can be called "an executable workflow." At least one of the directives can be a query directive, and at least one of the items can be a distribution directive.

For example, it is often important within an organization that a particular cost center stay within budget. Before the end of a reporting period, it may be possible to detect that the cost center is on track to exceed the allocated budget. An experienced decision-maker presented with such a situation may be able to make a decision that would avoid exceeding the allocated budget and thus resolve the problem. For example, the decision-maker may decide to defer certain expenses or closely control and monitor a category of expenses.

An executable workflow can be constructed by creating an executable sequence embodying the activities undertaken by the decision-maker when making the decision. The results of the decision can be provided for evaluation and acceptance by a decision-maker who may agree or disagree with the decision.

Further, the executable workflow can include activities related to implementing the decision, such as the recommended course of action described in Table 37, above.

An event directive can be configured to watch cost centers and trigger execution of the workflow upon detection that the cost center is projected to exceed its allocated budget.

Example 34

Exemplary Analysis Directive Filtering Operations

Examples of possible analysis directive filtering operations include those shown in Table 39.

TABLE 39

Exemplary Analysis Directive Filtering Operations

Do nothing (e.g., forward results)
Records having value less than the threshold value
Records having value greater than the threshold value TABLE 39-continued Exemplary Analysis Directive Filtering Operations Records having value equal to the threshold value
Records having value not equal the threshold value
Records having value less than or equal to the threshold value
Records having value greater than or equal to the threshold value
Records having value like the threshold value
Records having value top x data values
Top x records
Records in top x percent (e.g., based on number of rows)
Bottom x records
Records in bottom x percent
Records greater than average
Records less than average
Records less than x percent below average
Records greater than x percent above average
Records within x of the average
Records outside x of the average
Records within x percent of the average
Records outside x percent of the average
Records greater than x percent of the total
Records less than x percent of the total
Records within x percent of the total
Records outside x percent of the total
Sort the records in ascending order
Sort the records in descending order
Split records into multiple results sets based on value of a specified tag
Merge results sets from multiple results sets into one The list is a limited example, and many others are possible. A user can enter custom logic to perform any filter, but in some cases it may be desirable to present certain commonly-used filters as part of a menu for selection by the user.

Example 35

Combinations

Any of the above technologies can be combined in various permutations and sub-permutations to construct an appropriate system or method. Features mentioned above need not be implemented if not desired.

Alternatives

Having described and illustrated the principles of our invention with reference to illustrated embodiments, it will be recognized that the illustrated embodiments can be modified in arrangement and detail without departing from such principles. It should be understood that the programs, processes, or methods described herein are not related or limited to any particular type of computer apparatus. Various types of general purpose or specialized computer apparatus may be used with or perform operations in accordance with the teachings described herein. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer-implemented method for presenting a user interface for construction of an executable sequence to automate a decision-making process based on a collection of data, the method comprising:

displaying representations in the user interface of a plurality of discrete executable directives encapsulating their respective logic associated with the decision-making process, wherein at least one of the discrete executable directives defines a query against the collection of data, at least one of the discrete executable directives defines an analysis directive to analyze information derived from the query, and at least one of the discrete executable directives defines a distribution directive to distribute information based on analysis performed by the analysis directive; and accepting user input to assemble a set of the discrete executable directives into a schedulable executable sequence, wherein at least one of the discrete executable directives is selected from a menu, and wherein the executable sequence comprises:

at least one discrete executable directive defining a query against the collection of data, followed at some time by at least one discrete executable analysis directive operable to analyze information derived from the at least one discrete executable directive defining the query, and followed at some time by at least one discrete executable distribution directive operable to distribute information based on analysis performed by the at least one discrete executable analysis directive.

2. A computer-readable medium comprising computer-executable instructions for performing the method of claim 1.

3. The method of claim 1 wherein the executable sequence is operable to distribute results of interim processing.

4. The method of claim 1 wherein the executable sequence is operable to generate a targeted personal notification.

5. The method of claim 1 wherein the executable sequence is operable to distribute a presentation of information comprising displayed elements, wherein a recipient of the presentation of information can drill down to detail not shown in the presentation by activating one of the displayed elements.

6. The method of claim 1 wherein the analysis directive comprises a filter.

7. The method of claim 1 wherein the analysis directive comprises arbitrary executable code entered at sequence definition time.

8. The method of claim 1 wherein at least one of the analysis directives is operable to analyze a user's reaction to information distributed by at least one of the distribution directives.

9. The method of claim 1 wherein at least one of the analysis directives is operable to determine whether a user acknowledged information distributed by at least one of the distribution directives.

10. The method of claim 1 wherein at least one of the analysis directives is operable to determine whether a user concurred with an identification of a root cause of a problem in information distributed by at least one of the distribution directives.

11. The method of claim 1 wherein at least one of the analysis directives is operable to present a recommended course of action to resolve a problem.

12. The method of claim 1 wherein at least one of the analysis directives is operable to determine whether a user complied with a recommended course of action to resolve a problem.

13. The method of claim 1 wherein at least one distribution directive is operable to distribute information to a wireless device.

14. The method of claim 1 wherein at least one distribution directive is operable to distribute information via email.

15. The method of claim 1 wherein at least one distribution directive is operable to distribute information via a web page.

16. The method of claim 1 wherein the sequence comprises at least one gate.

17. The method of claim 1 wherein lineage of the sequence is tracked to indicate one or more sequences on which the sequence is based.

18. The method of claim 1 wherein at least one of the directives is pluggable.

19. The method of claim 1 further comprising:
executing the sequence, wherein during execution of the sequence, responsive to detecting a plurality of inputs to an analysis directive, instantiating multiple instances of the analysis directive for accepting the inputs.

20. The method of claim 1 wherein the at least one discrete executable directive defining a query against the collection of data is followed immediately in the executable sequence by the at least one discrete executable analysis directive, and the at least one discrete executable analysis directive is followed immediately in the executable sequence by the at least one discrete executable distribution directive.

21. A computer-implemented method of presenting a user interface for creating executable sequences from processing directives, the method comprising:
presenting a first display area comprising graphical representations of available processing directives, wherein at least one of processing directives is selected from a menu, and wherein the processing directives comprise query directives, analysis directives, and distribution directives;
presenting a second display area comprising graphical representations of processing directives selected as included in the executable sequence;
depicting coupled processing directives as graphically linked and conditionally coupled processing directives as graphically linked with a depiction of a condition associated with the link;
accepting a drag and drop operation to drop a processing directive from the first display area into the second display area; and
responsive to the drag and drop operation, adding the processing directive to the executable sequence, wherein the executable sequence comprises at least one query directive, at least one analysis directive, and at least one distribution directive.

22. A computer-based system for presenting a user interface for construction of an executable sequence to automate a decision-making process based on a collection of data, the system comprising:
a user interface element for accepting user input to configure a plurality of discrete executable directives encapsulating their respective logic associated with the decision-making process, wherein at least one of the discrete executable directives defines a query against the collection of data, at least one of the discrete executable directives defines an analysis directive to analyze information derived from the query, and at least one of the discrete executable directives defines a distribution directive to distribute information based on the analysis; and
a user interface element for associating the plurality of discrete executable directives into an executable sequence, wherein at least one of the discrete executable directives is selected from a menu, and wherein the executable sequence comprises at least one query against the collection of data,
followed by at least one analysis directive operable to analyze information derived from the at least one query,
followed by at least one distribution directive operable to distribute information based on the at least one analysis directive.

23. The system of claim 22 further comprising:
a repository for storing configuration of the executable sequence.

24. The system of claim 23 further comprising:
a sequence executer operable to access the repository and execute the sequence.

* * * * *